(12) United States Patent  
Kimata et al.

(10) Patent No.: US 8,711,489 B2  
(45) Date of Patent: Apr. 29, 2014

(54) ZOOM LENS

(75) Inventors: Hirohiko Kimata, Shibuya-ku (JP);
Yasuharu Yamada, Shibuya-ku (JP);
Yasuji Ogata, Shibuya-ku (JP);
Kazuteru Kawamura, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 138 days.

(21) Appl. No.: 13/369,777

(22) Filed: Feb. 9, 2012

(65) Prior Publication Data

US 2012/0212835 A1    Aug. 23, 2012

(30) Foreign Application Priority Data

Feb. 18, 2011  (JP) ................................. 2011-033632
Apr. 26, 2011  (JP) ................................. 2011-097751

(51) Int. Cl.
*G02B 15/14*  (2006.01)
*G02B 15/173*  (2006.01)

(52) U.S. Cl.
CPC ..................................... *G02B 15/173* (2013.01)
USPC ............................. 359/683; 359/676; 359/684

(58) Field of Classification Search
USPC ........................................ 359/676, 683, 684
See application file for complete search history.

(56) References Cited

U.S. PATENT DOCUMENTS

| | | | |
|---|---|---|---|
| 5,253,113 A | 10/1993 | Sekita et al. | |
| 6,191,896 B1 | 2/2001 | Itoh | |
| 2002/0131184 A1* | 9/2002 | Yasui | 359/680 |
| 2006/0268428 A1 | 11/2006 | Kuroda et al. | |
| 2010/0007967 A1 | 1/2010 | Ohashi | |

FOREIGN PATENT DOCUMENTS

| | | |
|---|---|---|
| JP | 2778232 | 4/1992 |
| JP | 11-167063 | 6/1999 |
| JP | 2000-292700 | 10/2000 |
| JP | 2006-301474 | 11/2006 |
| JP | 2010-019931 | 1/2010 |
| JP | 2010-211056 | 9/2010 |

* cited by examiner

*Primary Examiner* — William Choi
(74) *Attorney, Agent, or Firm* — Kenyon & Kenyon LLP

(57) ABSTRACT

In a zoom lens of a fixed total length, at the time of changing the magnification from the wide-angle end toward the telephoto end, the first lens group is anchored while the second lens group is moved, and the third and fourth lens groups are moved so as to be located at the object side of the telephoto end relative to the wide-angle end, such that: the interval between the second and third lens groups is decreased at the telephoto end relative to the wide-angle end; the interval between the third and fourth lens groups is increased at the telephoto end relative to the wide-angle end; and the interval between the fourth and fifth lens groups is increased at the telephoto end relative to the wide-angle end, and at the time of focusing a near object point from a remote object point, the second lens group is moved.

17 Claims, 28 Drawing Sheets

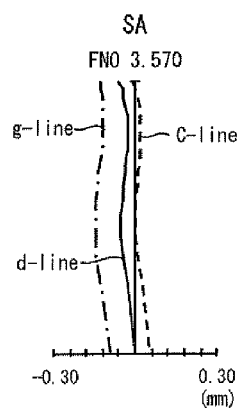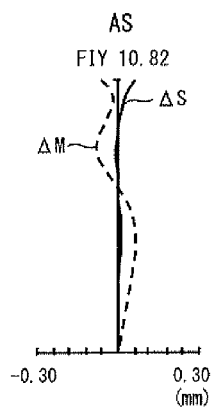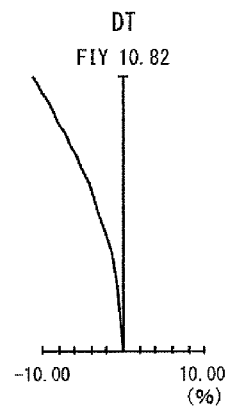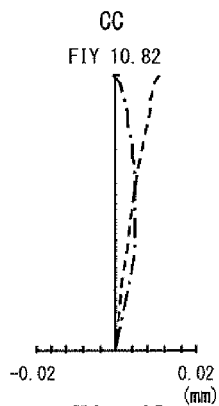
Fig. 6A  Fig. 6B  Fig. 6C  Fig. 6D
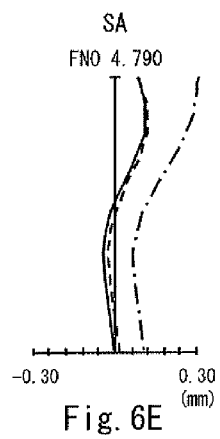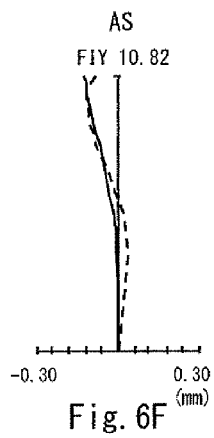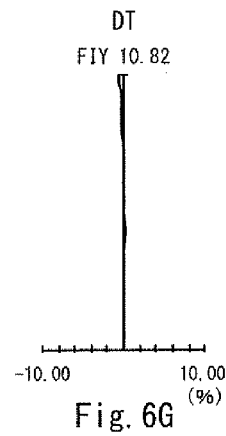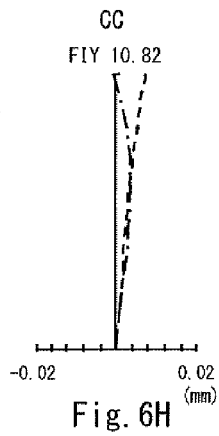
Fig. 6E  Fig. 6F  Fig. 6G  Fig. 6H
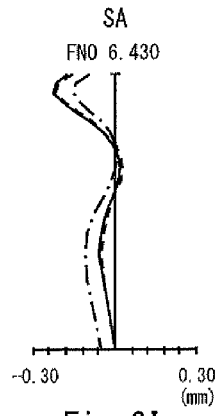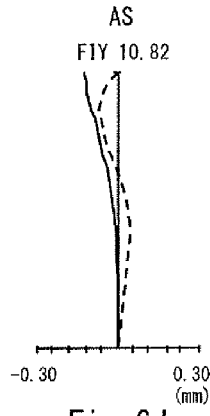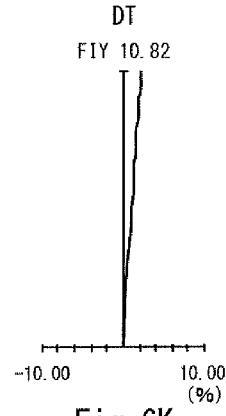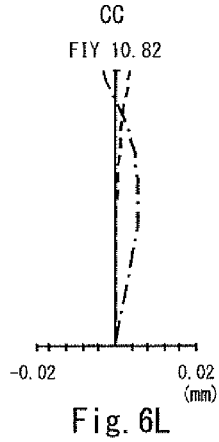
Fig. 6I  Fig. 6J  Fig. 6K  Fig. 6L

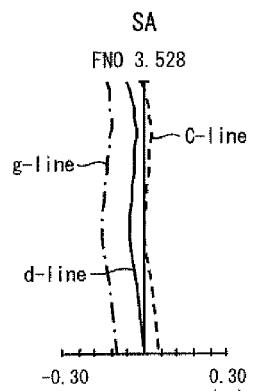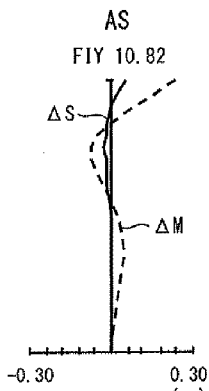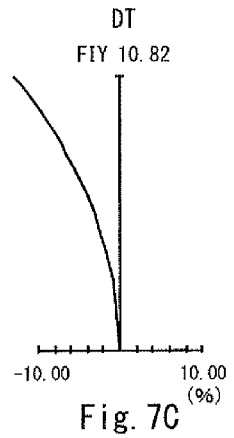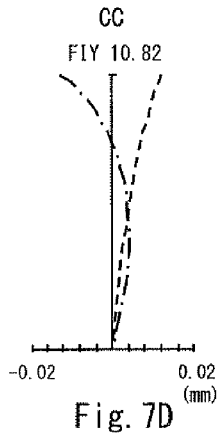
Fig. 7A  Fig. 7B  Fig. 7C  Fig. 7D
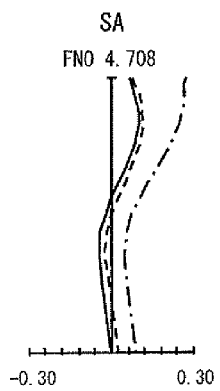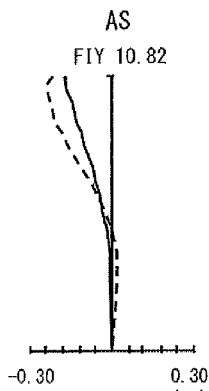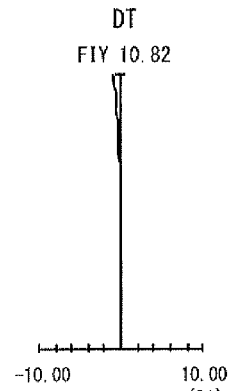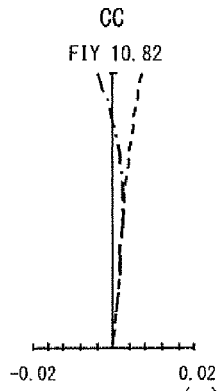
Fig. 7E  Fig. 7F  Fig. 7G  Fig. 7H
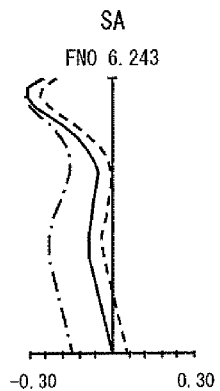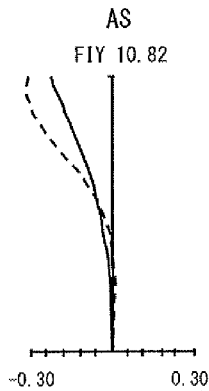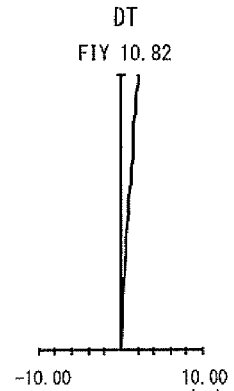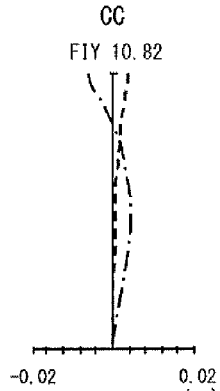
Fig. 7I  Fig. 7J  Fig. 7K  Fig. 7L

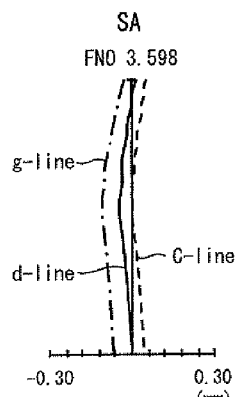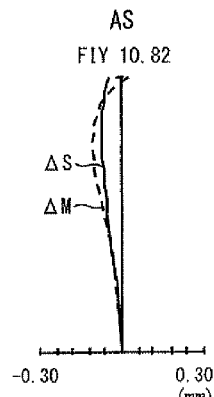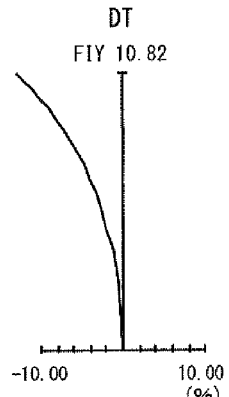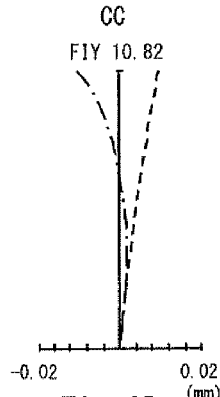
Fig. 9A    Fig. 9B    Fig. 9C    Fig. 9D
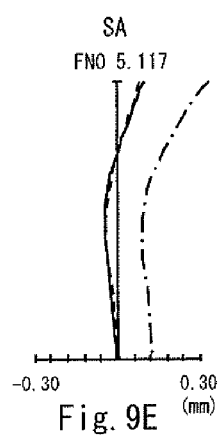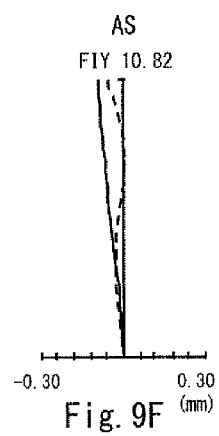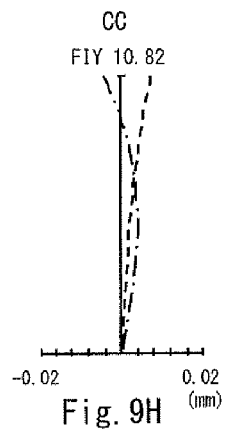
Fig. 9E    Fig. 9F    Fig. 9G    Fig. 9H
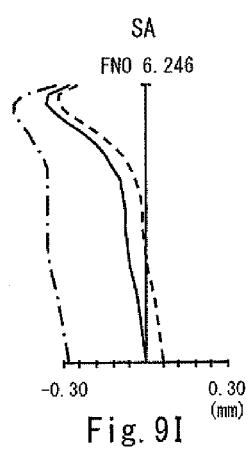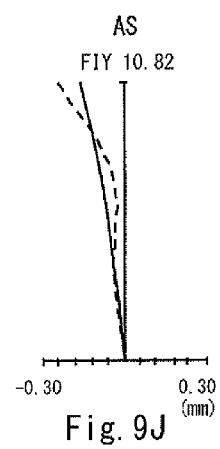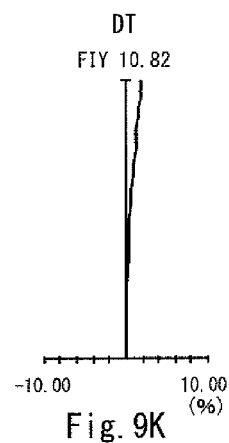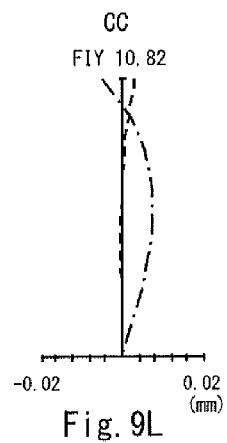
Fig. 9I    Fig. 9J    Fig. 9K    Fig. 9L

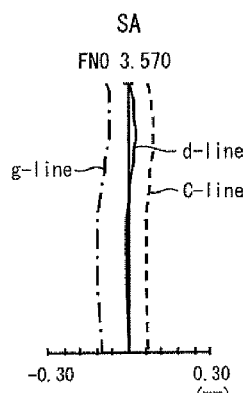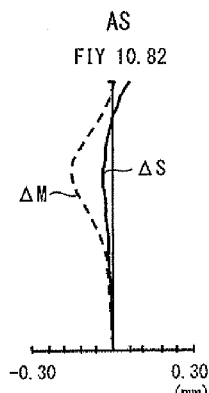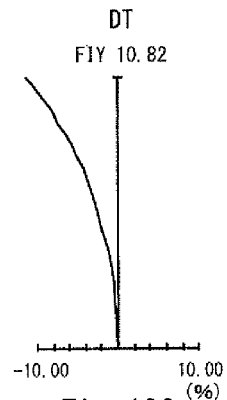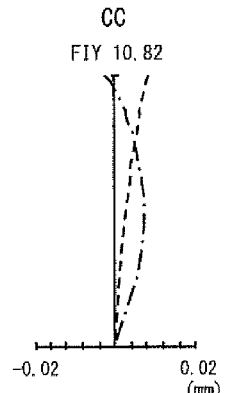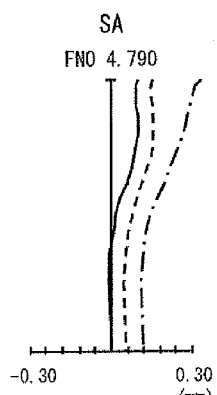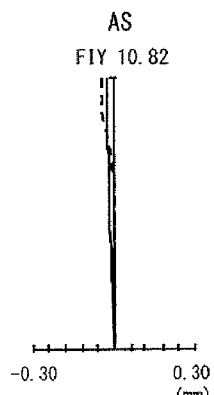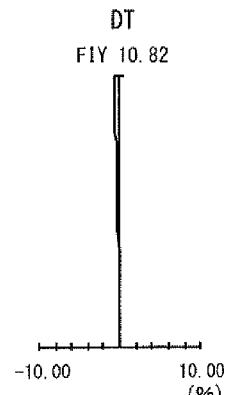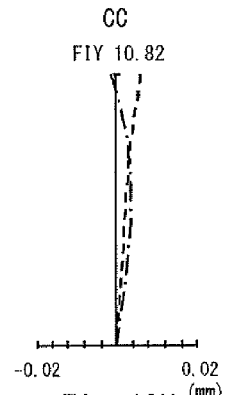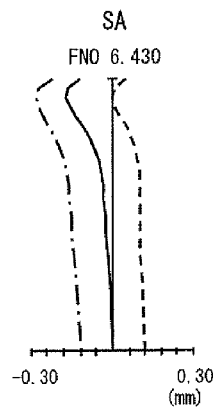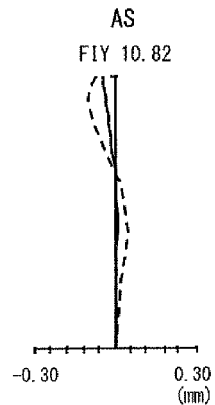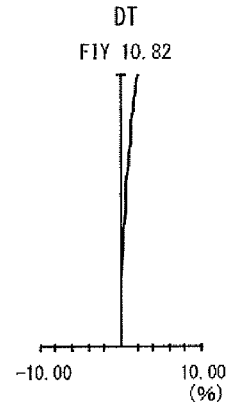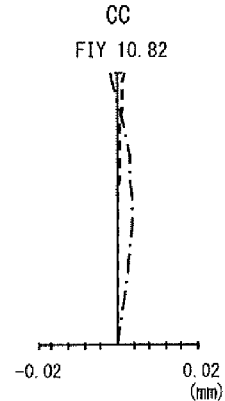

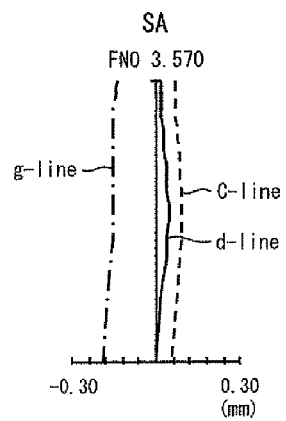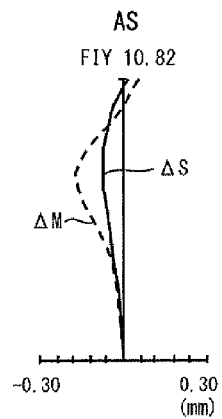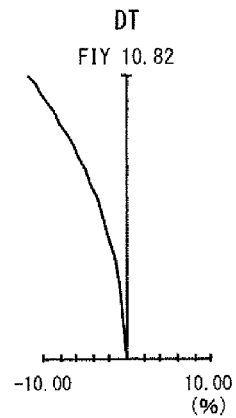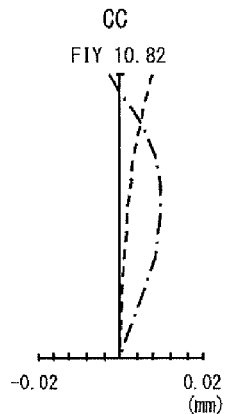
Fig. 12A    Fig. 12B    Fig. 12C    Fig. 12D
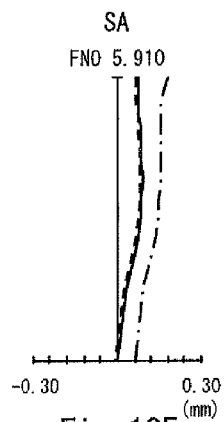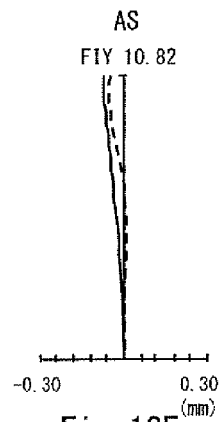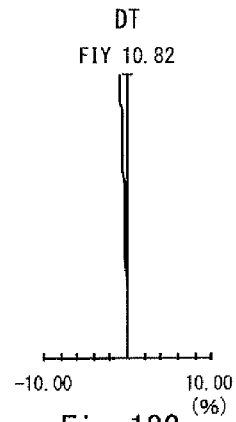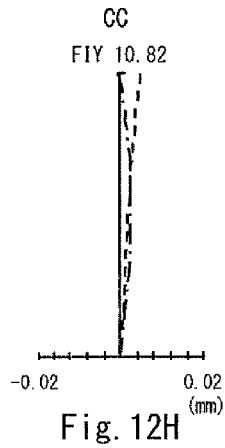
Fig. 12E    Fig. 12F    Fig. 12G    Fig. 12H
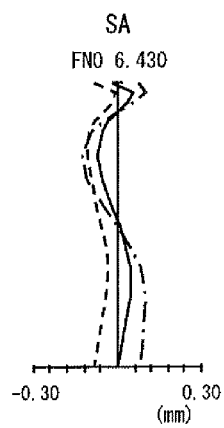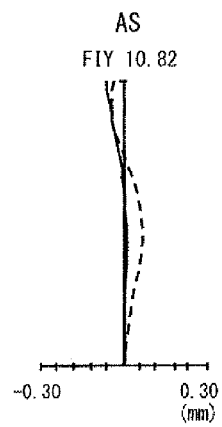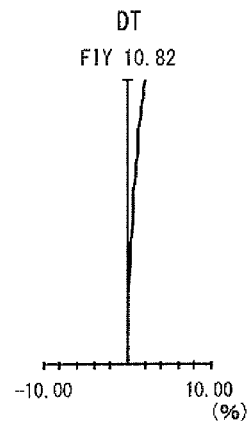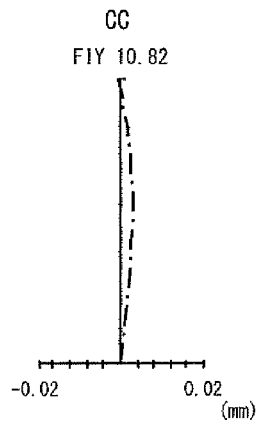
Fig. 12I    Fig. 12J    Fig. 12K    Fig. 12L

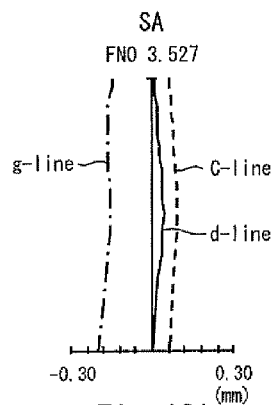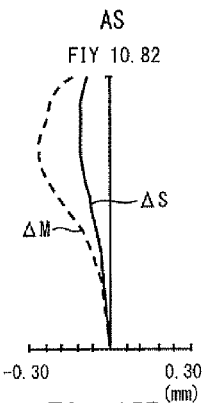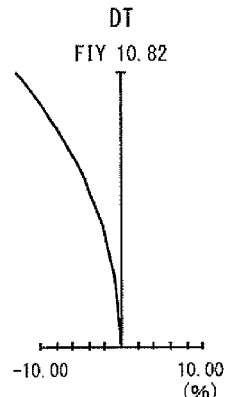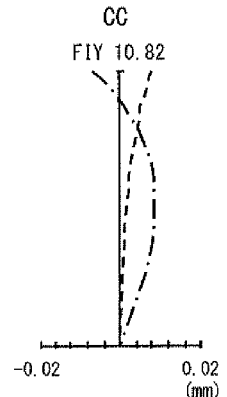
Fig. 13A  Fig. 13B  Fig. 13C  Fig. 13D
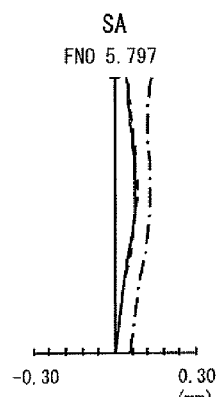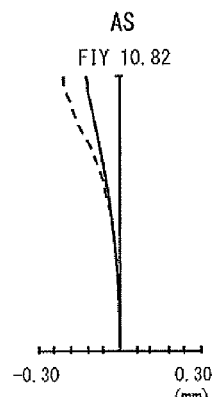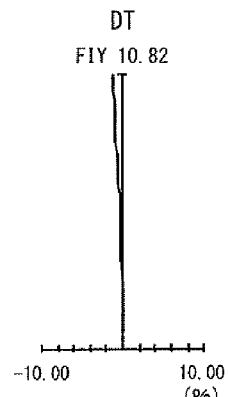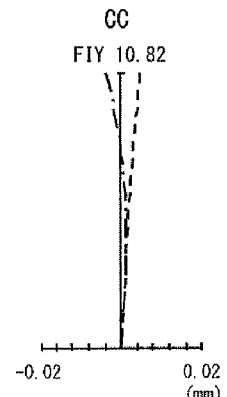
Fig. 13E  Fig. 13F  Fig. 13G  Fig. 13H
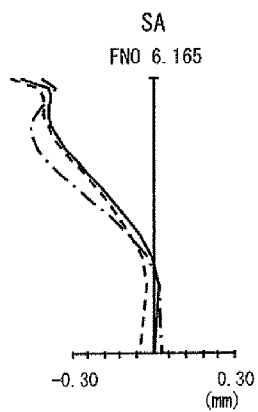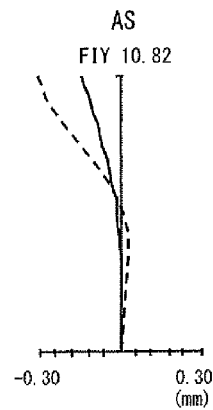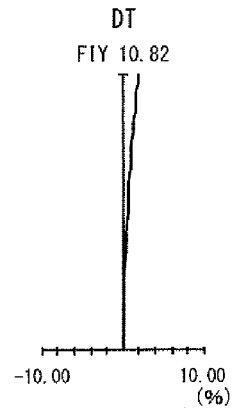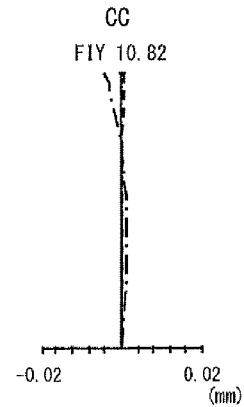
Fig. 13I  Fig. 13J  Fig. 13K  Fig. 13L

ZOOM LENS

This application claims benefit of Japanese Application No. 2011-33632 filed in Japan on Feb. 18, 2011, and Japanese Application No. 2011-97751 filed in Japan on Apr. 26, 2011 the contents of which are incorporated by this reference.

BACKGROUND OF THE INVENTION

The present invention relates to a zoom lens. More particularly, the present invention relates to a zoom lens having a fixed total length that can most suitably be used as interchangeable lens and is advantageous for picking up moving images and also to a zoom lens that can be operated either in the first mode for allowing a wide focusing distance range up to infinity or in the second mode for allowing large imaging magnifications.

There has been a trend of providing digital cameras with a functional capability of picking up moving images in recent years and correspondingly there is a demand for interchangeable lenses that are adaptable to the camera bodies of digital cameras having a function of taking moving pictures.

Conventional still cameras are only required to operate satisfactorily at a good timing for taking a picture. In other words, once the person who is taking a picture determines framing and composition, his or her still camera is only required to put the target for imaging in focus. Thus, the camera is equipped with functions that can achieve this objective. More specifically, still cameras are normally equipped with a phase difference autofocus (AF) function that makes the camera operate quickly and accurately for focusing.

However, as for picking up moving images, most video cameras for consumer use are required to be held in a focusing state by exploiting the AF function, although some professional video cameras may be excepted. A technique referred to as contrast AF method (so-called hill climbing method) using an image sensor is adopted to maintain a focusing state. With this technique, the focus lens is constantly moved forward and backward by a very small distance (an operation referred to as wobbling) from the in-focus position thereof to detect a change in the contrast and, when it is determined that there is a change in the focusing state, the focus lens is appropriately moved to put the focus lens back in focus once again. While the wobbling function constantly maintains the focus lens in focus if the distance between the lens and the target for imaging changes, the focus lens is required to be driven for wobbling at high speed depending on the frame rate of the camera body. In other words, the focus lens that operates for wobbling is required to be lightweight and designed to minimize the range of its wobbling motion. Additionally, such a wobbling operation accompanies a problem of noise generation and the generated noise is recorded as sound particularly when the camera is taking a moving picture. Therefore, how to realize a camera that operates for wobbling in silence is an important problem to be solved. Furthermore, if the image magnification changes remarkably while the focus lens is wobbling, the picked up image appears to be constantly swaying and hence very strange. Therefore, how to reduce the change in the magnification at the time of wobbling is another important problem to be solved.

Negative lead type zoom lenses in which a negative lens group that is advantageous for downsizing the camera is arranged closest to the target for imaging have been proposed. However, according to most of them, the first lens group having a negative refractive power is moved when the magnification is changed from the wide-angle end to the telephoto end. Generally, the first lens group has a large outer diameter and a large number of lenses so that it is heavy. While the heavyweight of the first lens group may not give rise to any problem in the case of manual zooming, a movable heavy first lens group is not desirable for electromotive zoom lenses that are employed for most video cameras. Therefore, it is requested that the first lens group is held unmovable at the time of zooming.

Zoom lenses in which the first lens group having a negative refractive power is held unmovable when changing the magnification (zooming) from the wide-angle end to the telephoto end are known and described in Japanese Patent No. 2,778,232, JP-A-11-167063 and JP-A-2010-211056. These zoom lenses are 5-group zoom lenses having negative, negative, positive, negative and positive lens groups arranged in the above mentioned order from the target for imaging side, in which the third lens group having a positive refractive power is moved toward the target for imaging side and, at the same time, the negative lens groups arranged in front and at the back of the third lens group and the fifth lens group having a positive refractive power are moved to adjust the position of the image surface.

Zoom lenses devised to operate in an imaging mode that enables infinity focusing and zooming and a macro imaging mode that enables imaging with large imaging magnifications are known. For instance, JP-A-2006-301474 discloses a zoom lens in which the lens groups other than the lens located closest to the target for imaging is moved toward the target for imaging in a macro mode to achieve large imaging magnifications.

SUMMARY OF THE INVENTION

In the first aspect of the present invention, there is provided a zoom lens as specified below.

A zoom lens of a fixed total length comprising:
a first lens group having a negative refractive power;
a second lens group having a negative refractive power;
a third lens group having a positive refractive power;
a fourth lens group having a negative refractive power; and
a fifth lens group having a positive refractive power;
arranged in the above mentioned order from the object side; wherein,
at the time of changing the magnification from the wide-angle end toward the telephoto end,
the first lens group is anchored; while
the second lens group is moved; and
the third lens group and the fourth lens group are moved so as to be located at the object side of the telephoto end relative to the wide-angle end; in such a way that
the interval between the second lens group and the third lens group is decreased at the telephoto end relative to the wide-angle end;
the interval between the third lens group and the fourth lens group is increased at the telephoto end relative to the wide-angle end; and
the interval between the fourth lens group and the fifth lens group is increased at the telephoto end relative to the wide-angle end; and,
at the time of focusing a near object point from a remote object point,
the second lens group is moved; and,
the zoom lens satisfies the conditional formula (1-1) shown below:

$$0.5 < (d45T - d45W)/fW < 2.0 \quad (1\text{-}1),$$

where d45W is the interval between the fourth lens group and the fifth lens group at the wide-angle end on the optical axis;

d45T is the interval between the fourth lens group and the fifth lens group at the telephoto end on the optical axis; and fW is the focal length of the entire zoom lens system at the wide-angle end.

Thus, in the first aspect of the present invention, the first lens group of a zoom lens according to the present invention is anchored at the time of changing the magnification from the wide-angle end toward the telephoto end. Since the first lens group that is likely to be heavy is anchored, the load of the motor for driving the zoom lens can be reduced if the zoom lens is an electromotive zoom lens. Additionally, if no drive mechanism is provided for the first lens group, the zoom lens can be radially downsized. Furthermore, the first lens group is so arranged as to prevent the sound produced by the inner zooming from leaking and provide an advantage for reducing the noise level. Thus, at the time of a zooming operation for taking a moving picture, the zooming operation can be made quiet and smooth, particularly if the zoom lens is an electromotive zoom lens. Finally, this arrangement is advantageous when the zoom lens is to be made dustproof and drip-proof.

As for variable magnifications, the zoom lens is so designed that the lens groups can be driven to move so as to decrease the interval between the second lens group and the third lens group and increase the interval between the fourth lens group and the fifth lens group in order to realize a sufficient zooming ratio in a limited space. Thus, a satisfactory magnification boosting function can be achieved with the above arrangement.

The magnification ratio of the zoom lens is changed mostly by moving the third lens group. The combined system of the fourth lens group and the fifth lens group is made to provide a magnification boosting effect by moving the fourth lens group that is disposed at the object side relative to the third lens group to sufficiently exploit the space between the third lens group and the fifth lens group toward the object side and increase the interval between the third lens group and the fourth lens group and the interval between the fourth lens group and the fifth lens group.

As the second lens group is made movable when changing the magnification from the wide-angle end toward the telephoto end, it can be driven in conjunction with the fourth lens group to operate as compensator. With this arrangement, the moving distance of the fourth lens group can be reduced relative to the change in the focal length of the zoom lens to minimize the change, if any, in the optical performance of the zoom lens attributable to a change in the magnification.

With the above-described arrangement of the lens groups, the focusing sensitivity (the quantity of change of the image surface per unit distance of move) can be secured if the refractive power of the second lens group is reduced. To achieve this purpose and also the objective of reducing the weight of the zoom lens and ensure the focusing (more preferably wobbling) function, the second lens group is designed to operate as focus lens group.

At the time of a zooming operation, the interval between the fourth lens group and the fifth lens group is increased. The positions where the fourth lens group and the fifth lens group are arranged particularly influence the astigmatism. The conditional formula (1-1) is for specifying a preferable change in the interval distance between the fourth lens group and the fifth lens for a zooming operation. When the range defined by the conditional formula (1-1) is observed, the magnification boosting effect of the combined system of the fourth lens group and the fifth lens group is secured to a satisfactory level and the change in the astigmatism is minimized. Note that all the conditional formulas including the formula (1-1) and those described below for moving lens groups are for a state where the remotest object point is in focus.

When the value of the conditional formula (1-1) falls below the lower limit value of 0.5, it means that the interval between the fourth lens group and the fifth lens group is decreased to a large extent to make the fourth lens group movable only to a small extent and the magnification changeable only to a small extent or that the fifth lens group is moved to a large extent toward the object side to make downsizing and a large variable range of magnification hardly compatible because the variable range of magnification of the fifth lens group is reduced.

When, on the other hand, the value of the conditional formula (1-1) exceeds the upper limit value of 2.0, it means that the fourth lens group is moved excessively toward the object side or that the fifth lens group is moved excessively toward the image side to provide a disadvantage for correcting astigmatism and downsizing.

For the purpose of the present invention, one of the arrangements listed below is preferably satisfied. More preferably, two or more than two of the arrangements listed below are concurrently satisfied.

Additionally, the second lens group is preferably designed to move toward the image side and subsequently toward the object side when the magnification is changed from the wide-angle end toward the telephoto end.

When the second lens group is moved in the above-described manner, it is possible to minimize the moving speed of the fourth lens group that can become high at the wide-angle side (the distance of move of the fourth lens group relative to the change in the focal length of the zoom lens) with ease to consequently suppress fluctuations of the field curvature in particular. At the telephoto side, as the second lens group is moved toward the object side, a large movable range is secured for the third lens group to provide an advantage for securing the variable magnification ratio of the entire zoom lens.

Additionally, the third lens group is preferably moved in a manner that satisfies the conditional formula (1-2) shown below:

$$2.0 < \Delta 3/fw < 3.0 \tag{1-2},$$

where $\Delta 3$ is the difference between the position at the wide-angle end and the position at the telephoto end of the third lens group, a move toward the object side being indicated by a positive sign.

The conditional formula (1-2) is for specifying a preferable distance of move of the third lens group.

The refractive power of the third lens group can be suppressed to by turn suppress the number of lenses necessary for correcting aberrations with ease by securing a distance of move that does not allow the value of the conditional formula (1-2) to fall below the lower limit value of 2.0.

The total length of the zoom lens can be minimized to provide an advantage for downsizing by suppressing the distance of move of the third lens group so as not to allow the value of the conditional formula (1-2) to exceed the upper limit value of 3.0.

Furthermore, the fourth lens group is preferably moved in a manner that satisfies the conditional formula (1-3) shown below:

$$1.0 < \Delta 4/fw < 1.6 \tag{1-3},$$

where

Δ4 is the difference between the position at the wide-angle end and the position at the telephoto end of the fourth lens group, a move toward the object side being indicated by a positive sign.

The conditional formula (1-3) is for specifying a preferable distance of move of the fourth lens group.

The refractive power of the fourth lens group can be suppressed to by turn suppress the number of lenses necessary for correcting aberrations with ease by not allowing the value of the conditional formula (1-3) to fall below the lower limit value of 1.0.

The distance of move of the fourth lens group is minimized so that the fifth lens group may not be moved to a large extent when operating as compensator to provide an advantage for simplifying the mechanism by not allowing the value of the conditional formula (1-3) to exceed the upper limit value of 1.6.

Additionally, the fifth lens group is preferably moved in a manner that satisfies the conditional formula (1-4) shown below:

$$-0.5 < \Delta 5/fw < 0.5 \quad (1\text{-}4),$$

where

Δ5 is the difference between the position at the wide-angle end and the position at the telephoto end of the fifth lens group, a move toward the object side being indicated by a positive sign.

The conditional formula (1-4) is for specifying a preferable distance of move of the fifth lens group.

An advantage is provided for correcting astigmatisms and chromatic differences of magnification and simplifying the mechanical structure of the zoom lens by minimizing the distance of move of the fifth lens group when the value of the conditional formula (1-4) is not allowed to go beyond neither the lower limit value of −0.5 nor the upper limit value of 0.5.

Furthermore, the fifth lens group is preferably anchored when the magnification is changed from the wide-angle end to the telephoto end.

When the fifth lens group is anchored at the time of changing the magnification from the wide-angle end toward the telephoto end, the entire mirror cell is structurally closed by lenses at the front end and at the rear end to provide an advantage for reducing the noise level and achieving a dust-proof and drip-proof structure.

Furthermore, the second lens group preferably satisfies the conditional formula (1-5) shown below:

$$-6.0 < f2/fw < -2.0 \quad (1\text{-}5),$$

where f2 is the focal length of the second lens group.

The conditional formula (1-5) is for specifying a preferable focal length of the second lens group.

Securing a negative refractive power that does not allow the value of the conditional formula (1-5) to fall below the lower limit value of −6.0 provides an advantage for securing a desirable level of focusing sensitivity and controlling the operation of driving the second lens group so as to suppress the distance of move of the second lens group at the time of focusing with ease.

Suppressing any excessive negative refractive power of the second lens group in order not to allow the value of the conditional formula (1-5) to exceed the upper limit value of −2.0 provides an advantage for minimizing the increase of the number of lenses necessary for correcting aberrations.

Additionally, the first lens group consists of:

two negative meniscus lenses with their concave surfaces directed to the image side and a positive meniscus lens with its convex surface directed to the object side, the lenses being arranged sequentially in the above mentioned order from the object side toward the image side;

wherein the image side surface of at least one of the two negative meniscus lenses is aspheric and the aspheric surface has a profile adapted to gradually reduce the negative refractive power as a function of the distance from the optical axis.

The above lens arrangement is advantages for reducing various aberrations including chromatic aberrations and off-axis aberrations. Additionally, it is advantageous for downsizing because the first lens group can be disposed at the image side relative to the principal point.

Additionally, the second lens group preferably includes a negative lens, the second lens group consisting of a meniscus-shaped lens component with its concave surface facing the object side, the second lens group satisfying the conditional formulas (1-6) and (1-7) shown below:

$$-1.0 < (r2L - r2R)/(r2L + r2R) < -0.4 \quad (1\text{-}6)$$

and $$1.65 < nd2 < 2.15 \quad (1\text{-}7),$$

where r2L is the radius of curvature of the air-contact surface of the second lens group at the object side;

r2R is the radius of curvature of the air-contact surface of the second lens group at the image side;

nd2 is the refractive index at the d-line of one of the negative lenses of the second lens group; and the lens component is a lens block having only two air-contact surfaces on the light path including an air-contact surface at the object side and an air-contact surface at the image side. Note that either a single lens or a cemented lens may be used for the lens block.

According to the present invention, the second lens group can operate for focusing from a long distance to a short distance as it is let out toward the object side. With the above-described arrangement, the second lens group can be made lightweight with ease to provide an advantage for driving the lens group for focusing (for wobbling) at high speed.

The conditional formula (1-6) is for specifying a preferable shape of the negative meniscus lens component of the second lens group.

The shape of the second lens group can influence on fluctuations of the spherical aberration at the time of focusing operation. The appearance of spherical aberration at the telephoto side can advantageously be minimized particularly for short distances when the value of the conditional formula (1-6) is not allowed to go beyond neither the lower limit value of −1.0 nor the upper limit value of −0.4. Additionally, the change in the size on the imaging surface can be minimized when the second lens group is driven to move to provide an advantage for wobbling.

The conditional formula (1-7) is for specifying a preferable refractive index of one of the negative lenses of the second lens group.

A desirable value can be obtained for the Petzval sum to provide an advantage for correcting the field curvature by securing a refractive index that does not fall below the lower limit value of 1.65.

The glass material cost can be minimized with ease to provide a cost-related advantage by suppressing the refractive index so as not to allow the value of the conditional formula (1-7) to exceed the upper limit value of 2.15.

Furthermore, the second lens group is formed by a single negative meniscus lens with its concave surface facing the object side. This arrangement provides an advantage for cost reduction and energy saving.

Additionally, the third lens group consists of:

an object side auxiliary lens group including a positive lens and having an aspheric surface and a positive refractive power and an image side auxiliary lens group including a negative lens, the lens groups being arranged in the above mentioned order from the object side, an aperture diaphragm is arranged between the object side auxiliary lens group and the image side auxiliary lens group, and the third lens group preferably satisfies the conditional formula (1-8) shown below:

$$0.7 < f3f/f3 < 1.3 \qquad (1-8),$$

where $f3f$ is the focal length of the object side auxiliary lens group; and $f3$ is the focal length of the third lens group.

With the arrangement of the lens groups according to the present invention, the third lens group takes an important role for changing magnifications. Therefore, the third lens group likely shows a large refractive power. Additionally, two lens groups having a negative refractive power are arranged side by side at the object side in the zoom lens. Furthermore, as an aperture diaphragm is arranged in the third lens group and an object side auxiliary lens group having a positive refractive power is arranged at the object side, the appearance of distortion can be suppressed with ease, while minimizing the size of the entire optical system. Still additionally, the provision of an aspheric surface at the object side auxiliary lens group provides an advantage for correcting spherical aberrations.

Then, arranging an image side auxiliary lens group having a negative lens at the image side of the aperture diaphragm provides an advantage for correcting aberrations of the third lens group. Additionally, the principal point of the third lens group can be located at the object side to consequently secure a desired variable magnification ratio.

The aspheric surface in the object side auxiliary lens group preferably is of a shape that gradually reduces the positive refractive power as a function of the distance from the optical axis from the viewpoint of correcting spherical aberrations.

The conditional formula (1-8) is for specifying a preferable focal length for the object side auxiliary lens group.

It is preferable to make the object side auxiliary lens group bear the refractive power of the third lens group by making the value of the conditional formula (1-8) not exceed the upper limit value of 1.3. The light flux diverged by the first and second lens groups is converged by the strong positive refractive power of the object side auxiliary lens group in the third lens group to provide an advantage for reducing the diameter of the downstream aperture diaphragm and that of the downstream lenses.

The appearance of spherical aberrations can be suppressed with ease by minimizing any excessive positive refractive power of the object side auxiliary lens group and making the value of the conditional formula (1-8) not fall below the lower limit value of 0.7.

Additionally, the image side auxiliary lens group in the third lens group preferably includes a positive lens; and satisfies the conditional formulas (1-9), (1-10) and (1-11) shown below from the viewpoint of correcting aberrations:

$$65 < vd3bp < 96 \qquad (1-9),$$

$$1.75 < nd3bn < 2.05 \qquad (1-10)$$

and $$20 < vd3bn < 55 \qquad (1-11),$$

where vd3 bp is the Abbe number at the d-line of one of the positive lenses in the image side auxiliary lens group of the third lens group; and nd3bn and vd3bn are the refractive index at the d-line and the Abbe number at the d-line of one of the negative lenses in the image side auxiliary lens group of the third lens group.

Preferably, the absolute value of the refractive power of the image side auxiliary lens group is reduced so as to make the image side auxiliary lens group satisfy the conditional formula (1-8). The image side auxiliary lens group is important for correcting chromatic aberrations and preferably includes at least a positive lens and a negative lens.

The conditional formula (1-9) is for specifying a desirable Abbe number for one of the positive lenses included in the image side auxiliary lens group.

Chromatic aberrations can advantageously be minimized by making the Abbe number take a large value so as not to allow the value of the conditional formula (1-9) to fall below the lower limit value of 65.

The cost of the glass material can advantageously be minimized by not allowing the value of the conditional formula (1-9) to exceed the upper limit value of 96.

The conditional formula (1-10) is for specifying a desirable refractive index for one of the negative lenses included in the image side auxiliary lens group.

It is possible to suppress any possible degradation of the Petzval sum and provide an advantage for correcting the field curvature by raising the refractive index of the negative lens so as not to allow the value of the conditional formula (1-10) to fall below the lower limit value of 1.75.

The cost of the glass material can be minimized by not allowing the value of the conditional formula (1-10) to exceed the upper limit value of 2.05.

The conditional formula (1-11) is for specifying a desirable Abbe number for one of the negative lenses included in the image side auxiliary lens group.

The effect of correcting chromatic aberrations by the negative lens can advantageously be secured and the refractive index of the glass material can be secured with ease to provide an advantage for correcting aberrations by reducing the Abbe number of the negative lens so as not to allow the value of the conditional formula (1-11) to exceed the upper limit value of 55.

Any chromatic aberrations can be corrected with ease by securing a satisfactory Abbe number for the negative lens so as not to allow the value of the conditional formula (1-11) to fall below the lower limit value of 20 and suppressing the abnormal dispersion property of the glass material.

Furthermore, the third lens groups preferably consists of a positive lens, a positive lens, a negative lens and a positive lens or, alternatively, of a positive lens, a negative lens and a positive lens arranged from the object side toward the image side in the above mentioned order. Then, the number of component lenses can be reduced to provide an advantage for correcting aberrations.

Preferably, the fourth lens group includes a negative lens and the fourth lens group includes a negative lens component of a negative refractive power having an image side concave surface with a curvature greater than the absolute value of the object side curvature, the fifth lens group includes a positive meniscus lens with its convex surface facing the image side, and at least either the fourth lens group or the fifth lens group has an aspheric surface.

The lens component is a lens block having only two air-contact surfaces on the optical path including an object side air-contact surface and an image side air-contact surface.

According to the present invention, the changeability of the interval between the fourth lens group and the fifth lens group is secured. For this reason, the ray height of the principal ray that corresponds to the maximum image height is high at the wide-angle side and low at the telephoto side in the fourth lens group. On the other hand, the ray height is conversely low at the wide-angle side and high at the telephoto side in the fifth lens group.

Thus, it is effective for correcting aberrations over the entire range of variable magnification to make the fourth lens group take a shape that is advantageous for correcting aberrations at the wide-angle side and make the fifth lens group take a shape that is advantageous for correcting aberrations at the telephoto side. The above-described shape arrangement for the fourth and fifth lens groups provides an advantage for reducing fluctuations of the field curvature, distortion and chromatic difference of magnification at the time of changing the magnification.

Furthermore, preferably, the fourth lens group consists of a single lens having a negative refractive power and the fifth lens group consists of a single lens having a positive refractive power. This arrangement provides an advantage for reducing the weight and the cost of the zoom lens.

Preferably, the fourth lens group satisfies the conditional formulas (1-12), (1-13) and (1-14) shown below:

$$0.4 < (r4L - r4R)/(r4L + r4R) < 1.6 \qquad (1\text{-}12),$$

$$1.65 < nd4 < 2.05 \qquad (1\text{-}13)$$

and $$20 < vd4 < 60 \qquad (1\text{-}14),$$

where r4L is the radius of curvature of the object side air-contact surface of the negative lens component in the fourth lens group;

r4R is the radius of curvature of the image side air-contact surface of the negative lens component in the fourth lens group; and nd4 and vd4 are respectively the refractive index at the d-line and the Abbe number at the d-line of one of the negative lenses in the negative lens component of the fourth lens group;

the lens component being a lens block having only two air-contact surfaces on the optical path including an object side air-contact surface and an image side air-contact surface. Note that either a single lens or a cemented lens may be used for the lens block.

The conditional formula (1-12) is for specifying a desirable shape for the negative lens component in the fourth lens group.

It is advantageous for reducing the distortion at the wide-angle side when the value of the conditional formula (1-12) is not allowed to fall below the lower limit value of 0.4.

The refractive power of the fourth lens group can be reduced with ease to provide an advantage for downsizing the outer diameter and correcting the aberration of the fifth lens group by not allowing the value of the conditional formula (1-12) to exceed the upper limit value of 1.6.

The conditional formula (1-13) is for specifying a desirable refractive index for the negative lens in the fourth lens group.

It is possible to suppress degradation of the Petzval sum to provide an advantage for correcting the field curvature by securing a refractive index that does not allow the value of the conditional formula (1-13) to fall below the lower limit value of 1.65.

It is advantageous for reducing the cost of the glass material when the value of the conditional formula (1-13) is not allowed to exceed the upper limit value of 2.05.

The conditional formula (1-14) is for specifying a desirable Abbe number for the negative lens in the fourth lens group.

It is possible to secure a desired value for the refractive index with ease to provide an advantage for correcting the field curvature when the value of the conditional formula (1-14) is not allowed to exceed the upper limit value of 60.

It is advantageous for reducing the cost of the glass material when the value of the conditional formula (1-14) is not allowed to fall below the lower limit value of 20.

Preferably, the fifth lens group satisfies the conditional formula (1-15) shown below:

$$15 < vd5 < 30 \qquad (1\text{-}15),$$

where vd5 is the Abbe number at the d—line of the positive meniscus lens in the fifth lens group.

The conditional formula (1-15) is for specifying a desirable Abbe number for the positive meniscus lens in the fifth lens group. Satisfying the above conditional formula (1-15) is advantageous for correcting the chromatic difference of magnification particularly at the telephoto side.

It is advantageous for preventing the influence of the abnormal dispersion property of the glass material when the value of the above conditional formula (1-15) is not allowed to exceed the upper limit value of 30.

It is advantageous for reducing the cost of the glass material when the value of the conditional formula (1-15) is not allowed to fall below the lower limit value of 15.

The functional features of a zoom lens in the first aspect of the present invention are secured when a plurality of the above requirements are satisfied simultaneously.

Additionally, the functional features of a zoom lens in the first aspect of the present invention are secured when the scopes of the values of the conditional formulas as listed below are observed.

With regard to the conditional formula (1-1), the lower limit value is preferably 0.7, more preferably 0.9 and the upper limit value is preferably 1.7, more preferably 1.4.

With regard to the conditional formula (1-2), the lower limit value is preferably 2.2, more preferably 2.35 and the upper limit value is preferably 2.8, more preferably 2.6.

With regard to the conditional formula (1-3), the lower limit value is preferably 1.05, more preferably 1.08 and the upper limit value is preferably 1.5, more preferably 1.4.

With regard to the conditional formula (1-4), the lower limit value is preferably −0.3, more preferably −0.2 and the upper limit value is preferably 0.3, more preferably 0.2.

With regard to the conditional formula (1-5), the lower limit value is preferably −5.0, more preferably −4.0 and the upper limit value is preferably −2.5, more preferably −3.0.

With regard to the conditional formula (1-6),
the lower limit value is preferably −0.98 and
the upper limit value is preferably −0.5, more preferably −0.65.

With regard to the conditional formula (1-7),
the lower limit value is preferably 1.69, more preferably 1.74 and
the upper limit value is preferably 2.05, more preferably 1.95.

With regard to the conditional formula (1-8),
the lower limit value is preferably 0.8, more preferably 0.9 and
the upper limit value is preferably 1.25, more preferably 1.2.

With regard to the conditional formula (1-9),
the lower limit value is preferably 67, more preferably 69 and
the upper limit value is preferably 90, more preferably 84.

With regard to the conditional formula (1-10),
the lower limit value is preferably 1.79, more preferably 1.82 and
the upper limit value is preferably 2.0, more preferably 1.95.

With regard to the conditional formula (1-11),
the lower limit value is preferably 25, more preferably 30 and
the upper limit value is preferably 45, more preferably 40.

With regard to the conditional formula (1-12),
the lower limit value is preferably 0.55, more preferably 0.7 and
the upper limit value is preferably 1.4, more preferably 1.2.

With regard to the conditional formula (1-13),
the lower limit value is preferably 1.67, more preferably 1.69 and
the upper limit value is preferably 1.95, more preferably 1.85.

With regard to the conditional formula (1-14),
the lower limit value is preferably 30, more preferably 40 and
the upper limit value is preferably 57, more preferably 54.

With regard to the conditional formula (1-15),
the lower limit value is preferably 17, more preferably 18.5 and
the upper limit value is preferably 27.

In the second aspect of the present invention, there is provided a zoom lens as specified below.

A zoom lens having a macro mode of either a first mode allowing zooming and focusing including infinity or a second mode allowing obtaining an imaging magnification absolute value greater than 0.25 times, the zoom lens including:

a lens group A having a positive refractive power;

a lens group B having a negative refractive power and arranged at the image side relative to the lens group A so as to be neighbored by the lens group A with an interval of air interposed between them;

a focus lens group having a negative refractive power and arranged at the object side relative to the lens group A so as to be movable in the direction of the optical axis in an focusing operation; and an object side lens group having a negative refractive power and arranged at the object side relative to the focus lens group so as to change the distance between itself and the focus lens group at the time of the focusing operation;

wherein, in the first mode, at the time of zooming from the wide-angle end to the telephoto end, the lens group A is adapted to move so as to be located at the object side to reduce the distance between itself and the focus lens group at the telephoto end rather than at the wide-angle end; and the lens group B is adapted to move relative to the position of the lens group A so as to be located at the object side to increase the distance between itself and the lens group A at the telephoto end rather than at the wide-angle end;

the zoom lens operating for focusing including infinity focusing by moving the focus lens group having a negative refractive power in the direction of the optical axis; and in the second mode, the lens group A is located within the moving range for zooming from the wide-angle end to the telephoto end; and the lens group B is located at the image side relative to the position of the lens group B corresponding to the position of the lens group A at the time of zooming and at the object side relative to the position of the lens group B at the wide-angle end;

the zoom lens operating for focusing by moving the focus lens group having a negative refractive power in the direction of the optical axis.

As the lens group A having a positive refractive power and the lens group B having a negative refractive power are moved to the object side in association with each other, while broadening the interval between them, they can perform the function of a variator and that of a compensator, suppressing fluctuations of aberrations.

Additionally, as the focus lens group is arranged at the object side relative to the lens group A and at the image side of the object side lens group having a negative refractive power, even if the refractive power of the focus lens group is reduced, the zoom lens can operate for short-distance focusing while securing its optical performances.

In the second mode that enables macro imaging, the position of the lens group A and that of the lens group B are within their respective moving ranges in the first mode. Therefore, the lens group A and the lens group B are not required to move beyond the respective moving ranges in the first mode for the purpose of setting the second mode. Thus, the arrangement necessary for moving the lens groups can be minimized to provide an advantage for realizing a light weight zoom lens.

Additionally, the focus lens group can be commonly used both in the first mode and in the second mode so that the refractive power of the focus lens group can be reduced. Therefore, the zoom lens can operate for focusing both in the first mode and in the second mode with a stable image quality and a reduced power consumption rate. The advantages of the zoom lens can be effectively provided even when the focus lens group is operated also as wobbling lens group.

For the purpose of the present invention, one of the arrangements listed below is preferably satisfied. More preferably, two or more than two of the arrangement listed below are concurrently satisfied.

Preferably, a zoom lens in the second aspect of the present invention satisfies the conditional formula (2-1) shown below:

$$0.2 < f \text{obj}/f \text{focus} < 5.0 \qquad (2\text{-}1),$$

where f obj is the focal length of the object side lens group; and
f focus is the focal length of the focus lens group.

The conditional formula (2-1) is for specifying a desirable ratio of the refractive power of the object side lens group to that of the focus lens group.

Aberrations of the focus lens group can be suppressed with ease by suppressing the negative refractive power of the focus lens group so as not to allow the value of the conditional formula (2-1) to fall below the lower limit value of 0.2.

The moving distance of the focus lens group at the time of focusing can be reduced with ease by securing the negative refractive power of the focus lens group so as not to allow the value of the conditional formula (2-1) to exceed the upper limit value of 5.0.

Additionally, a zoom lens in the second aspect of the present invention preferably satisfies the conditional formula (2-2) shown below:

$$1.2 < DAwt/DBwt < 3.0 \qquad (2\text{-}2),$$

where

DAwt is the difference between the position of the lens group A at the telephoto end and the position of the lens group A at the wide-angle end; and DBwt is the difference between the position of the lens group B at the telephoto end and the position of the lens group B at the wide-angle end.

The conditional formula (2-2) is for specifying a desirable ratio of the move of the lens group A to that of the lens group B.

The lens group B can advantageously provide the effect of functioning as compensator when the value of the conditional formula (2-2) is allowed neither to fall below the lower limit value of 1.2 nor to exceed the upper limit value of 3.0.

Additionally, a zoom lens in the second aspect of the present invention preferably satisfies the conditional formula (2-3) shown below:

$$0 \leq MBm2/DABm2 < 1.8 \qquad (2\text{-}3),$$

where

MBm2 is the difference between the position of the lens group B in the second mode and the position of the lens group B at the wide-angle end; and DABm2 is the distance between the lens group A and the lens group B in the second mode.

The moving range of the lens group B is preferably reduced so as not to allow the value of the conditional formula (2-3) to fall below the lower limit value of 0 from the view point of mechanical arrangement of the zoom lens.

The imaging magnification can be increased with ease in the second mode by securing the interval between the lens group A and the lens group B in the second mode so as not to allow the value of the conditional formula (2-3) to exceed the upper limit value of 1.8.

Furthermore, a zoom lens in the second aspect of the present invention preferably satisfies the conditional formula (2-4) shown below:

$$0.4 < MBm2/MBm1 < 0.96 \qquad (2\text{-}4),$$

where

MBm2 is the difference between the position of the lens group B in the second mode and the position of the lens group B at the wide-angle end; and MBm1 is the difference between the position of the lens group B in the first mode when the lens group A is located at the position same as the position of the lens group A in the second mode and the position of the lens group B at the wide-angle end.

The influence of astigmatism and spherical aberration can be suppressed with ease when the first mode is switched to the second mode by not allowing the value of the conditional formula (2-4) to fall below the lower limit value of 0.4.

The imaging magnification can advantageously be improved in the second mode by not allowing the value of the conditional formula (2-4) to exceed the upper limit value of 0.96.

Furthermore, a zoom lens in the second aspect of the present invention preferably satisfies the conditional formula (2-5) shown below:

$$0.5 < MAm2/DAwt < 0.98 \qquad (2\text{-}5),$$

where

MAm2 is the difference between the position of the lens group A in the second mode and the position of the lens group A at the wide-angle end; and DAwt is the difference between the position of the lens group A at the telephoto end and the position of the lens group A at the wide-angle end.

The imaging magnification can advantageously be improved in the second mode when the value of the conditional formula (2-5) is not allowed to fall below the lower limit value of 0.5.

The degree of freedom of the moving range of the focus lens group in the second mode can be secured to provide an advantage for securing a focusable range for the target for imaging in the second mode when the value of the conditional formula (2-5) is not allowed to exceed the upper limit value of 0.98.

Additionally, the object side lens group is preferably anchored at the time of the zooming and focusing.

The object side lens group is apt to have a large volume. No mechanism will be required for driving the object side lens group to provide an advantage for reducing the cost when the lens group is anchored.

Furthermore, the object side lens group is preferably the lens group that is arranged at the most object side in the zoom lens.

As a negative lens group is arranged at the most object side, securing a satisfactory view angle at the wide-angle end and downsizing advantageously become compatible.

Preferably, the zoom lens additionally includes an aperture diaphragm arranged between the air interval immediately in front of the lens group A at the object side and the image side air interval of the lens group A and located at the object side at the telephoto end rather than at the wide-angle end.

With the above-described arrangement, the diameter of the lend group A can be reduced with ease to provide an advantage for downsizing while securing the movable range of the lens group A and that of the lens group B.

Furthermore, at the time of zooming from the wide-angle end to the telephoto end, it is preferable that the focus lens group moves toward the image side and subsequently toward the object side so as to change the distance between the object side lens group and the focus lens group.

With the above-described arrangement, the focus lens group can be made to have a function of compensator to provide an advantage for reducing fluctuations of the field curvature.

Preferably, the focus lens group consists of a lens component whose inside is filled with a medium.

This arrangement provides an advantage for reducing the weight of the focus lens group.

Furthermore, preferably, the zoom lens additionally includes a lens group C arranged at the image side relative to the lens group B and having a positive refractive power, the distance between itself and the lens group B changing at the time of the zooming.

Off-axis rays of light are refracted by the lens group B in directions moving away from the optical axis. However, the angles formed by such off-axis rays of light and the optical axis are reduced as they are refracted by the lens group C having a positive refractive power. Then, as a result, it is possible to move the exit pupil away from the imaging surface with ease and hence shadings can be alleviated with ease.

Preferably, the lens group C is a lens group arranged at the most image side in the zoom lens and is rigidly anchored at the time of the zooming and focusing.

No mechanism will be required for driving the lens group C to provide an advantage for reducing the cost when the lens group C is anchored. When the zoom lens is used as an interchangeable lens to replace the lens that is currently in position, the above-described arrangement is advantageous for preventing dust form entering the inside of the zoom lens system and for reducing the noise that is generated when the lens is driven for operation.

Preferably, the zoom lens includes:

the object side lens group, the focus lens group, the lens group A, the lens group B and the lens group C having a positive refractive power, sequentially arranged in the above mentioned order from the object side;

wherein the object side lens group and the lens group C are rigidly anchored at the time of the zooming and focusing.

As the lens group that is located at the most object side and the lens group that located at the most image side are rigidly anchored, advantageously, dust is prevented from entering the lens system and the noise that is generated at the time of driving one or more than one lens groups is reduced.

Preferably, the focus lens group is moved toward the image side and subsequently toward the object side at the time of the zooming.

The focus lens group can be provided with a function of compensator to provide an advantage for reducing fluctuations of the field curvature.

Furthermore, preferably, the focus lens group is rigidly anchored at the time of the zooming.

With the above-described arrangement, the number of lens groups that are driven to move can be reduced at the time of zooming to provide an advantage for simplifying the overall configuration. For example, when each of the lens groups that are driven to move is equipped with a drive motor, the number of drive motors at the time of zooming can be reduced to two to provide an advantage for reducing the power consumption rate.

Preferably, the zoom lens further includes a lens group D having a positive refractive power and arranged at the object side relative to the object side lens group in such a way that the distance between the lens group D and the object side lens group changes at the time of the zooming.

The above-described arrangement provides an advantage for correcting distortions that can easily be produced by the object side lens group and the focus lens group.

Preferably, two or more than two of the above requirements are satisfied simultaneously.

Additionally, the functional features of a zoom lens in the second aspect of the present invention are secured when the scopes of the values of the conditional formulas as listed below are observed.

With regard to the conditional formula (2-1),
the lower limit value is preferably 0.6, more preferably 0.8 and
the upper limit value is preferably 2.0, more preferably 1.3.
With regard to the conditional formula (2-2),
the lower limit value is preferably 1.5, more preferably 1.8 and
the upper limit value is preferably 2.7, more preferably 2.3.
With regard to the conditional formula (2-3), the upper limit value is preferably 1.6, more preferably 1.5.

With regard to the conditional formula (2-4),
the lower limit value is preferably 0.55, more preferably 0.7 and
the upper limit value is preferably 0.93, more preferably 0.9.
With regard to the conditional formula (2-5),
the lower limit value is preferably 0.7, more preferably 0.85 and
the upper limit value is preferably 0.96, more preferably 0.94.

BRIEF DESCRIPTION OF THE DRAWINGS

FIG. 6 is a schematic illustration of aberrations of the zoom lens of Example 1-1 of the present invention (with regard to an object point at infinity);

FIG. 7 is a schematic illustration of aberrations of the zoom lens of Example 1-1 of the present invention (for imaging distance: 0.35 m);

FIG. 9 is a schematic illustration of aberrations of the zoom lens of Example 1-2 of the present invention (for imaging distance: 0.35 m);

FIG. 10 is a schematic illustration of aberrations of the zoom lens of Example 1-3 of the present invention (with regard to an object point at infinity);

FIG. 12 is a schematic illustration of aberrations of the zoom lens of Example 1-4 of the present invention (with regard to an object point at infinity);

FIG. 13 is a schematic illustration of aberrations of the zoom lens of Example 1-4 of the present invention (for imaging distance: 0.35 m);

DESCRIPTION OF EXEMPLARY EMBODIMENTS

Figure 1:
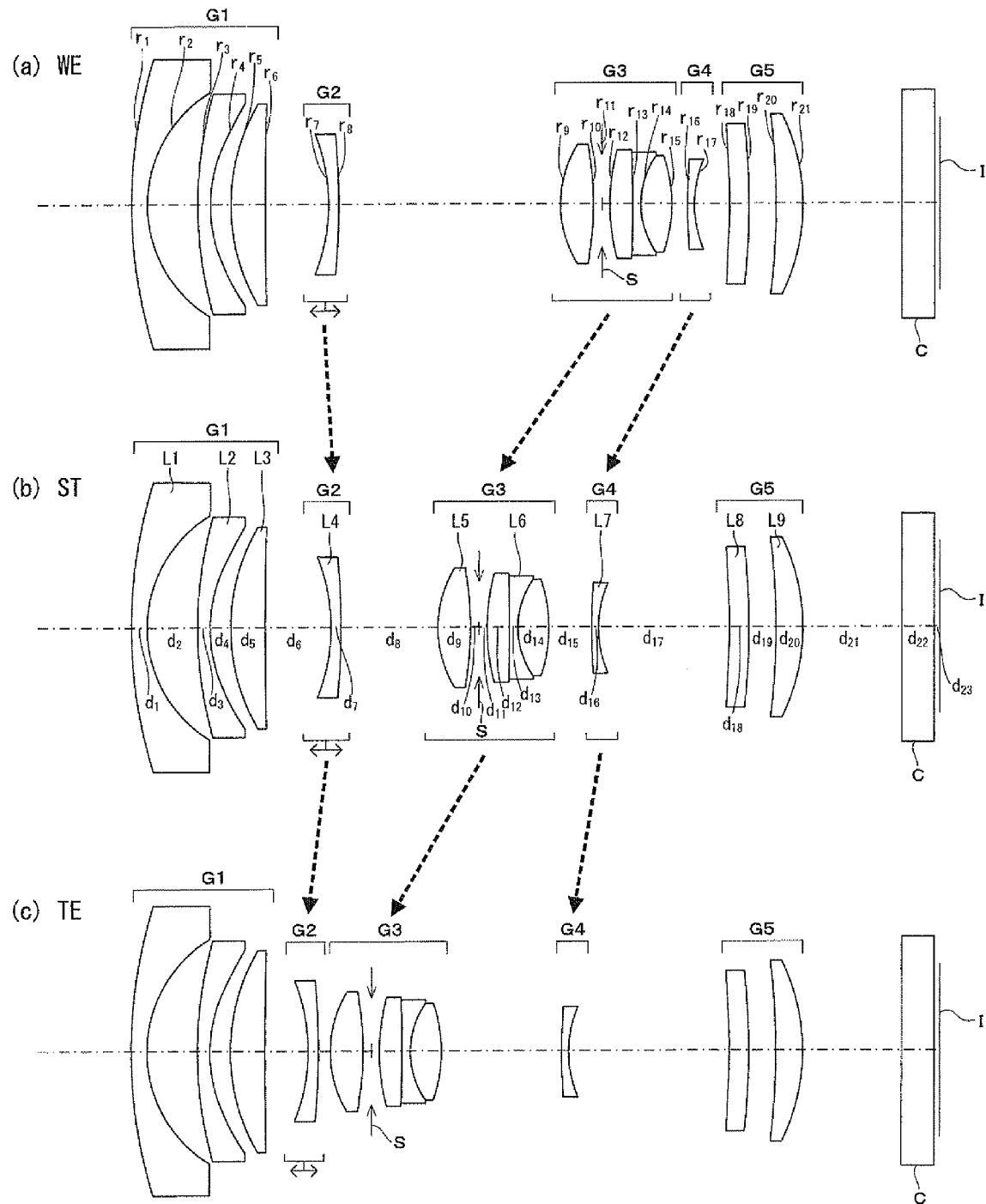
FIG. 1 is a schematic cross-sectional view taken along the optical axis of the zoom lens that is exploded of Example 1-1 of the present invention.

Now, Examples 1-1 through 1-5 of zoom lens in the first aspect of the present invention will be described below by referring to the drawings. FIGS. 1 through 5 are schematic cross-sectional views taken along the optical axis of the zoom lenses that are exploded of Examples 1-1 through 1-5 of the present invention. In each of the figures, (a) shows the zoom lens at the wide-angle end (WE) and (b) shows the zoom lens in an intermediate state (ST) and (c) shows the zoom lens at the telephoto end (TB). In each of the figures, I denotes the image surface and C denotes the cover glass (which is a parallel and flat plate).

Each of the Examples described below is a zoom lens having five lens groups that are a negative lens group, a negative lens group, a positive lens group, a negative lens group and a positive lens group arranged in the above mentioned order from the object side to the image side, of which the first lens group G1 is held immovable and the second lens group G2 is provided with a focusing function and a wobbling function.

In each of FIGS. 1 through 5, the laterally directed arrow shown below the second lens group G2 illustrates that the second lens group G2 finely oscillates back and forth for a wobbling operation.

Each of the arrows directed from (a) to (b) illustrates how the corresponding lens group is driven to move when the state of the zoom lens is shifted from the state shown in (a) to the state shown in (b).

Each of the arrows directed from (b) to (c) illustrates how the corresponding lens group is driven to move when the state of the zoom lens is shifted from the state shown in (b) to the state shown in (c).

Note that each of the arrows indicating how the corresponding lens group is driven to move does not necessarily show the trajectory of the lens group during an operation of changing the magnification.

For example, the second lens group G2 may be so designed as to be driven to make a reciprocating movement of moving toward the image side once and then back to the proper position when the state of the zoom lens is shifted from the state shown in (a) to the state shown in (b).

The second lens group G2 may be so designed as to be driven to make a reciprocating movement of moving toward the image side once and then back to the proper position when the state of the zoom lens is shifted from the state shown in (b) to the state shown in (c).

The fourth lens group G4 may be so designed as to be driven to make a reciprocating movement of moving toward the object side once and then back to the proper position when the state of the zoom lens is shifted from the state shown in (b) to the state shown in (c).

The fifth lens group G5 may be so designed as to be driven to make a reciprocating movement of moving toward the image side once and then back to the proper position when the state of the zoom lens is shifted from the state shown in (b) to the state shown in (c).

In any instance, a zoom lens in the first aspect of the present invention is a compact and high-performance standard zoom lens. Particularly, it will most suitably be used in an application of an interchangeable lens system of a digital camera because it operates as a zoom lens capable of taking a moving image. More specifically, it is a compact and high-performance standard zoom lens having a variable magnification ratio of about 4 and a view angle of not less than 80° at the wide-angle end. In other words, it secures a wide view angle.

Example 1-1

FIG. 1 is a schematic cross-sectional view of the zoom lens of Example 1-1. As shown in FIG. 1, the zoom lens of Example 1-1 includes a first lens group G1 having a negative power, a second lens group G2 having a negative power, a third lens group G3 having a positive power, a fourth lens group G4 having a negative power and a fifth lens group G5 having a positive power arranged in the above mentioned order from the object side to the image side.

The first lens group G1 is formed by a negative meniscus lens L1 with its convex surface facing the object side, a negative meniscus lens L2 having two aspheric surfaces with its convex surface facing the object side and a positive meniscus lens L3 with its convex surface facing the object side.

The second lens group G2 is formed by a negative meniscus lens L4 with its convex surface facing the image side.

The third lens group G3 is formed by a positive double convex lens L5 having two aspheric surfaces, an aperture S and a cemented lens L6 (lens block) of three lenses including a positive lens, a negative lens and a positive lens.

The fourth lens group G4 is formed by a negative meniscus lens L7 with its concave surface facing the image side.

The fifth lens group G5 is formed by a meniscus lens L8 made of plastic and having two aspheric surfaces and a positive meniscus lens L9 with its convex surface facing the image side.

When zooming, the second lens group G2 through the fourth lens group G4 are driven to move independently but the first lens group G1 and the fifth lens group G5 are anchored relative to the image surface. The second lens group G2 is responsible for focusing operations and wobbling operations. When shifting the focus from infinity to a short distance, the second lens group G2 is driven to move toward the object side.

When zooming from the wide-angle side toward the telephoto side, the second lens group G2 is driven to move so as to increase the interval between itself and the first lens group G1 and subsequently reduce the interval and the third lens group G3 is driven to move so as to reduce the interval between itself and the second lens group G2, while the fourth lens group G4 is driven to move so as to increase the interval between itself and the third lens group G3 and also increase the interval between itself and the fifth lens group G5.

Example 1-2

Figure 2:
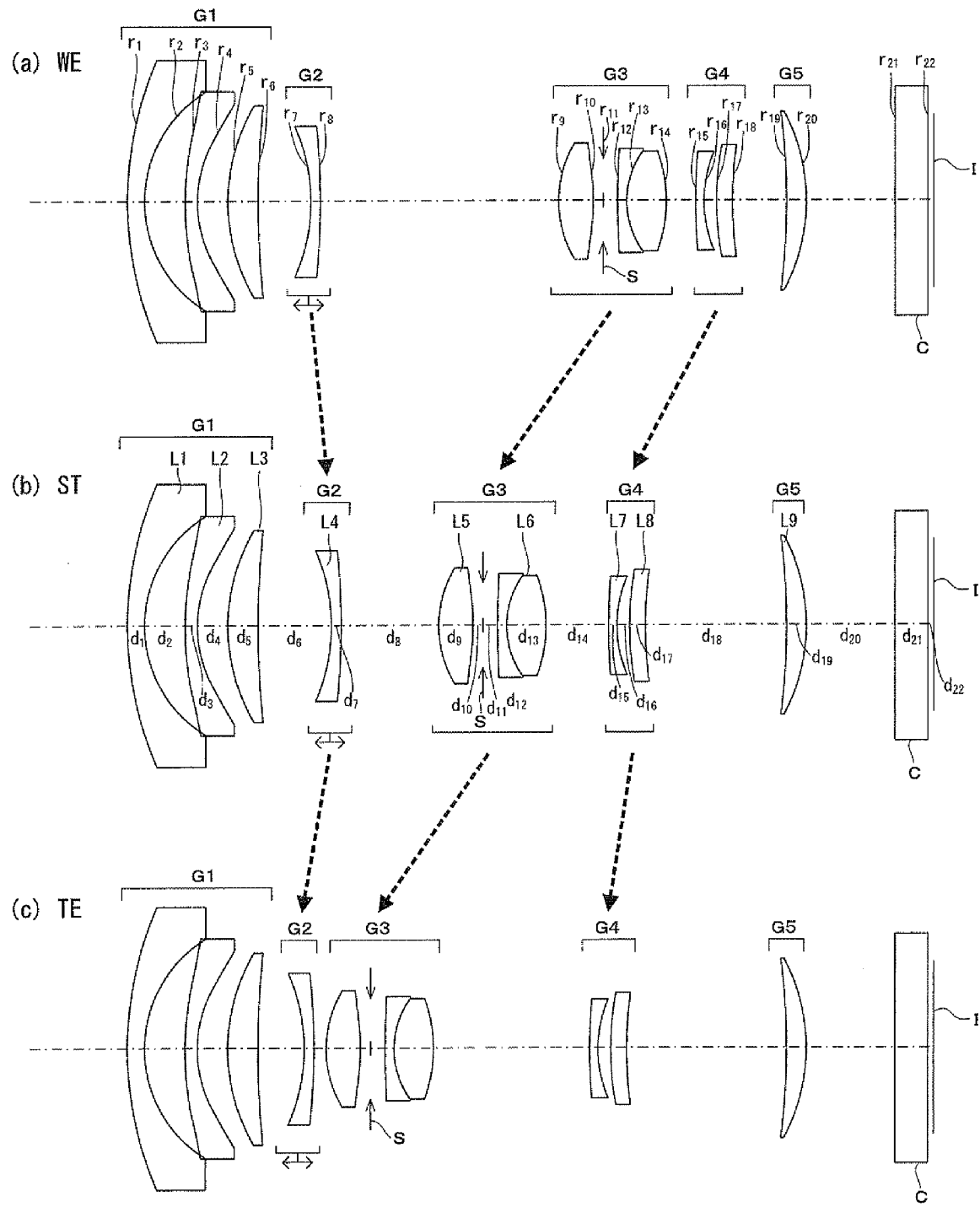
FIG. 2 is a schematic cross-sectional view taken along the optical axis of the zoom lens that is exploded of Example 1-2 of the present invention.

FIG. 2 is a schematic cross-sectional view of the zoom lens of Example 1-2. The zoom lens of Example 1-2 includes a first lens group G1 having a negative power, a second lens group G2 having a negative power, a third lens group G3 having a positive power, a fourth lens group G4 having a negative power and a fifth lens group G5 having a positive power.

The first lens group G1 is formed by a negative meniscus lens L1 with its convex surface facing the object side, a negative meniscus lens L2 having two aspheric surfaces with its convex surface facing the object side and a positive meniscus lens L3 with its convex surface facing the object side.

The second lens group G2 is formed by a negative meniscus lens L4 with its convex surface facing the image side.

The third lens group G3 is formed by a positive double convex lens L5 having two aspheric surfaces, an aperture S and a cemented lens L6 (lens block) of two lenses including a negative lens and a positive lens.

The fourth lens group G4 is formed by a negative meniscus lens L7 with its concave surface facing the image side and a meniscus lens L8 made of plastic and having two aspheric surfaces.

The fifth lens group G5 is formed by a positive meniscus lens L9 with its convex surface facing the image side.

When zooming, the second lens group G2 through the fourth lens group G4 are driven to move independently but the first lens group G1 and the fifth lens group G5 are anchored relative to the image surface. The second lens group G2 is responsible for focusing operations and wobbling operations. When shifting the focus from infinity to a short distance, the second lens group G2 is driven to move toward the object side.

When zooming from the wide-angle side toward the telephoto side, the second lens group G2 is driven to move so as to increase the interval between itself and the first lens group G1 and subsequently reduce the interval and the third lens group G3 is driven to move so as to reduce the interval between itself and the second lens group G2, while the fourth lens group G4 is driven to move so as to increase the interval between itself and the third lens group G3 and also increase the interval between itself and the fifth lens group G5.

Example 1-3

Figure 3:
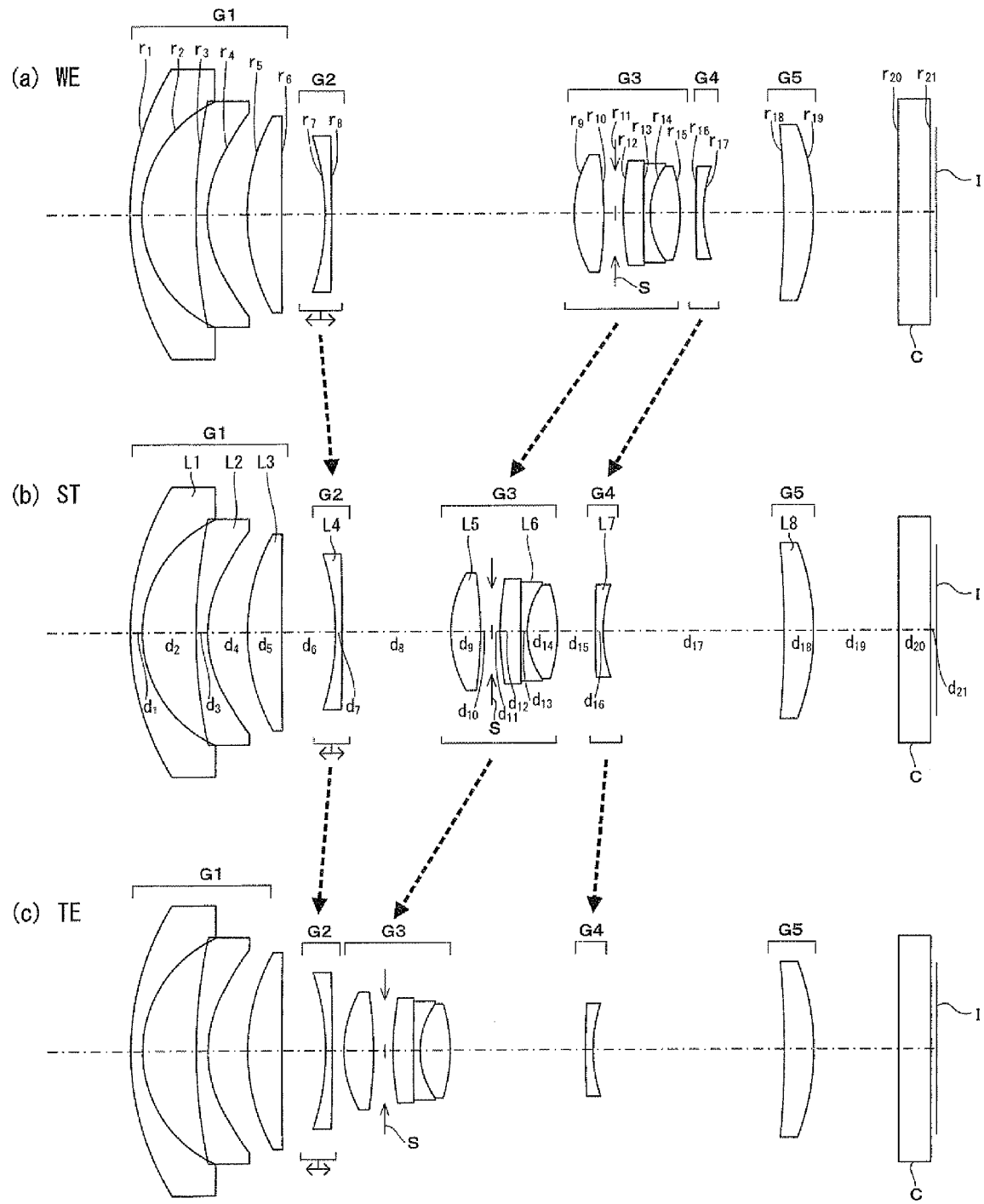
FIG. 3 is a schematic cross-sectional view taken along the optical axis of the zoom lens that is exploded of Example 1-3 of the present invention.

FIG. 3 is a schematic cross-sectional view of the zoom lens of Example 1-3. The zoom lens of Example 1-3 includes a first lens group G1 having a negative power, a second lens group G2 having a negative power, a third lens group G3 having a positive power, a fourth lens group G4 having a negative power and a fifth lens group G5 having a positive power.

The first lens group G1 is formed by a negative meniscus lens L1 with its convex surface facing the object side, a negative meniscus lens L2 having two aspheric surfaces with its convex surface facing the object side and a positive meniscus lens L3 with its convex surface facing the object side.

The second lens group G2 is formed by a negative meniscus lens L4 with its convex surface facing the image side.

The third lens group G3 is formed by a positive double convex lens L5 having two aspheric surfaces, an aperture S and a cemented lens L6 (lens block) of three lenses including a positive lens, a negative lens and a positive lens.

The fourth lens group G4 is formed by a negative lens L7 having two aspheric surfaces with its concave surface facing the image side.

The fifth lens group G5 is formed by a positive meniscus lens L8 with its convex surface facing the image side.

When zooming, the second lens group G2 through the fourth lens group G4 are driven to move independently but the first lens group G1 and the fifth lens group G5 are anchored relative to the image surface. The second lens group G2 is responsible for focusing operations and wobbling operations. When shifting the focus from infinity to a short distance, the second lens group G2 is driven to move toward the object side.

When zooming from the wide-angle side toward the telephoto side, the second lens group G2 is driven to move so as to increase the interval between itself and the first lens group G1 and subsequently reduce the interval and the third lens group G3 is driven to move so as to reduce the interval between itself and the second lens group G2, while the fourth lens group G4 is driven to move so as to increase the interval between itself and the third lens group G3 and also increase the interval between itself and the fifth lens group G5.

Example 1-4

Figure 4:
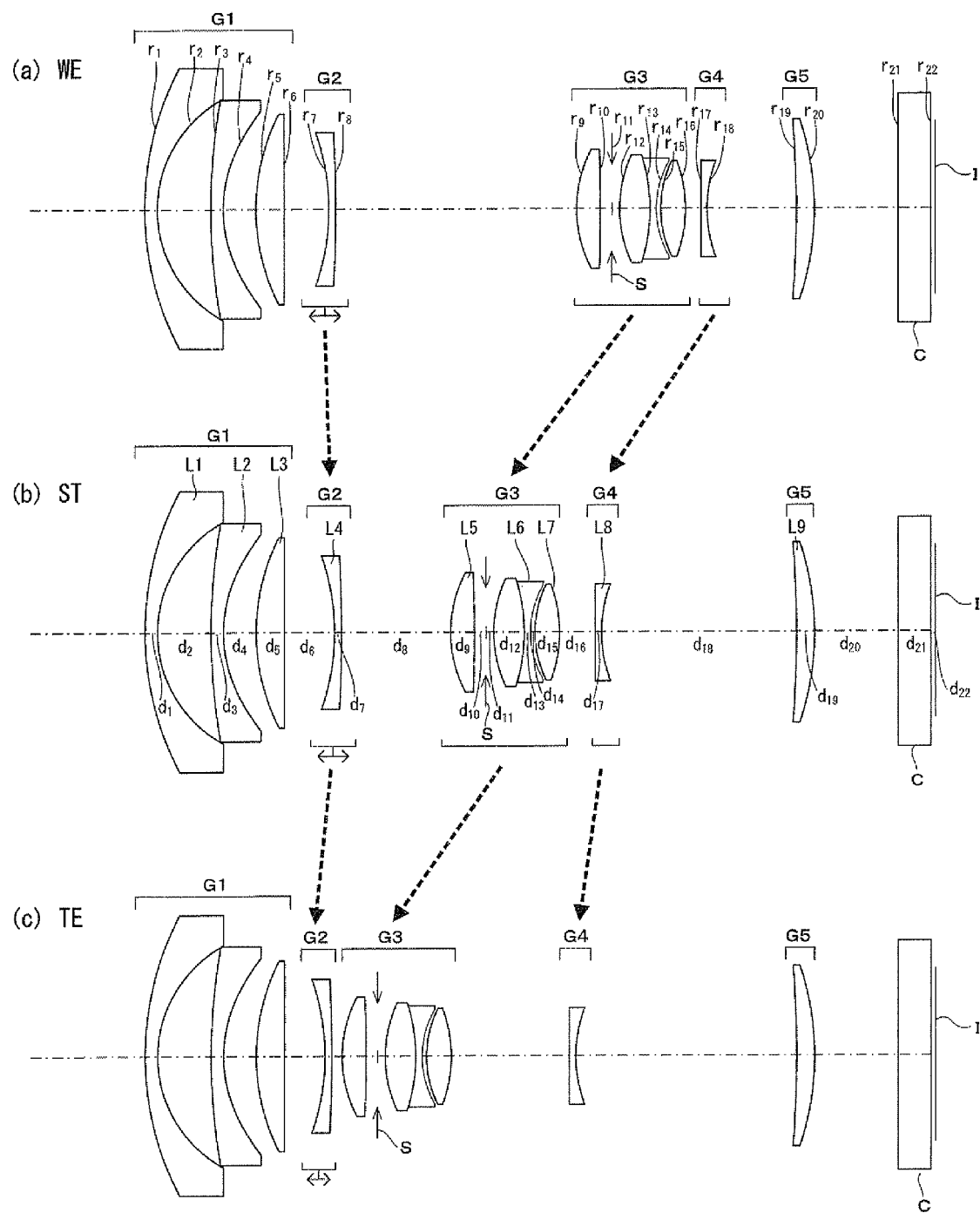
FIG. 4 is a schematic cross-sectional view taken along the optical axis of the zoom lens that is exploded of Example 1-4 of the present invention.

FIG. 4 is a schematic cross-sectional view of the zoom lens of Example 1-4. The zoom lens of Example 1-4 includes a first lens group G1 having a negative power, a second lens group G2 having a negative power, a third lens group G3 having a positive power, a fourth lens group G4 having a negative power and a fifth lens group G5 having a positive power.

The first lens group G1 is formed by a negative meniscus lens L1 with its convex surface facing the object side, a negative meniscus lens L2 having two aspheric surfaces with its convex surface facing the object side and a positive meniscus lens L3 with its convex surface facing the object side.

The second lens group G2 is formed by a negative meniscus lens L4 with its convex surface facing the image side.

The third lens group G3 is formed by a positive double convex lens L5 having aspheric surface, an aperture S, a cemented lens L6 (lens block) of two lenses including a positive lens and a negative lens and a positive lens L7 having two aspheric surfaces.

The fourth lens group G4 is formed by a negative lens L8 having two aspheric surfaces with its strong concave surface facing the image side.

The fifth lens group G5 is formed by a positive meniscus lens L9 with its convex surface facing the image side.

When zooming, the second lens group G2 through the fourth lens group G4 are driven to move independently but the first lens group G1 and the fifth lens group G5 are anchored relative to the image surface. The second lens group G2 is responsible for focusing operations and wobbling operations. When shifting the focus from infinity to a short distance, the second lens group G2 is driven to move toward the object side.

When zooming from the wide-angle side toward the telephoto side, the second lens group G2 is driven to move so as to increase the interval between itself and the first lens group G1 and subsequently reduce the interval and the third lens group G3 is driven to move so as to reduce the interval between itself and the second lens group G2, while the fourth lens group G4 is driven to move so as to increase the interval Example 1-5

Figure 5:
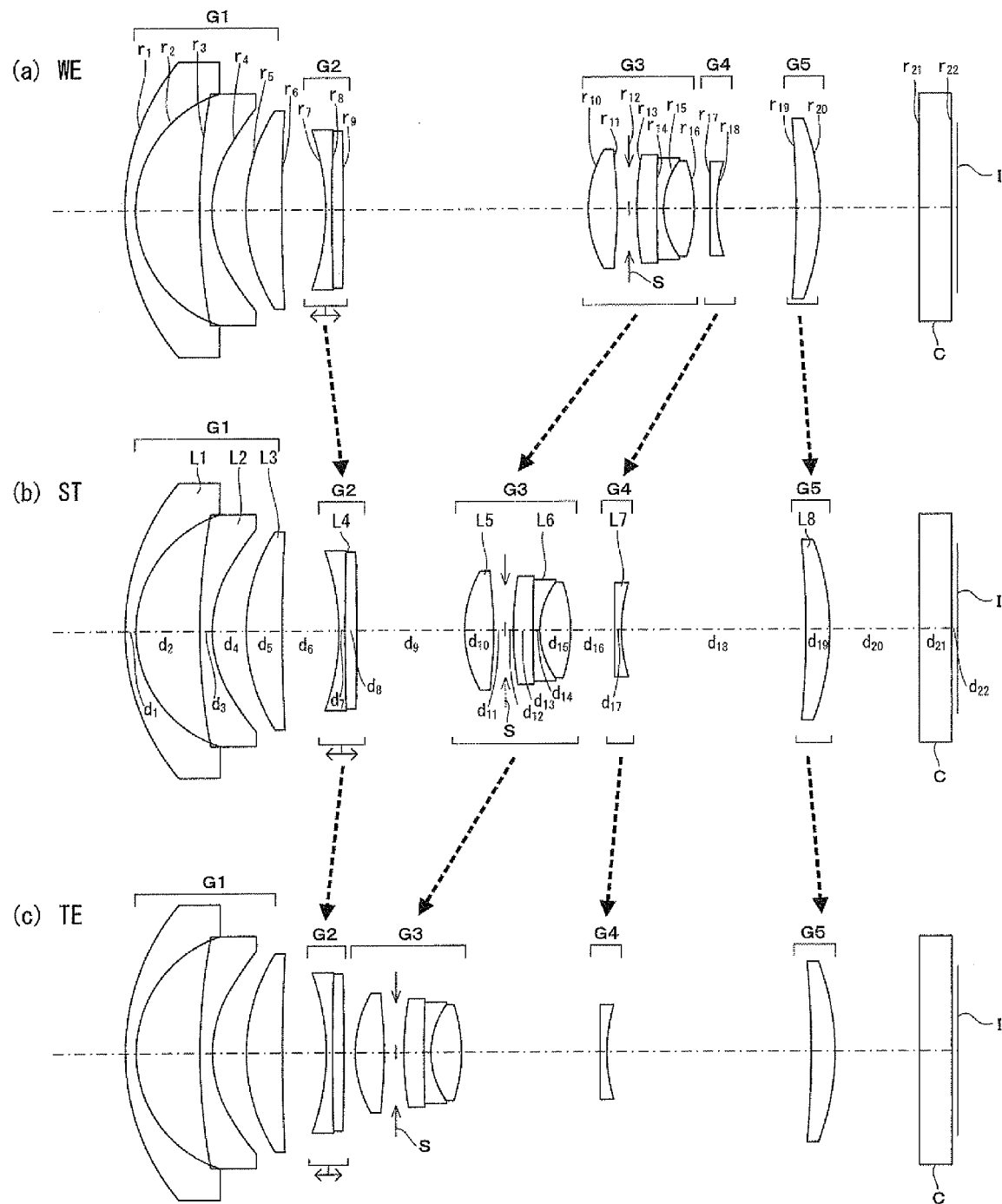
FIG. 5 is a schematic cross-sectional view taken along the optical axis of the zoom lens that is exploded of Example 1-5 of the present invention.
Figure 8A:
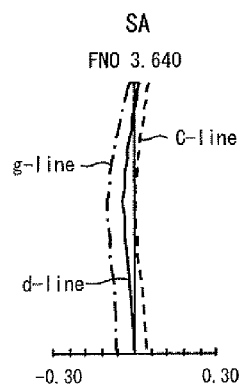
FIG. 8 is a schematic illustration of aberrations of the zoom lens of Example 1-2 of the present invention (with regard to an object point at infinity)
Figure 8B:
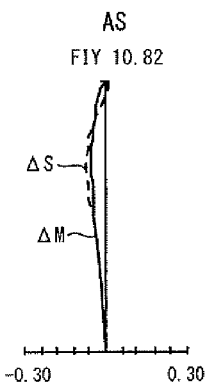
Figure 8C:
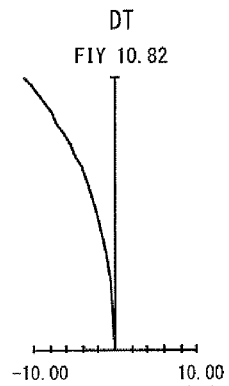
Figure 8D:
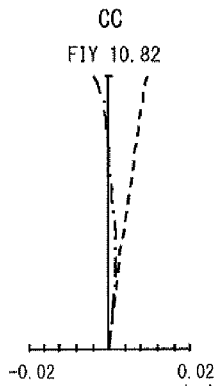
Figure 8E:
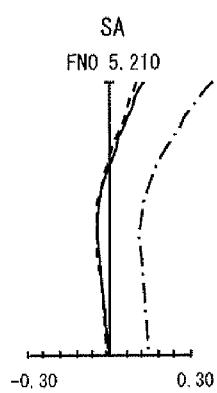
Figure 8F:
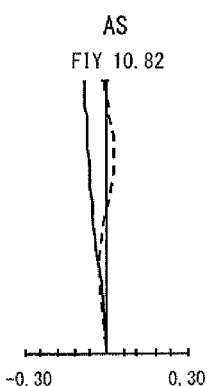
Figure 8G:
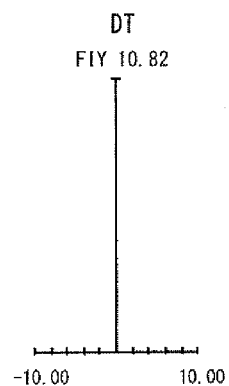
Figure 8H:
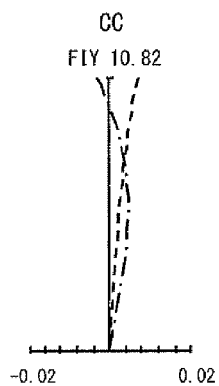
Figure 8I:
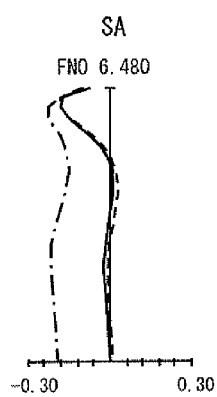
Figure 8J:
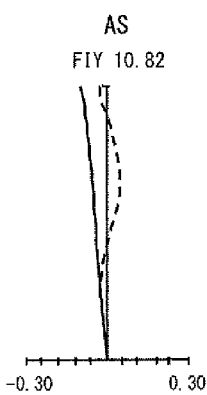
Figure 8K:
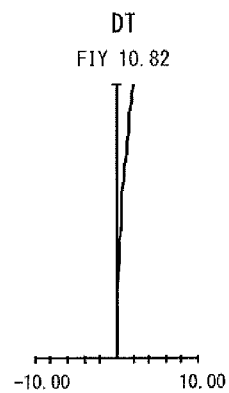
Figure 8L:
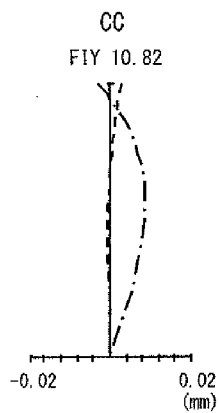
Figure 11A:
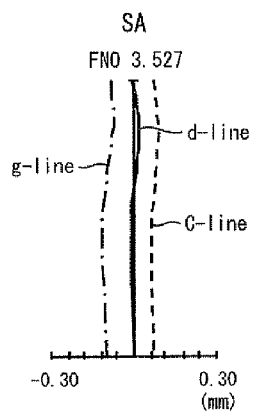
FIG. 11 is a schematic illustration of aberrations of the zoom lens of Example 1-3 of the present invention (for imaging distance: 0.35 m)
Figure 11B:
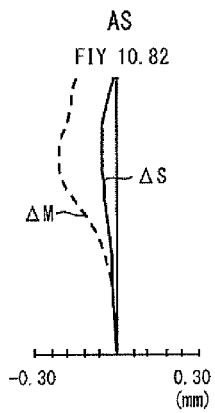
Figure 11C:
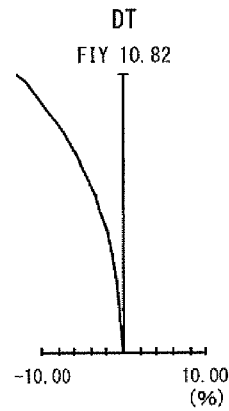
Figure 11D:
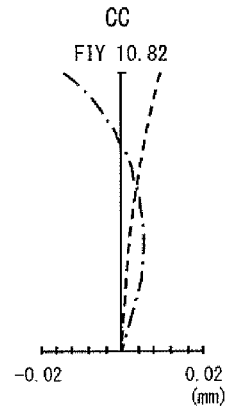
Figure 11E:
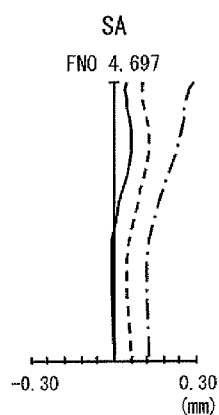
Figure 11F:
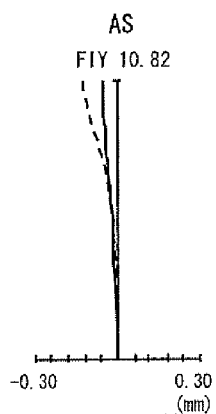
Figure 11G:
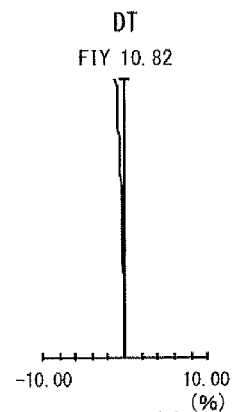
Figure 11H:
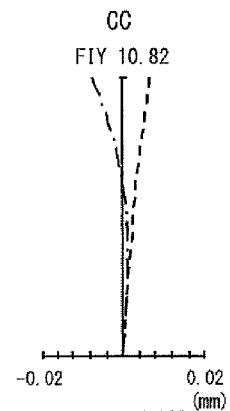
Figure 11I:
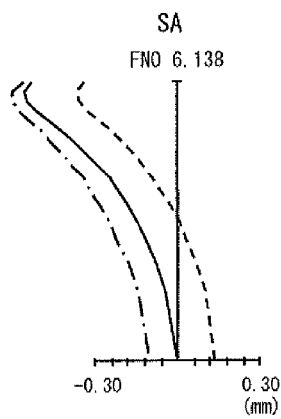
Figure 11J:
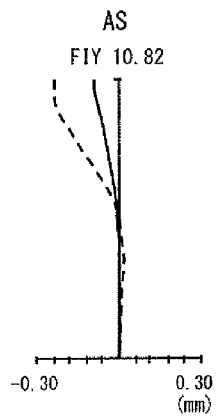
Figure 11K:
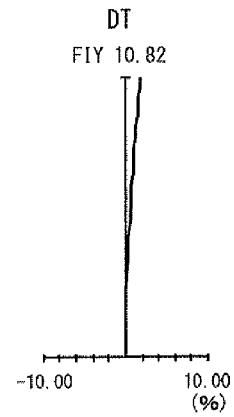
Figure 11L:
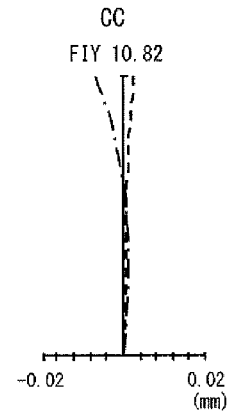
Figure 14A:
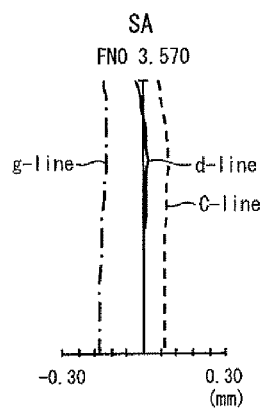
FIG. 14 is a schematic illustration of aberrations of the zoom lens of Example 1-5 of the present invention (with regard to an object point at infinity)
Figure 14B:
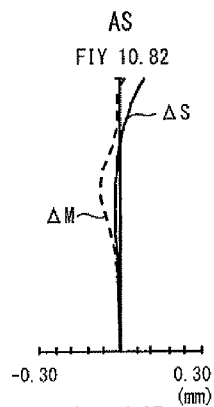
Figure 14C:
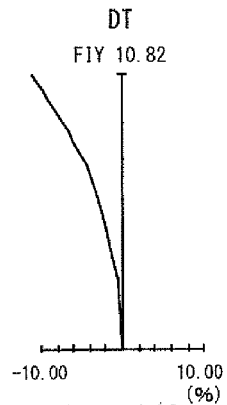
Figure 14D:
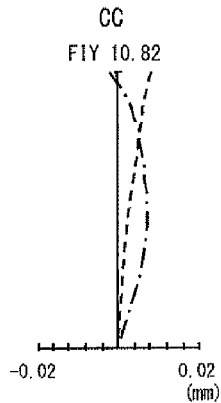
Figure 14E:
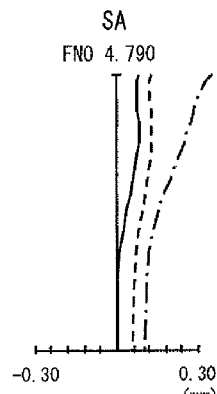
Figure 14F:
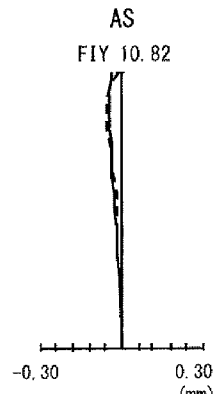
Figure 14G:
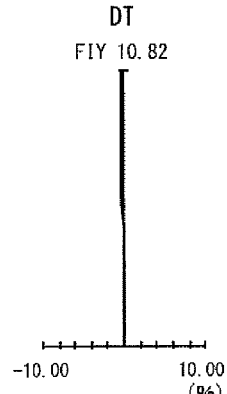
Figure 14H:
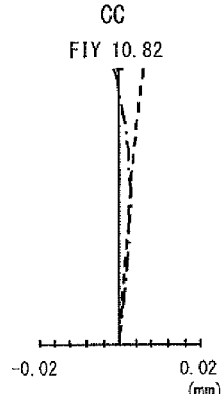
Figure 14I:
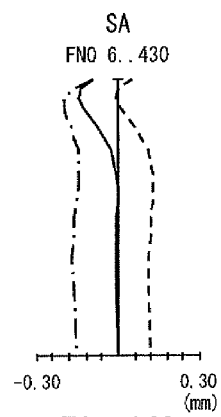
Figure 14J:
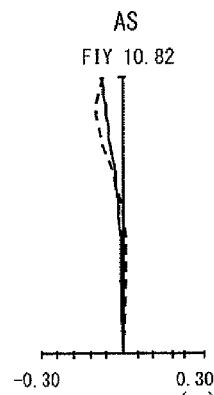
Figure 14K:
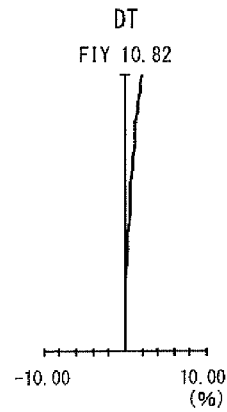
Figure 14L:
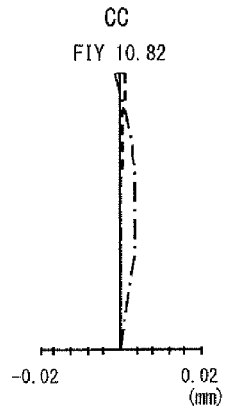
Figure 15A:
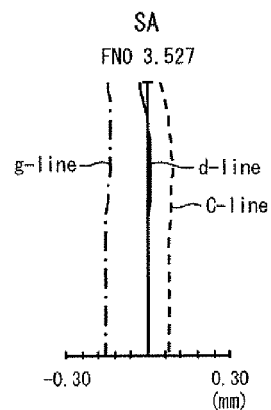
FIG. 15 is a schematic illustration of aberrations of the zoom lens of Example 1-5 of the present invention (for imaging distance: 0.35 m)
Figure 15B:
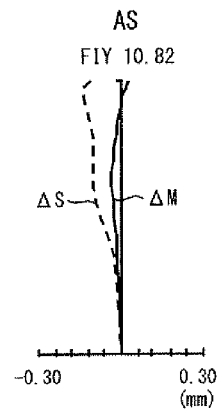
Figure 15C:
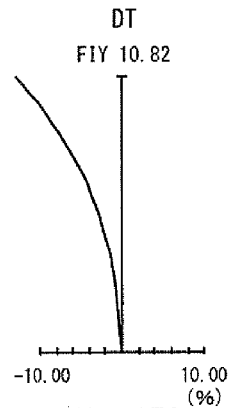
Figure 15D:
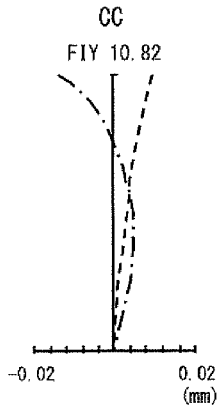
Figure 15E:
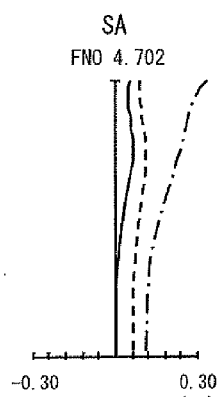
Figure 15F:
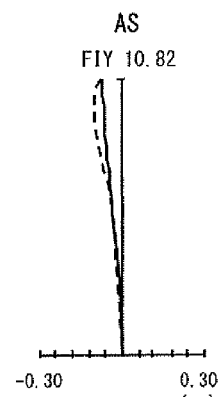
Figure 15G:
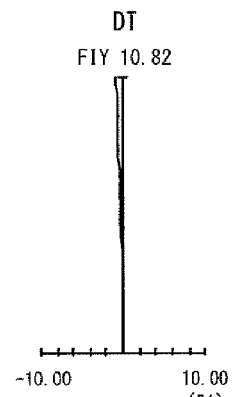
Figure 15H:
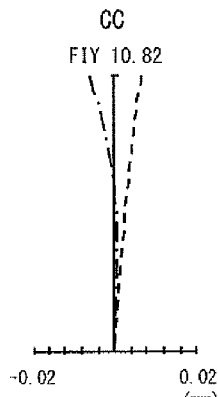
Figure 15I:
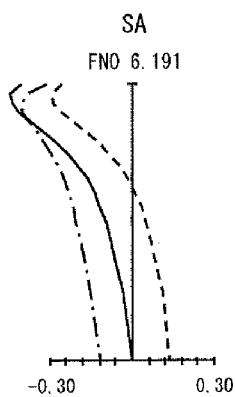
Figure 15J:
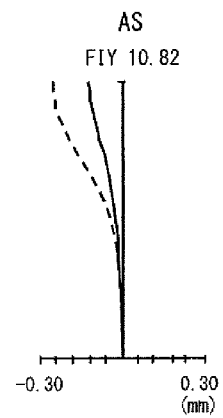
Figure 15K:
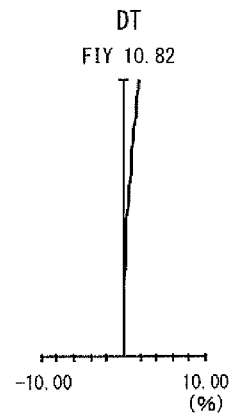
Figure 15L:
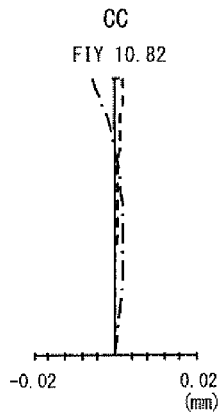

FIG. 5 is a schematic cross-sectional view of the zoom lens of Example 1-5. The zoom lens of Example 1-5 includes a first lens group G1 having a negative power, a second lens group G2 having a negative power, a third lens group G3 having a positive power, a fourth lens group G4 having a negative power and a fifth lens group G5 having a positive power.

The first lens group G1 is formed by a negative meniscus lens L1 with its convex surface facing the object side, a negative meniscus lens L2 having two aspheric surfaces with its convex surface facing the object side and a positive meniscus lens L3 with its convex surface facing the object side.

The second lens group G2 is formed by a cemented lens L4 (lens block) of two lenses including a negative lens and a positive lens.

The third lens group G3 is formed by a positive double convex lens L5 having two aspheric surfaces, an aperture S and a cemented lens (lens block) L6 of three lenses including a positive lens, a negative lens and a positive lens.

The fourth lens group G4 is formed by a negative lens L7 having two aspheric surfaces with its strong concave surface facing the image side.

The fifth lens group G5 is formed by a positive meniscus lens L8 with its convex surface facing the image side.

When zooming, the second lens group G2 through the fifth lens group G5 are driven to move independently but the first lens group G1 is anchored relative to the image surface. The second lens group G2 is responsible for focusing operations and wobbling operations. When shifting the focus from infinity to a short distance, the second lens group G2 is driven to move toward the object side.

When zooming from the wide-angle side toward the telephoto side, the second lens group G2 is driven to move so as to increase the interval between itself and the first lens group G1 and subsequently reduce the interval and the third lens group G3 is driven to move so as to reduce the interval between itself and the second lens group G2, while the fourth lens group G4 is driven to move so as to increase the interval between itself and the third lens group G3 and the fifth lens group G5 is driven to move so as to increase the interval between itself and the fourth lens group G4. When zoomed from the wide-angle side toward the telephoto side, the fifth lens group G5 is driven to move toward the image side.

Exemplar Numerical Values

Various numerical value data (surface data, aspheric data, variable interval data, various data set 1, various data set 2) of Examples 1-1 through 1-5 are listed below.

The surface data includes the radius of curvature r of each of the lens surfaces (optical surfaces) with the corresponding surface number, the interplanar spacing d, the refractive index nd relative to the d line (587.6 nm) of each of the lenses (optical mediums) and the Abbe number vd of the d line of each of the lenses (optical mediums). Unless noted otherwise, the unit of distance for the radius of curvature r, the interplanar spacing d and so on is millimeter (mm). In the surface data, the asterisk "*" annexed to the surface number at the right side indicates that the corresponding lens surface is an aspheric surface and the mark "∞" shown for the radius of curvature indicates that the radius of curvature is infinity.

The aspheric data includes data relating to the lens surfaces that show an aspheric surface profile. An aspheric surface profile is expressed by the formula shown below:

$$x=(y^2/r)/[1+\{1-(1+K)\cdot(y/r)^2\}^{1/2}]+A4y^4+A6y^6+A8y^8+A10y^{10}+A12y^{12}\ldots,$$

where
  x is the optical axis, the direction of advancement of light being the positive direction;
  y is the direction orthogonal relative to the optical axis;
  r is the paraxial radius of curvature;
  K is the conic coefficient; and
  A4, A6, A8, A10 and A12 are respectively the aspheric coefficients of the fourth order, the sixth order, the eighth order, the tenth order and the twelfth order.

Note that the symbol "E" indicates that the following numerical value is an exponent having a base of 10. For example, "1.0E-5" is equal to "1.0×10$^{-5}$"

The various data set 1 shows various zoom data at the wide-angle end (WE), at an intermediate position (ST) and at the telephoto end (TE). Zoom data includes the focal length, the F number (Fno), the view angle (2ω), the variable interplanar spacing d (for an object point at infinity and for imaging distance of 0.35).

The various data set 2 shows the image height, the back focus (BF), the total length and the focal length f1 through f5 for the first through fifth lens groups. These data items are same for the wide-angle end (WE), the intermediate position (ST) and the telephoto end (TE). Note that the back focus (BF) and the total length are those without any filter (the filter part is reduced to the distance in air).

Numerical Example 1-1

| Surface No. | r | d | nd | vd |
|---|---|---|---|---|
| 1 | 64.3900 | 1.950 | 1.78800 | 47.37 |
| 2 | 16.6323 | 6.370 | | |
| 3* | 60.0000 | 1.500 | 1.58313 | 59.38 |
| 4* | 16.6012 | 2.630 | | |
| 5 | 25.4912 | 4.470 | 1.84666 | 23.78 |
| 6 | 944.5098 | d6 (Variable) | | |
| 7 | −23.3996 | 1.200 | 1.78800 | 47.37 |
| 8 | −100.0000 | d8 (Variable) | | |
| 9* | 14.4588 | 4.150 | 1.58313 | 59.38 |
| 10* | −33.2321 | 1.070 | | |
| 11 (Stop) | ∞ | 1.000 | | |
| 12 | 27.1904 | 2.910 | 1.56732 | 42.82 |
| 13 | −135.7170 | 0.940 | 1.91082 | 35.25 |
| 14 | 10.3769 | 3.960 | 1.49700 | 81.54 |
| 15 | −19.5832 | d15 (Variable) | | |
| 16 | 108.8658 | 0.860 | 1.77250 | 49.60 |
| 17 | 14.0873 | d17 (Variable) | | |
| 18* | −80.0000 | 2.500 | 1.53110 | 55.91 |
| 19* | −66.8694 | 3.430 | | |
| 20 | −80.0000 | 3.400 | 1.78470 | 26.29 |
| 21 | −26.1235 | 12.4700 | | |
| 22 | ∞ | 4.080 | 1.51633 | 64.14 |
| 23 | ∞ | 0.745 | | |
| Image Plane | ∞ | | | |

Aspheric Data

3$^{rd}$ Surface

K = 0
A4 = 1.2653E-5
A6 = −1.6312E-7
A8 = 1.8274E-9

-continued

A10 = −9.6923E−12
A12 = 1.9376E−14
4th Surface

K = 0
A4 = −2.7562E−5
A6 = −2.9674E−7
A8 = 2.1253E−9
A10 = −1.3746E−11
A12 = 2.6063E−14
9th Surface K = 0
A4 = −2.4478E−5
A6 = −7.4257E−7
A8 = 3.0322E−8
A10 = −5.5238E−10
A12 = 4.9598E−12
10th Surface K = 0
A4 = 7.1570E−5
A6 = −6.8993E−7
A8 = 2.9439E−8
A10 = −5.7702E−10
A12 = 5.6890E−12
18th Surface K = 0
A4 = 8.8450E−5
A6 = −2.6679E−6
A8 = 4.2350E−8
A10 = −3.7291E−10
A12 = 1.4152E−12
19th Surface K = 0
A4 = 9.6408E−5
A6 = −2.3884E−6
A8 = 3.2859E−8
A10 = −2.5318E−10
A12 = 8.4509E−13

Data Set 1

|  | WE | ST | TE |
|---|---|---|---|
| Focal Length | 12.241 | 24.483 | 48.974 |
| Fno | 3.57 | 4.79 | 6.43 |
| 2ω (°) | 89.73 | 47.87 | 24.41 |
| Infinity |  |  |  |
| d6 | 7.9505 | 8.3129 | 5.4557 |
| d8 | 28.0215 | 12.3494 | 1.6162 |
| d15 | 2.0000 | 5.3427 | 15.2915 |
| d17 | 4.3941 | 16.3611 | 20.0028 |
| 0.35 m |  |  |  |
| d6 | 6.8433 | 7.2139 | 4.2894 |
| d8 | 29.1287 | 13.4484 | 2.7825 |
| d15 | 2.0000 | 5.3427 | 15.2915 |
| d17 | 4.3941 | 16.3611 | 20.0028 |

Data Set 2

| Image Height | 10.815 |
|---|---|
| BF | 15.90 |
| Total Length | 100.61 |
| f1 | −48.379 |
| f2 | −39.035 |
| f3 | 17.040 |
| f4 | −21.030 |
| f5 | 44.990 |

Numerical Example 1-2

| Surface No. | r | d | nd | vd |
|---|---|---|---|---|
| 1 | 45.2207 | 2.140 | 1.77250 | 49.60 |
| 2 | 16.3269 | 5.120 |  |  |
| 3* | 41.8793 | 1.500 | 1.58313 | 59.38 |
| 4* | 14.4691 | 3.850 |  |  |
| 5 | 23.9939 | 3.800 | 1.80810 | 22.76 |
| 6 | 103.8698 | d6 (Variable) |  |  |
| 7 | −24.8418 | 1.200 | 1.74100 | 52.64 |
| 8 | −100.0000 | d8 (Variable) |  |  |
| 9* | 14.0498 | 4.300 | 1.58313 | 59.38 |
| 10* | −31.7996 | 1.300 |  |  |
| 11 (Stop) | ∞ | 1.900 |  |  |
| 12 | 179.0098 | 1.000 | 1.83400 | 37.16 |
| 13 | 10.8826 | 5.000 | 1.49700 | 81.54 |
| 14 | −18.9390 | d14 (Variable) |  |  |
| 15 | 128.8505 | 1.000 | 1.83481 | 42.71 |
| 16 | 15.2795 | 1.580 |  |  |
| 17* | 37.2148 | 2.000 | 1.53071 | 55.69 |
| 18* | 57.5081 | d18 (Variable) |  |  |
| 19 | −75.0639 | 2.480 | 1.75211 | 25.05 |
| 20 | −23.7233 | 11.1634 |  |  |
| 21 | ∞ | 4.080 | 1.51633 | 64.14 |
| 22 | ∞ | 0.745 |  |  |
| Image Plane | ∞ |  |  |  |

Aspheric Data

3rd Surface

K = 1.2447
A4 = 2.0075E−5
A6 = −2.7611E−7
A8 = 2.4894E−10
A10 = 3.5331E−12
A12 = −9.3037E−15
4th Surface K = −1.0662
A4 = 2.1822E−5
A6 = −3.0982E−7
A8 = −1.7795E−9
A10 = 1.9840E−11
A12 = −5.0306E−14
9th Surface K = 0
A4 = −3.8287E−5
A6 = −4.3941E−8
A8 = 1.5034E−10
A10 = 1.3526E−11
A12 = 0
10th Surface K = 0
A4 = 6.6094E−5
A6 = −2.9345E−8
A8 = −1.6201E−9
A10 = 3.6897E−11
A12 = 0
17th Surface K = −82.6051
A4 = 2.9743E−4
A6 = −7.3765E−6
A8 = 9.2595E−8
A10 = −8.7606E−10
A12 = 0
18th Surface

K = −271.4873
A4 = 2.8604E−4
A6 = −6.8173E−6
A8 = 8.5146E−8

A10 = −7.3142E−10
A12 = 0

Data Set 1

|  | WE | ST | TE |
|---|---|---|---|
| Focal Length | 12.243 | 24.463 | 48.956 |
| Fno | 3.64 | 5.21 | 6.48 |
| 2ω (°) | 89.71 | 47.68 | 24.46 |
| Infinity |  |  |  |
| d6 | 6.6446 | 9.3245 | 5.9114 |
| d8 | 30.0675 | 12.3503 | 1.5559 |
| d14 | 3.8142 | 7.9355 | 19.7513 |
| d18 | 6.8162 | 17.7320 | 20.1237 |
| 0.35 m |  |  |  |
| d6 | 5.3346 | 8.0933 | 4.5785 |
| d8 | 31.3775 | 13.5815 | 2.8888 |
| d14 | 3.8142 | 7.9355 | 19.7513 |
| d18 | 6.8162 | 17.7320 | 20.1237 |

Data Set 2

| Image Height | 10.815 |
|---|---|
| BF | 14.60 |
| Total Length | 100.11 |
| f1 | −41.219 |
| f2 | −44.911 |
| f3 | 18.399 |
| f4 | −23.276 |
| f5 | 45.180 |

Numerical Example 1-3

| Surface No. | r | d | nd | νd |
|---|---|---|---|---|
| 1 | 35.2780 | 1.500 | 1.77250 | 49.60 |
| 2 | 15.8293 | 6.790 |  |  |
| 3* | 57.6000 | 1.500 | 1.58313 | 59.38 |
| 4* | 14.2261 | 5.190 |  |  |
| 5 | 26.3919 | 4.360 | 1.84666 | 23.78 |
| 6 | 7000.0000 | d6 (Variable) |  |  |
| 7 | −31.1517 | 0.800 | 1.80400 | 46.57 |
| 8 | −2000.0000 | d8 (Variable) |  |  |
| 9* | 15.5216 | 3.770 | 1.69350 | 53.21 |
| 10* | −50.1195 | 1.500 |  |  |
| 11 (Stop) | ∞ | 1.000 |  |  |
| 12 | 39.2759 | 2.670 | 1.48749 | 70.23 |
| 13 | 270.4115 | 0.800 | 1.90366 | 31.32 |
| 14 | 10.0543 | 3.860 | 1.48749 | 70.23 |
| 15 | −21.2114 | d15 (Variable) |  |  |
| 16* | −492.9354 | 1.000 | 1.69350 | 53.21 |
| 17* | 20.7531 | d17 (Variable) |  |  |
| 18 | −86.4143 | 3.700 | 1.92286 | 18.90 |
| 19 | −32.0900 | 10.7674 |  |  |
| 20 | ∞ | 4.080 | 1.51633 | 64.14 |
| 21 | ∞ | 0.745 |  |  |
| Image Plane |  |  |  |  |

Aspheric Data

3rd Surface

K = 0
A4 = 3.3370E−6
A6 = 2.0165E−8
A8 = −1.0212E−9
A10 = 5.4041E−12
A12 = −8.9913E−15

4th Surface

K = −1.4987
A4 = 1.9557E−5
A6 = 2.3806E−8
A8 = −2.9483E−9
A10 = 1.8044E−11
A12 = −3.8073E−14

9th Surface

K = −0.3907
A4 = −6.9351E−6
A6 = −5.4996E−8
A8 = 1.7195E−9
A10 = 0
A12 = 0

10th Surface

K = −1.7574
A4 = 4.1334E−5
A6 = −1.3416E−7
A8 = 1.8990E−9
A10 = 0
A12 = 0

16th Surface

K = 202.728
A4 = 1.7522E−4
A6 = −1.6346E−5
A8 = 9.6613E−7
A10 = −2.8814E−8
A12 = 3.2583E−10

17th Surface

K = 3.6836
A4 = 1.5822E−4
A6 = −1.7050E−5
A8 = 9.1924E−7
A10 = −2.5812E−8
A12 = 2.7439E−10

Data Set 1

|  | WE | ST | TE |
|---|---|---|---|
| Focal Length | 12.242 | 24.488 | 48.955 |
| Fno | 3.57 | 4.79 | 6.43 |
| 2ω (°) | 89.78 | 47.93 | 24.47 |
| Infinity |  |  |  |
| d6 | 5.5737 | 6.8731 | 5.6229 |
| d8 | 31.0492 | 13.9977 | 1.5000 |
| d15 | 2.0000 | 4.8188 | 17.3305 |
| d17 | 10.2852 | 23.2185 | 24.4548 |
| 0.35 m |  |  |  |
| d6 | 4.2635 | 5.5889 | 4.3137 |
| d8 | 32.3594 | 15.2819 | 2.8092 |
| d15 | 2.0000 | 4.8188 | 17.3305 |
| d17 | 10.2852 | 23.2185 | 24.4548 |

Data Set 2

| Image Height | 10.815 |
|---|---|
| BF | 14.20 |
| Total Length | 101.55 |
| f1 | −68.837 |
| f2 | −39.366 |
| f3 | 18.595 |
| f4 | −28.693 |
| f5 | 53.562 |

Numerical Example 1-4

| Surface No. | r | d | nd | νd |
|---|---|---|---|---|
| 1 | 37.6738 | 1.600 | 1.80400 | 46.57 |
| 2 | 16.0249 | 6.690 | | |
| 3* | 150.0000 | 1.500 | 1.58313 | 59.38 |
| 4* | 16.4876 | 4.200 | | |
| 5 | 27.0347 | 3.500 | 1.84666 | 23.78 |
| 6 | ∞ | d6 (Variable) | | |
| 7 | −28.3216 | 0.800 | 1.77250 | 49.60 |
| 8 | −200.0000 | d8 (Variable) | | |
| 9* | 15.7232 | 3.000 | 1.74400 | 44.78 |
| 10 | −490.3068 | 1.500 | | |
| 11 (Stop) | ∞ | 1.000 | | |
| 12 | 16.3360 | 3.820 | 1.49700 | 81.54 |
| 13 | −23.2523 | 0.800 | 1.91082 | 35.25 |
| 14 | 12.1999 | 0.490 | | |
| 15* | 12.0007 | 3.150 | 1.49700 | 81.54 |
| 16* | −17.4719 | d16 (Variable) | | |
| 17* | −444.8035 | 0.800 | 1.69350 | 53.21 |
| 18* | 17.5046 | d18 (Variable) | | |
| 19 | −145.7109 | 2.250 | 1.92286 | 18.90 |
| 20 | −36.6904 | 10.500 | | |
| 21 | ∞ | 4.080 | 1.51633 | 64.14 |
| 22 | ∞ | 0.745 | | |
| Image Plane | | | | |

Aspheric Data $3^{rd}$ Surface

K = −679.7185
A4 = 6.7199E−5
A6 = −3.9402E−7
A8 = 5.5522E−10
A10 = 4.5495E−12
A12 = −1.5151E−14

$4^{th}$ Surface

K = −4.9637
A4 = 1.4532E−4
A6 = −7.1863E−7
A8 = −1.1122E−9
A10 = 2.7613E−11
A12 = −8.8580E−14

$9^{th}$ Surface

K = 0
A4 = −6.9472E−6
A6 = 8.8043E−8
A8 = −3.7014E−9
A10 = 2.8810E−11
A12 = 0

$15^{th}$ Surface

K = 1.6031
A4 = −2.4760E−4
A6 = −8.2791E−7
A8 = −1.4252E−7
A10 = 5.7952E−9
A12 = −1.0305E−10

$16^{th}$ Surface

K = −3.6250
A4 = −5.7091E−5
A6 = 5.7708E−7
A8 = −9.7804E−8
A10 = 4.4932E−9
A12 = −7.3015E−11

$17^{th}$ Surface

K = 766.4831
A4 = 1.0404E−4
A6 = −1.1629E−5
A8 = 8.0316E−7
A10 = −2.5502E−8
A12 = 2.6928E−10

$18^{th}$ Surface

K = 4.2550
A4 = 3.8276E−5
A6 = −1.4085E−5
A8 = 8.4925E−7
A10 = −2.6804E−8
A12 = 2.7703E−10

Data Set 1

| | WE | ST | TE |
|---|---|---|---|
| Focal Length | 12.241 | 24.485 | 48.979 |
| Fno | 3.57 | 5.91 | 6.43 |
| 2ω (°) | 90.00 | 48.02 | 24.46 |
| Infinity | | | |
| d6 | 5.7000 | 6.5000 | 5.2883 |
| d8 | 30.2393 | 13.6393 | 1.3000 |
| d16 | 2.0000 | 4.5383 | 14.8313 |
| d18 | 11.1446 | 24.4063 | 27.6642 |
| 0.35 m | | | |
| d6 | 4.4099 | 5.2297 | 3.9879 |
| d8 | 31.5294 | 14.9096 | 2.6004 |
| d16 | 2.0000 | 4.5383 | 14.8313 |
| d18 | 11.1446 | 24.4063 | 27.6642 |

Data Set 2

| | |
|---|---|
| Image Height | 10.815 |
| BF | 13.93 |
| Total Length | 98.12 |
| f1 | −51.136 |
| f2 | −42.797 |
| f3 | 17.819 |
| f4 | −24.268 |
| f5 | 52.616 |

Numerical Example 1-5

| Surface No. | r | d | nd | νd |
|---|---|---|---|---|
| 1 | 28.8842 | 1.500 | 1.77250 | 49.60 |
| 2 | 15.5188 | 8.000 | | |
| 3* | 100.0000 | 1.500 | 1.58313 | 59.38 |
| 4* | 14.4535 | 4.340 | | |
| 5 | 23.7733 | 4.500 | 1.84666 | 23.78 |
| 6 | 188.0989 | d6 (Variable) | | |
| 7 | −30.9233 | 0.800 | 1.83481 | 42.71 |
| 8 | 233.9180 | 1.500 | 1.84666 | 23.78 |
| 9 | −310.2906 | d9 (Variable) | | |
| 10* | 15.7662 | 3.570 | 1.69350 | 53.21 |
| 11* | −49.3865 | 1.500 | | |
| 12 (Stop) | ∞ | 1.000 | | |
| 13 | 42.8599 | 2.580 | 1.48749 | 70.23 |
| 14 | 424.6663 | 0.800 | 1.90366 | 31.32 |
| 15 | 10.4753 | 3.900 | 1.48749 | 70.23 |
| 16 | −20.1406 | d16 (Variable) | | |
| 17* | −262.4056 | 0.800 | 1.69350 | 53.21 |
| 18* | 20.4782 | d18 (Variable) | | |
| 19 | −125.3414 | 3.000 | 1.92286 | 18.90 |
| 20 | −34.4440 | d20 (Variable) | | |
| 21 | ∞ | 4.080 | 1.51633 | 64.14 |
| 22 | ∞ | 0.745 | | |
| Image Plane | | | | |

-continued

Aspheric Data

3rd Surface

K = 32.2556
A4 = 4.0016E−5
A6 = −3.4885E−7
A8 = 5.8864E−10
A10 = 2.4294E−12
A12 = −8.0532E−15

4th Surface

K = −0.7597
A4 = 3.5415E−5
A6 = −2.7107E−7
A8 = −2.8882E−9
A10 = 2.7390E−11
A12 = −6.8676E−14

10th Surface

K = −0.4685
A4 = −7.0899E−6
A6 = 7.3547E−8
A8 = 3.4418E−10
A10 = 4.2625E−12
A12 = 0

11th Surface

K = −1.1167
A4 = 4.1136E−5
A6 = 3.8178E−9
A8 = −1.2688E−10
A10 = 8.8706E−12
A12 = 0

17th Surface

K = 553.4829
A4 = 2.1089E−4
A6 = −1.5222E−5
A8 = 8.5645E−7
A10 = −2.6209E−8
A12 = 3.0811E−10

18th Surface

K = 4.8168
A4 = 1.6472E−4
A6 = −1.6077E−5
A8 = 8.1995E−7
A10 = −2.3975E−8
A12 = 2.6635E−10

Data Set 1

|  | WE | ST | TE |
|---|---|---|---|
| Focal Length | 12.242 | 24.478 | 48.982 |
| Fno | 3.57 | 4.79 | 6.43 |
| 2ω (°) | 89.73 | 47.81 | 24.46 |
| Infinity |  |  |  |
| d6 | 5.4462 | 7.2650 | 5.6269 |
| d9 | 30.9699 | 13.5860 | 1.4422 |
| d16 | 2.0000 | 5.5238 | 17.4737 |
| d18 | 9.9696 | 23.3058 | 25.8429 |
| d20 | 12.5000 | 11.2051 | 10.5000 |
| 0.35 m |  |  |  |
| d6 | 4.0698 | 5.9338 | 4.2551 |
| d9 | 32.3463 | 14.9172 | 2.8140 |
| d16 | 2.0000 | 5.5238 | 17.4737 |
| d18 | 9.9696 | 23.3058 | 25.8429 |
| d20 | 12.5000 | 11.2051 | 10.5000 |

Data Set 2

| Image Height | 10.815 |
|---|---|
| BF | 15.94 |
| Total Length | 103.61 |
| f1 | −56.583 |
| f2 | −41.452 |

-continued

| f3 | 18.600 |
|---|---|
| f4 | −27.359 |
| f5 | 50.664 |

FIGS. 6, 8, 10, 12 and 14 show various aberrations for an object point at infinity at (A)-(D) wide-angle end (WE), (E)-(H) intermediate position (ST) and (I)-(L) telephoto end (TE) for Examples 1-1 through 1-5. FIGS. 7, 9, 11, 13 and 15 show various aberrations for imaging distance of 0.35 m at (A)-(D) wide-angle end (WE), (E)-(H) intermediate position (ST) and (I)-(L) telephoto end for Examples 1-1 through 1-5.

In the drawings showing various aberrations, SA stands for spherical aberration, AS stands for astigmatism, DT stands for distortion and CC stands for chromatic difference of magnification. The spherical aberration SA is shown for the wavelengths of 587.6 nm (d line: solid line), 435.8 nm (g line: broken line) and 656.3 nm (C line: dotted line). The chromatic difference of magnification CC is shown for the wavelengths of 435.8 nm (g line: broken line) and 656.3 nm (C line: dotted line) as referred to d line. The astigmatism AS is shown for the sagittal image surface (solid line) and the meridional image surface (broken line). FNO stands for F number and FIY stand for the maximum image height.

For each of the Examples, the distortion of a barrel shape at the wide-angle side may be electrically corrected by way of signal processing. The distortion may be completely corrected so as to make the quantity of distortion equal to 0 for both the reproduced image and the recorded image. Alternatively, the distortion of a barrel shape may be electrically corrected so as to make the quantity of distortion remain by −3% at the periphery of the reproduced image and at the periphery of the recorded image.

The values of the conditional formulas (1-1) through (1-15) are listed below for Examples 1-1 through 1-5.

|  | EX. 1-1 | EX. 1-2 | EX. 1-3 | EX. 1-4 | EX. 1-5 |
|---|---|---|---|---|---|
| Formula (1-1) | 1.28 | 1.09 | 1.16 | 1.35 | 1.30 |
| Formula (1-2) | 2.36 | 2.39 | 2.41 | 2.40 | 2.40 |
| Formula (1-3) | 1.28 | 1.09 | 1.16 | 1.35 | 1.13 |
| Formula (1-4) | 0.00 | 0.00 | 0.00 | 0.00 | −0.16 |
| Formula (1-5) | −3.19 | −3.67 | −3.22 | −3.5 | −3.39 |
| Formula (1-6) | −0.62 | −0.60 | −0.97 | −0.75 | −0.82 |
| Formula (1-7) | 1.78800 | 1.74100 | 1.80400 | 1.77250 | 1.83481 |
| Formula (1-8) | 1.05 | 0.94 | 0.94 | 1.15 | 0.95 |
| Formula (1-9) | 81.54 | 81.54 | 70.23 | 81.61 | 70.23 |
| Formula (1-10) | 1.91082 | 1.83400 | 1.90366 | 1.91082 | 1.90366 |
| Formula (1-11) | 35.25 | 37.16 | 31.32 | 35.25 | 31.32 |
| Formula (1-12) | 0.77 | 0.79 | 1.09 | 1.08 | 1.17 |
| Formula (1-13) | 1.77250 | 1.83481 | 1.69350 | 1.69350 | 1.69350 |
| Formula (1-14) | 49.60 | 42.71 | 53.21 | 53.21 | 53.21 |
| Formula (1-15) | 26.29 | 25.05 | 18.90 | 18.90 | 18.90 |

The zoom lenses in the second aspect of the present invention of Example 2-1 through Example 2-4 will be described below by referring to the related drawings. FIGS. 16 through 19 are schematic cross-sectional views respectively taken along the optical axes of the zoom lenses that are exploded of Examples 2-1 through 2-4 of the present invention. In each of the figures, (a) through (d) show cross-sectional views of the zoom lens in a zoom mode that is the first mode and (e) shows a cross-sectional view of the zoom lens in a macro mode that is the second mode. In each of the figures, (a) shows the wide-angle end when focused at infinity (W inf) and (b) shows an intermediate state when focused at infinity (S inf), while (c) shows a state in the first mode where lens group A is arranged at the position same as the position of the lens group A in the second mode when focused at infinity (M1), (d) shows the telephoto end when focused at infinity (T inf) and (e) shows a predetermined state in the second mode (M2).

Note that a state in the first mode where lens group A is arranged at the position same as the position of the lens group A in the second mode when focused at infinity means a state where the zoom lens is on the way of zooming from an intermediate foal distance (b) to the telephoto end (d).

Example 2-1

Figure 16:
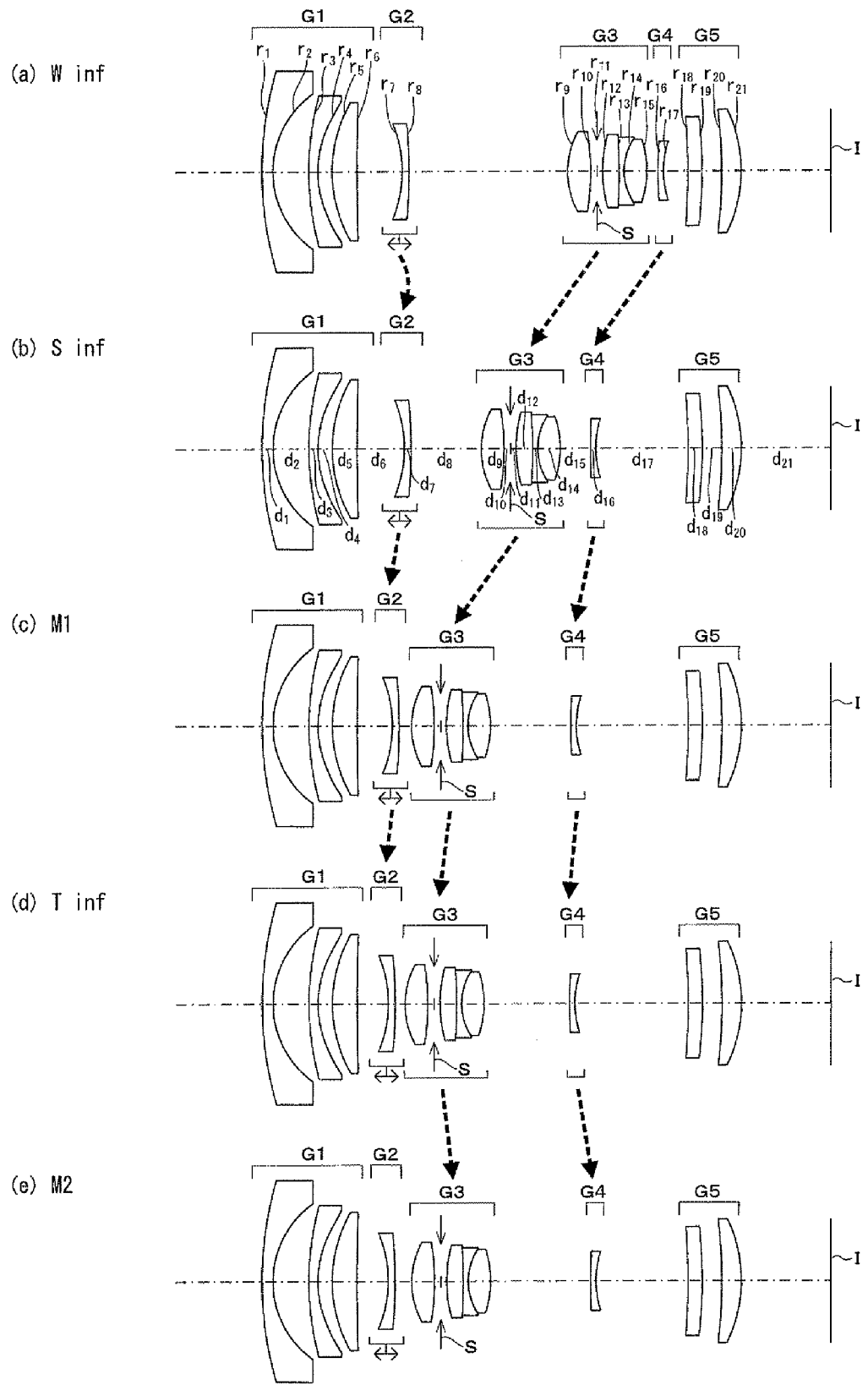
FIG. 16 is a schematic cross-sectional view taken along the optical axis of the zoom lens that is exploded of Example 2-1 of the present invention.

FIG. 16 is a cross-sectional view of the zoom lens of Example 2-1. The zoom lens of Example 2-1 includes a first lens group G1 (object side lens group) having a negative refractive power, a second lens group G2 (focus lens group) having a negative refractive power, a third lens group G3 (lens group A) having a positive refractive power, a fourth lens group G4 (lens group B) having a negative refractive power and a fifth lens group G5 (lens group C) having a positive refractive power arranged in the above mentioned order from the object side to the image side.

In the first mode, when changing the magnification from the wide-angle end toward the telephoto end, the first lens group G1 is anchored and the second lens group G2 is moved so as to produce a trajectory of being moved toward the image side and then moved backward, while the third lens group G3 and the fourth lens group G4 are moved only toward the object side and the fifth lens group G5 is anchored.

Focusing operations are realized by driving the second lens group G2 to move in the direction of the optical axis. In a focusing operation from a long distance to a short distance, the second lens group G2 is driven to move toward the object side.

As the mode is switched to the second mode shown in FIG. 16(*e*), the second, third and fourth lens groups G2 through G4 are moved to respective predetermined midway positions in the movable range in the first mode.

In this instance, the second lens group G2 is moved to a position where the zoom lens is focused at infinity at the telephoto end in the first mode as shown in FIG. 16(*d*).

The third lens group G3 is moved to a predetermined position where it is in a state between the intermediate state shown in FIG. 16(*b*) and the state at the telephoto end shown in FIG. 16(*d*).

The fourth lens group G4 is moved toward the image side relative to the relative position with regard to the second lens group G2 in the first mode.

FIG. 16 shows the moving directions of the related respective lens groups from the positions of the lens groups at the telephoto end when focused at infinity in the first mode. When the mode is switched to the second mode at the lens positions at the wide-angle end, the second, third and fourth lens groups G2 through G4 are moved toward the object side to respective predetermined positions.

Focusing operations in the second mode are realized by driving the second lens group G2 to move in the direction of the optical axis. Focusing at a short distance is realized by driving the second lens group G2 to move toward the object side, whereas focusing at a long distance is realized by driving the second lens group G2 to move toward the image side.

Example 2-2

Figure 17:
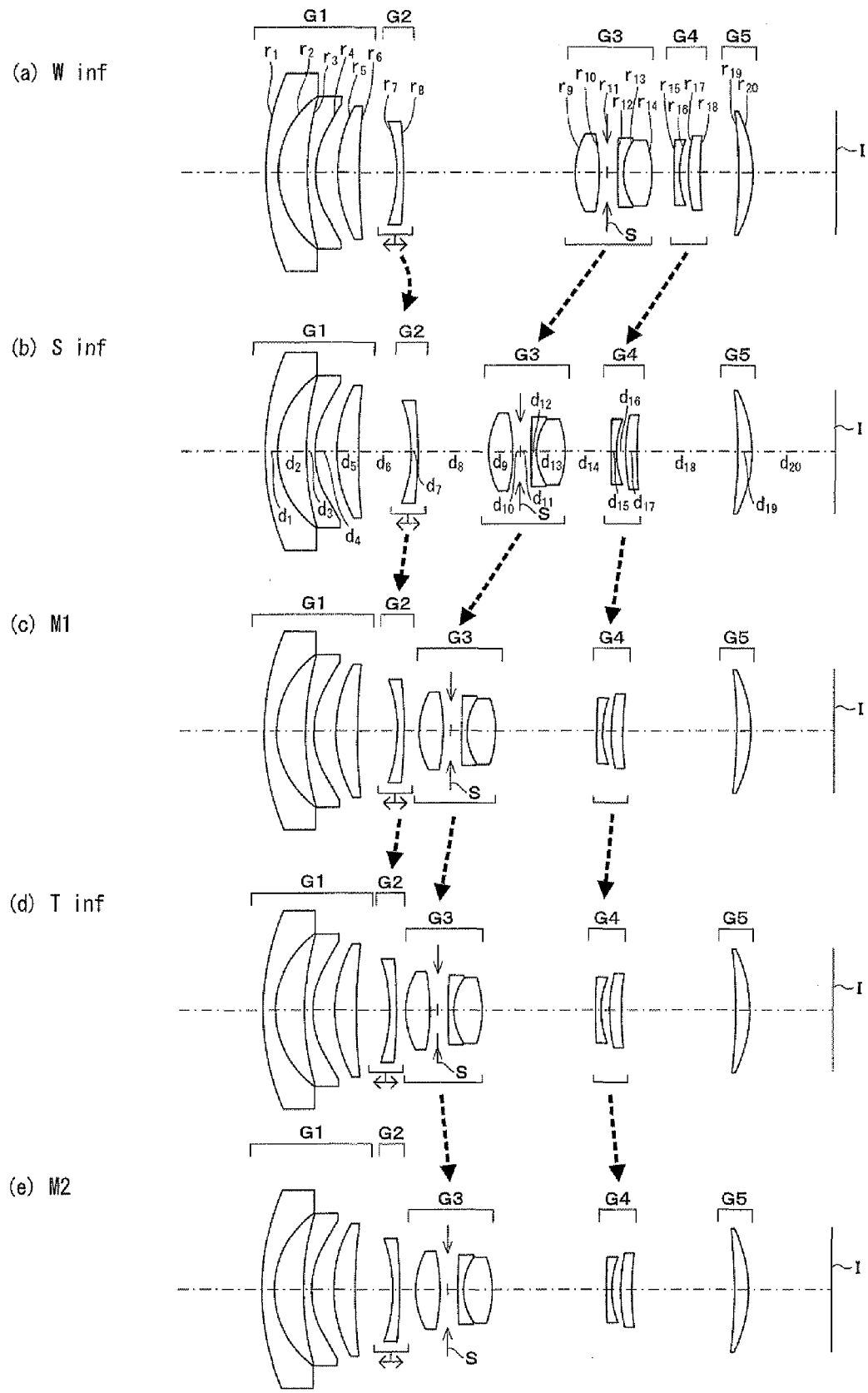
FIG. 17 is a schematic cross-sectional view taken along the optical axis of the zoom lens that is exploded of Example 2-2 of the present invention.

FIG. 17 is a cross-sectional view of the zoom lens of Example 2-2. The zoom lens of Example 2-2 includes a first lens group G1 (object side lens group) having a negative refractive power, a second lens group G2 (focus lens group) having a negative refractive power, a third lens group G3 (lens group A) having a positive refractive power, a fourth lens group G4 (lens group B) having a negative refractive power and a fifth lens group G5 (lens group C) having a positive refractive power arranged in the above mentioned order from the object side to the image side.

In the first mode, when changing the magnification from the wide-angle end toward the telephoto end, the first lens group G1 is anchored and the second lens group G2 is moved so as to produce a trajectory of being moved toward the image side and then moved backward, while the third lens group G3 and the fourth lens group G4 are moved only toward the object side and the fifth lens group G5 is anchored.

Focusing operations are realized by driving the second lens group G2 to move in the direction of the optical axis. In a focusing operation from a long distance to a short distance, the second lens group G2 is driven to move toward the object side.

As the mode is switched to the second mode shown in FIG. 17(*e*), the second, third and fourth lens groups G2 through G4 are moved to respective predetermined midway positions in the movable range in the first mode.

In this instance, the second lens group G2 is moved to a position where the zoom lens is focused at infinity at the telephoto end in the first mode as shown in FIG. 17(*d*).

The third lens group G3 is moved to a predetermined position where it is in a state between the intermediate state shown in FIG. 17(*b*) and the state at the telephoto end shown in FIG. 17(*d*).

The fourth lens group G4 is moved toward the image side relative to the relative position with regard to the second lens group G2 in the first mode.

FIG. 17 shows the moving directions of the related respective lens groups from the positions of the lens groups at the telephoto end when focused at infinity in the first mode. When the mode is switched to the second mode at the lens positions at the wide-angle end, the second, third and fourth lens groups G2 through G4 are moved toward the object side to respective predetermined positions.

Focusing operations in the second mode are realized by driving the second lens group G2 to move in the direction of the optical axis. Focusing at a short distance is realized by driving the second lens group G2 to move toward the object side, whereas focusing at a long distance is realized by driving the second lens group G2 to move toward the image side.

Example 2-3

Figure 18:
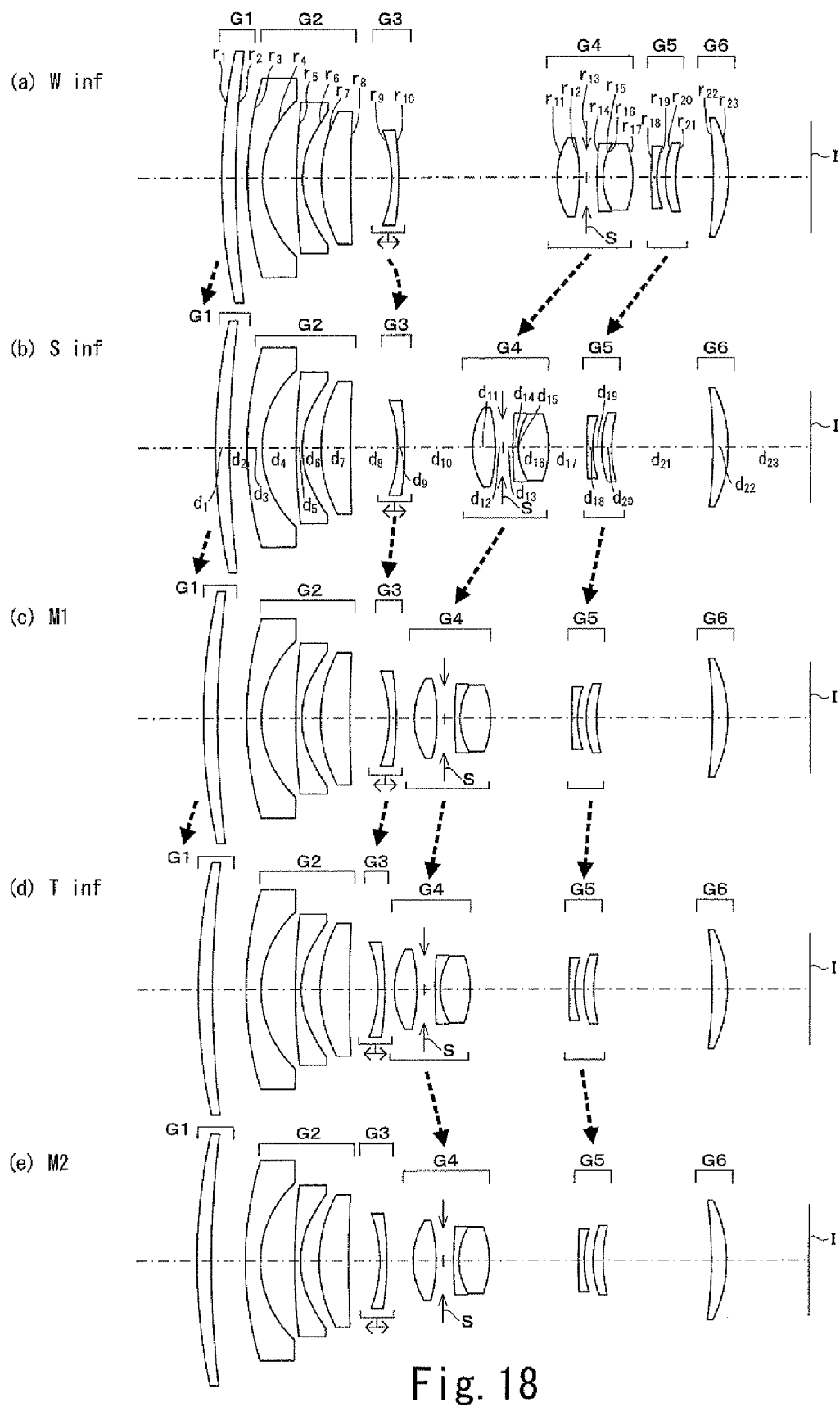
FIG. 18 is a schematic cross-sectional view taken along the optical axis of the zoom lens that is exploded of Example 2-3 of the present invention.

FIG. 18 is a cross-sectional view of the zoom lens of Example 2-3. The zoom lens of Example 2-3 includes a first lens group G1 (lens group D) having a positive refractive power, a second lens group G2 (object side lens group) having a negative refractive power, a third lens group G3 (focus lens group) having a negative refractive power, a fourth lens group G4 (lens group A) having a positive refractive power, a fifth lens group G5 (lens group B) having a negative refractive power and a sixth lens group G6 (lens group C) having a positive refractive power arranged in the above mentioned order from the object side to the image side.

In the first mode, when changing the magnification from the wide-angle end toward the telephoto end, the first lens group G1 is moved toward the object side, the second lens group G2 is anchored and the third lens group G3 is moved so as to show a trajectory of being moved toward the image side and then moved backward, while the fourth lens group G4 and the fifth lens group G5 are moved only toward the object side and the sixth lens group G6 is anchored.

Focusing operations are realized by driving the third lens group G3 to move in the direction of the optical axis. In a focusing operation from a long distance to a short distance, the third lens group G3 is driven to move toward the object side.

As the mode is switched to the second mode shown in FIG. 18(e), the first, third, fourth and fifth lens groups G1, G3, G4 and G5 are moved to respective predetermined midway positions in the movable range in the first mode.

In this instance, the first lens group G1 and the third lens group G3 are moved to respective positions where the zoom lens is focused at infinity at the telephoto end in the first mode.

The fourth lens group G4 is moved to a predetermined position where it is in a state between the intermediate state shown in FIG. 18(b) and the state at the telephoto end shown in FIG. 18(d).

The fifth lens group G5 is moved toward the image side relative to the relative position with regard to the second lens group G2 in the first mode.

FIG. 18 shows the moving directions of the related respective lens groups from the positions of the lens groups at the telephoto end when focused at infinity in the first mode. When the mode is switched to the second mode at the lens positions at the wide-angle end, the first, third, fourth and fifth lens groups G1, G3, G4 and G5 are moved toward the object side to respective predetermined positions.

Focusing operations in the second mode are realized by driving the third lens group G3 to move in the direction of the optical axis. Focusing at a short distance is realized by driving the third lens group G3 to move toward the object side, whereas focusing at a long distance is realized by driving the third lens group G3 to move toward the image side.

In Example 2-3, the effective imaging region is made to show a barrel shape at the wide-angle end and a rectangular shape in a state of showing an intermediate focal length and at the telephoto end in order to correct the distortions produced at and near the wide-angle end by way of image processing. The predefined effective imaging region is subjected to image transformation by image processing so as to transform it into a rectangular image information piece with reduced distortions. Thus, the image height THw at the wide-angle end is smaller than the image height IHs in a state of showing an intermediate focal length and the image height IHt at the telephoto end.

Example 2-4

Figure 19:
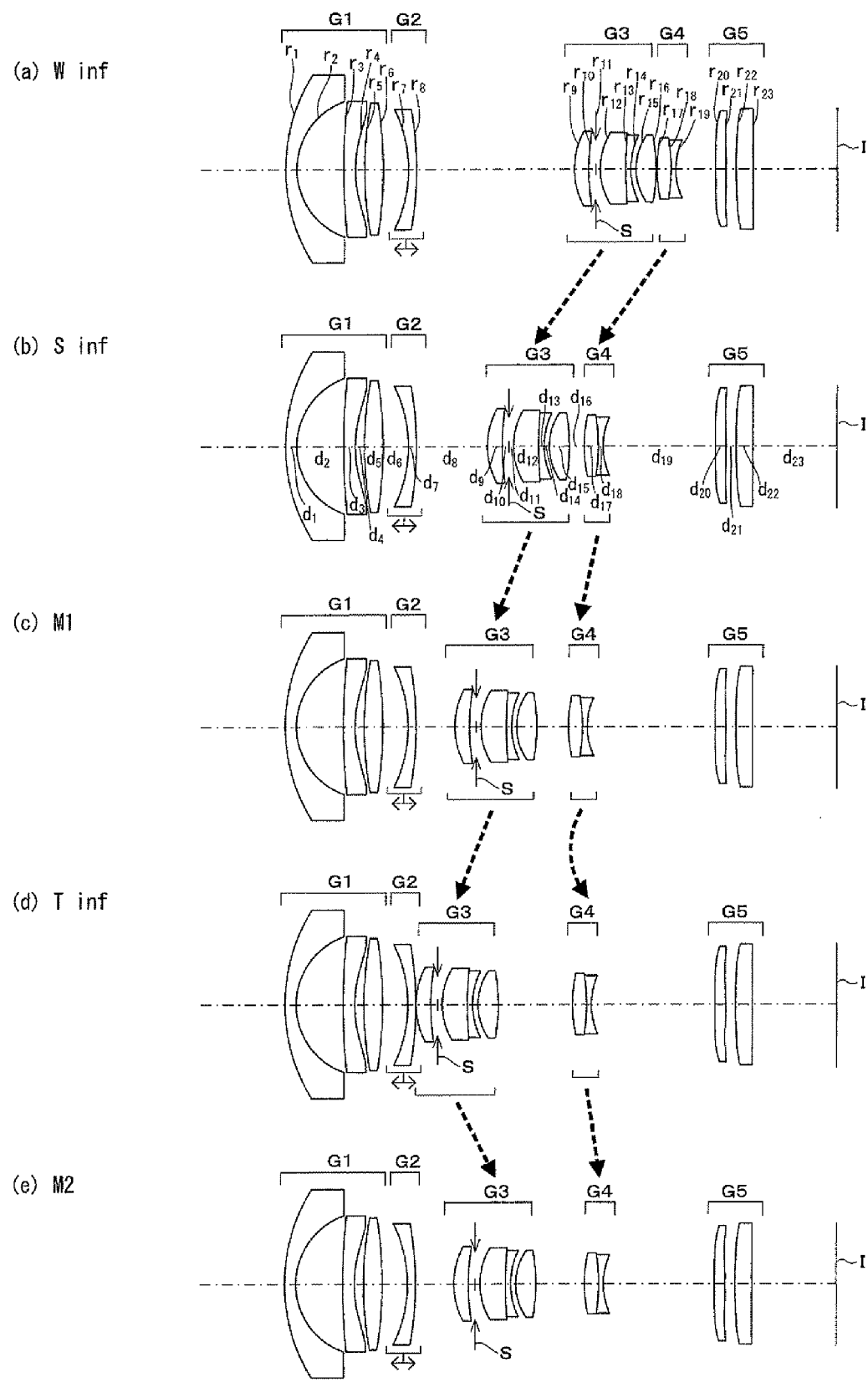
FIG. 19 is a schematic cross-sectional view taken along the optical axis of the zoom lens that is exploded of Example 2-4 of the present invention.
Figure 20A:
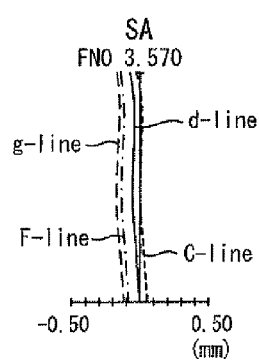
FIG. 20 is a schematic illustration of aberrations of the zoom lens of Example 2-1 of the present invention.
Figure 20B:
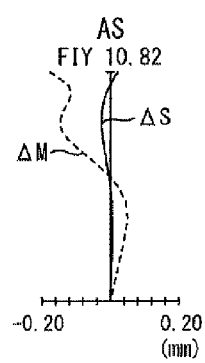
Figure 20C:
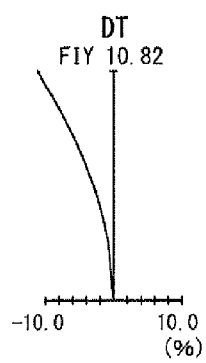
Figure 20D:
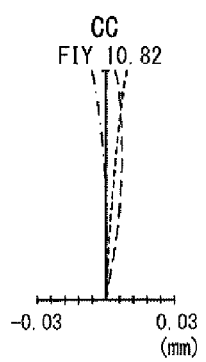
Figure 20E:
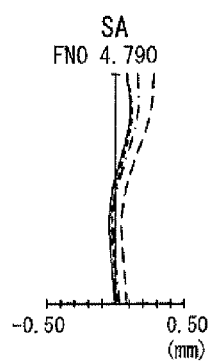
Figure 20F:
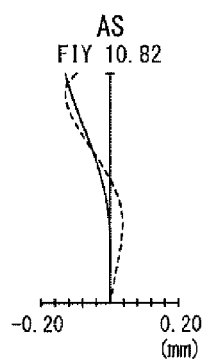
Figure 20G:
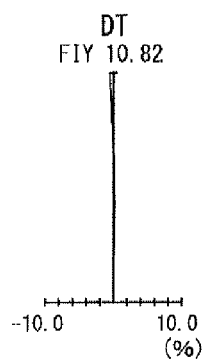
Figure 20H:
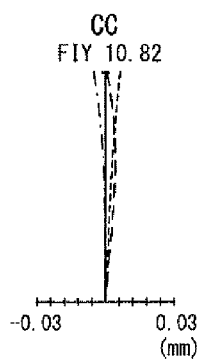
Figure 20I:
Figure 20J:
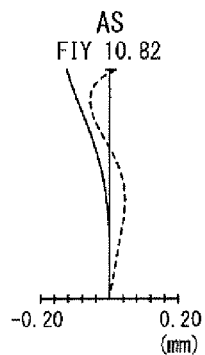
Figure 20K:
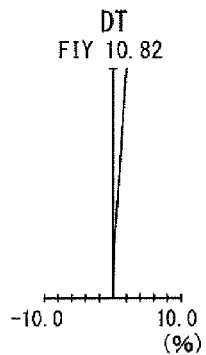
Figure 20L:
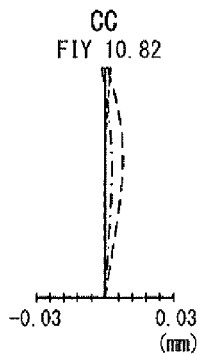
Figure 20M:
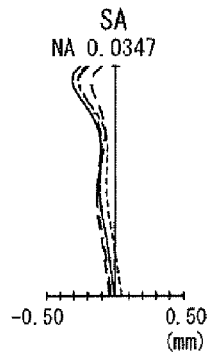
Figure 20N:
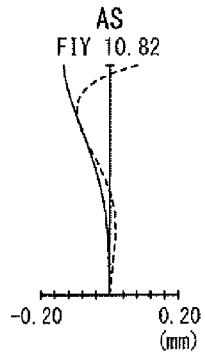
Figure 20O:
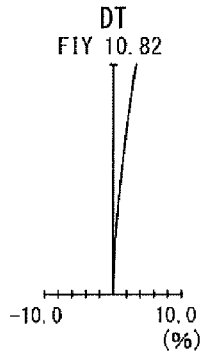
Figure 20P:
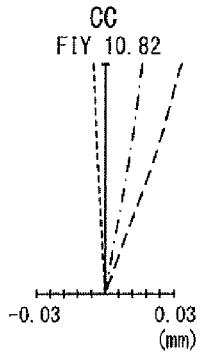
Figure 21A:
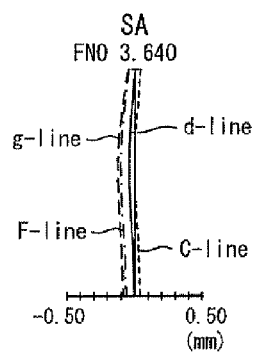
FIG. 21 is a schematic illustration of aberrations of the zoom lens of Example 2-2 of the present invention.
Figure 21B:
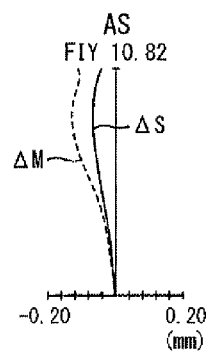
Figure 21C:
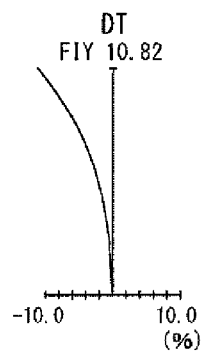
Figure 21D:
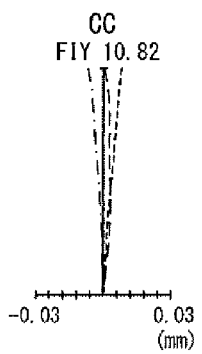
Figure 21E:
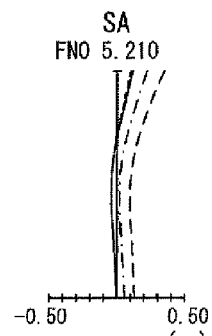
Figure 21F:
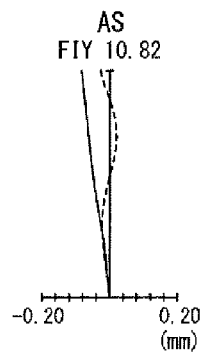
Figure 21G:
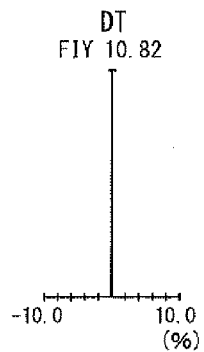
Figure 21H:
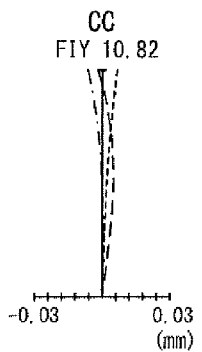
Figure 21I:
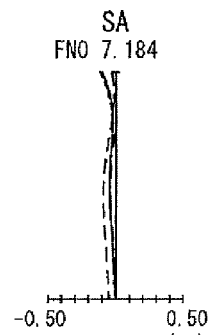
Figure 21J:
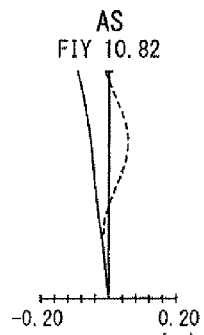
Figure 21K:
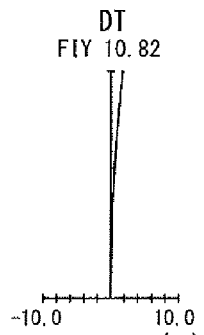
Figure 21L:
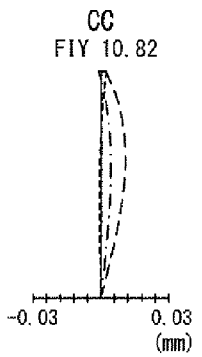
Figure 21M:
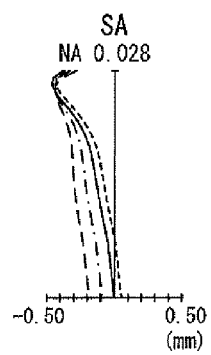
Figure 21N:
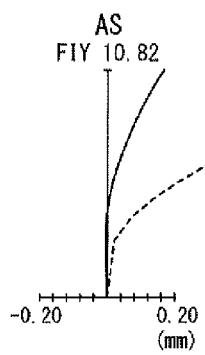
Figure 21O:
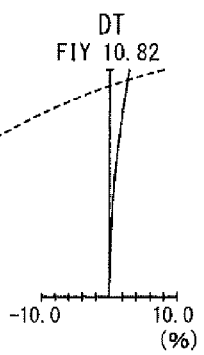
Figure 21P:
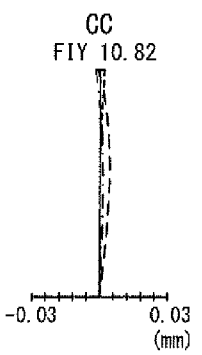
Figure 22A:
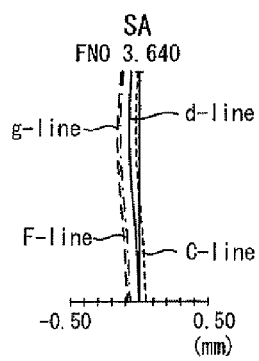
FIG. 22 is a schematic illustration of aberrations of the zoom lens of Example 2-3 of the present invention.
Figure 22B:
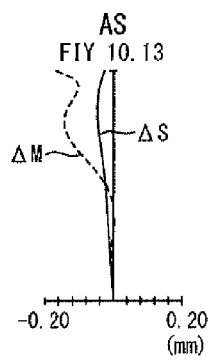
Figure 22C:
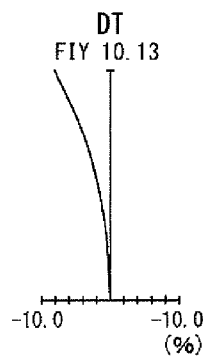
Figure 22D:
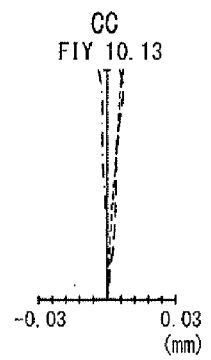
Figure 22E:
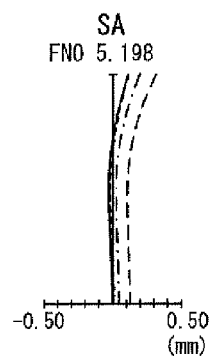
Figure 22F:
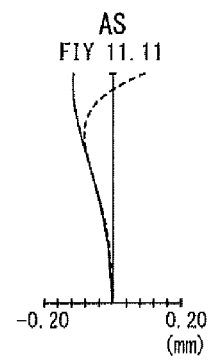
Figure 22G:
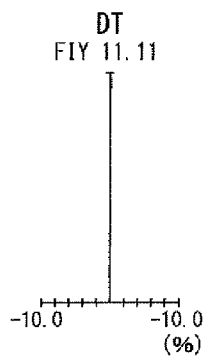
Figure 22H:
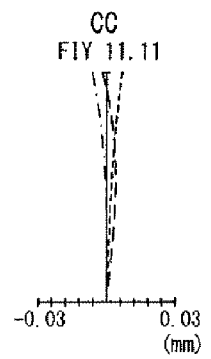
Figure 22I:
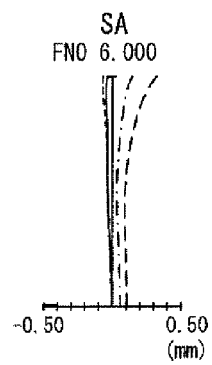
Figure 22J:
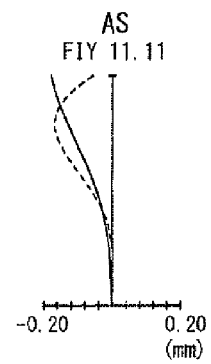
Figure 22K:
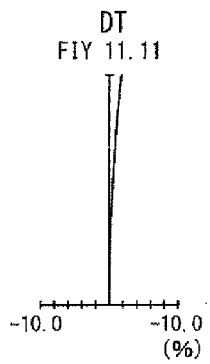
Figure 22L:
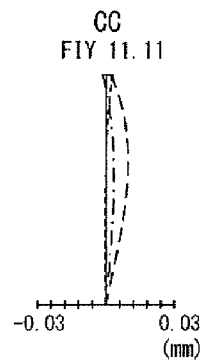
Figure 22M:
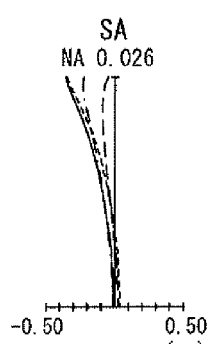
Figure 22N:
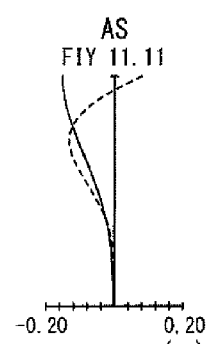
Figure 22O:
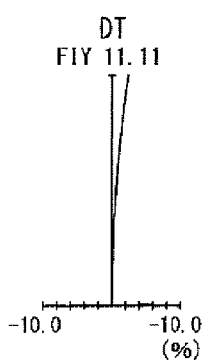
Figure 22P:
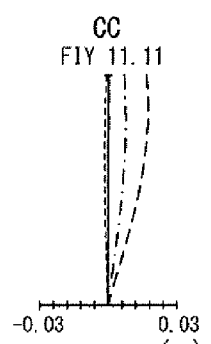
Figure 23A:
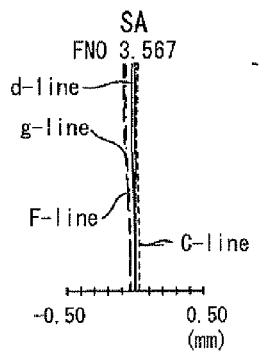
FIG. 23 is a schematic illustration of aberrations of the zoom lens of Example 2-4 of the present invention.
Figure 23B:
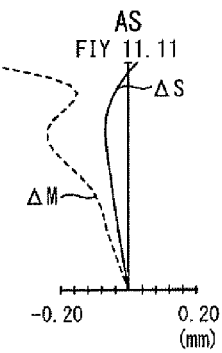
Figure 23C:
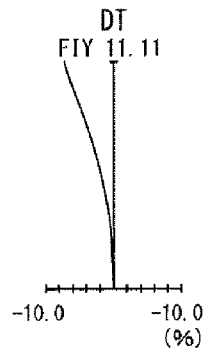
Figure 23D:
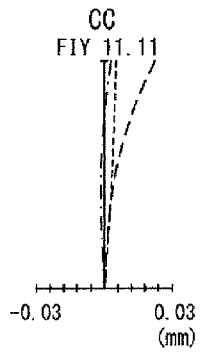
Figure 23E:
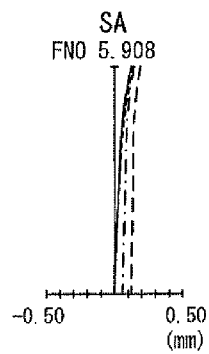
Figure 23F:
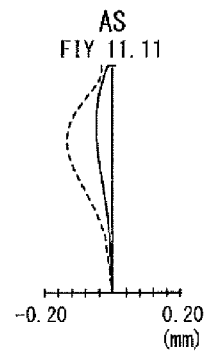
Figure 23G:
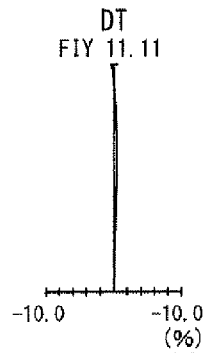
Figure 23H:
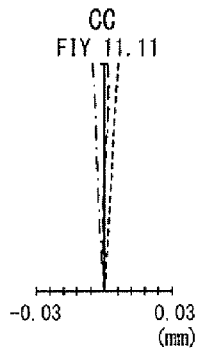
Figure 23I:
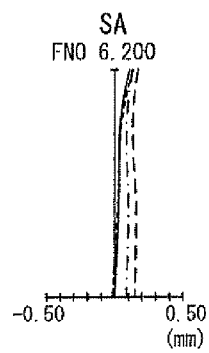
Figure 23J:
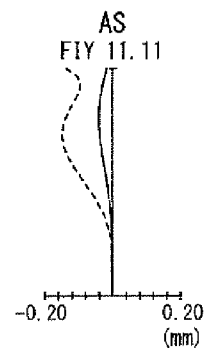
Figure 23K:
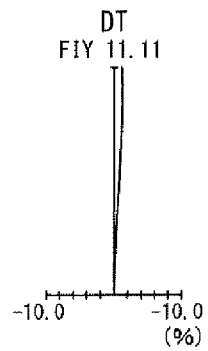
Figure 23L:
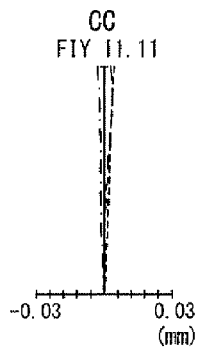
Figure 23M:
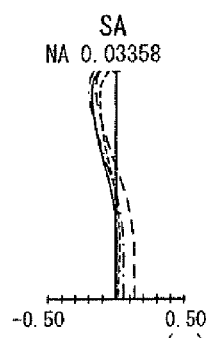
Figure 23N:
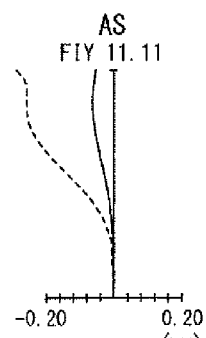
Figure 23O:
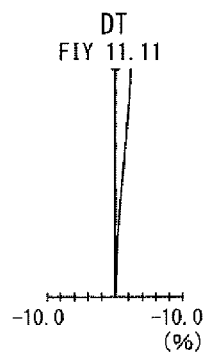
Figure 23P:
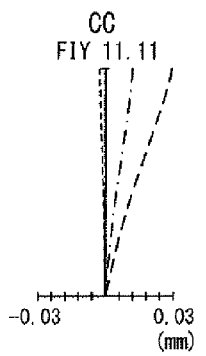

FIG. 19 is a cross-sectional view of the zoom lens of Example 2-4. The zoom lens of Example 2-4 includes a first lens group G1 (object side lens group) having a negative refractive power, a second lens group G2 (focus lens group) having a negative refractive power, a third lens group G3 (lens group A) having a positive refractive power, a fourth lens group G4 (lens group B) having a negative refractive power and a fifth lens group G5 (lens group C) having a positive refractive power arranged in the above mentioned order from the object side to the image side.

In the first mode, when changing the magnification from the wide-angle end toward the telephoto end, the first lens group G1 and the second lens group G2 are anchored and the third lens group G3 is moved only toward the object side, while the fourth lens group G4 is moved so as to produce a trajectory of being moved toward the image side and then moved backward and the fifth lens group G5 is anchored.

Focusing operations are realized by driving the second lens group G2 to move in the direction of the optical axis. In a focusing operation from a long distance to a short distance, the second lens group G2 is driven to move toward the object side.

As the mode is switched to the second mode, the third and fourth lens groups G3 and G4 are moved to respective predetermined midway positions in the movable range in the first mode.

In this instance, the third lens group G3 is moved to a predetermined position where it is in a state between the intermediate state shown in FIG. 19(b) and the state at the telephoto end shown in FIG. 19(d).

The fourth lens group G4 is moved toward the image side relative to the relative position with regard to the second lens group G2 in the first mode.

FIG. 19 shows the moving directions of the related respective lens groups from the positions of the lens groups at the telephoto end when focused at infinity in the first mode. When the mode is switched to the second mode at the lens positions at the wide-angle end, each of the third and fourth lens groups G3 and G4 is moved toward the object side to a predetermined position.

Focusing operations in the second mode are realized by driving the second lens group G2 to move in the direction of the optical axis. Focusing at a short distance is realized by driving the second lens group G2 to move toward the object side, whereas focusing at a long distance is realized by driving the second lens group G2 to move toward the image side.

[Exemplar Numerical Values]

Various numerical value data (surface data aspheric surface data, various data set 1, various data set 2) of Examples 2-1 through 2-4 are listed below.

The surface data includes the radius of curvature r of each of the lens surfaces (optical surfaces) with the corresponding surface number, the interplanar spacing d, the refractive index nd relative to the d line (587.6 nm) of each of the lenses (optical mediums) and the Abbe number vd of the d line of each of the lenses (optical mediums). In the surface data, the asterisk "*" annexed to the surface number at the right side indicates that the corresponding lens surface is an aspheric surface and the mark "*" shown for the radius of curvature indicates that the radius of curvature is infinity. Unless noted otherwise, the unit of distance for the radius of curvature r, the interplanar spacing d and so on is millimeter (mm) as well as for the data listed in the various data sets 1 and 2.

The aspheric surface data includes data relating to the lens surfaces that show an aspheric surface profile. An aspheric surface profile is expressed by the formula shown below:

$$x=(y^2/r)/[1+\{1-(1+K)\cdot(y/r)^2\}^{1/2}]+A4y^4+A6y^6+A8y^8+A10y^{10}+A12y^{12}\ldots,$$

where
x is the optical axis, the direction of advancement of light being the positive direction;
y is the direction orthogonal relative to the optical axis;
r is the paraxial radius of curvature;
K is the conic coefficient; and
A4, A6, A8, A10 and A12 are respectively the aspheric coefficients of the fourth order, the sixth order, the eighth order, the tenth order and the twelfth order.

Note that the symbol "E" indicates that the following numerical value is an exponent having a base of 10. For example, "1.0E-5" is equal to "1.0×10$^{-5}$".

The various data set 1 shows various zoom data at the wide-angle end (W) at the time of being focused at infinity, at an intermediate position (S), in a state in the first mode where lens group A is arranged at the position same as the position of the lens group A in the second mode (M1: zoom mode) and at the telephoto end (T) and in a predetermined state in the second mode (M2: macro mode). Zoom data includes the focal length, the F number (Fno), the half view angle, the variable interplanar spacing d and the radius ER of the aperture diaphragm. The data on the second mode (M2) additionally includes imaging magnifications (MG, NA).

The various data set 2 shows the focal length, the back focus length as reduced to air(BF), the optical total length, the image height, the focal length in a macro mode (second mode), the half view angle, the imaging distance and the imaging magnification of each of the lens groups.

Numerical Example 2-1

| Surface No. | r | d | nd | vd |
|---|---|---|---|---|
| 1 | 64.3900 | 1.9500 | 1.78800 | 47.37 |
| 2 | 16.6323 | 6.3700 | | |
| 3* | 60.0000 | 1.5000 | 1.58313 | 59.38 |
| 4* | 16.6012 | 2.6300 | | |
| 5 | 25.4912 | 4.4700 | 1.84666 | 23.78 |
| 6 | 944.5098 | d6 (Variable) | | |
| 7 | −23.3996 | 1.2000 | 1.78800 | 47.37 |
| 8 | −100.0000 | d8 (Variable) | | |
| 9* | 14.4588 | 4.1500 | 1.58313 | 59.38 |
| 10* | −33.2321 | 1.0700 | | |
| 11 (Stop) | ∞ | 1.0000 | | |
| 12 | 27.1904 | 2.9100 | 1.56732 | 42.82 |
| 13 | −135.7170 | 0.9400 | 1.91082 | 35.25 |
| 14 | 10.3769 | 3.9600 | 1.49700 | 81.54 |
| 15 | −19.5832 | d15 (Variable) | | |
| 16 | 108.8658 | 0.8600 | 1.77250 | 49.60 |
| 17 | 14.0873 | d17 (Variable) | | |
| 18* | −80.0000 | 2.5000 | 1.53110 | 55.91 |
| 19* | −66.8694 | 3.4300 | | |
| 20 | −80.0000 | 3.4000 | 1.78470 | 26.29 |
| 21 | −26.1235 | 15.9057 | | |
| Image Plane | ∞ | | | |

Aspheric Data

3$^{rd}$ Surface

K = 0
A4 = 1.2653E−5
A6 = −1.6312E−7
A8 = 1.8274E−9
A10 = −9.6923E−12
A12 = 1.9376E−14

4$^{th}$ Surface

K = 0
A4 = −2.7562E−5
A6 = −2.9674E−7
A8 = 2.1253E−9
A10 = −1.3746E−11
A12 = 2.6063E−14

9$^{th}$ Surface

K = 0
A4 = −2.4478E−5
A6 = −7.4257E−7
A8 = 3.0322E−8
A10 = −5.5238E−10
A12 = 4.9598E−12

10$^{th}$ Surface

K = 0
A4 = 7.1570E−5
A6 = −6.8993E−7
A8 = 2.9439E−8
A10 = −5.7702E−10
A12 = 5.6890E−12

18$^{th}$ Surface

K = 0
A4 = 8.8450E−5
A6 = −2.6679E−6
A8 = 4.2350E−8
A10 = −3.7291E−10
A12 = 1.4152E−12

19$^{th}$ Surface

K = 0
A4 = 9.6408E−5
A6 = −2.3884E−6
A8 = 3.2859E−8
A10 = −2.5318E−10
A12 = 8.4509E−13

Data Set 1

| Focal Length | W~S~M1~T = 12.2~24.5~46.1~49.0 |
|---|---|
| Fno | W~S~M1~T = 3.6~4.8~6.0~6.4 |
| Half View Angle | W~S~M1~T = 44.9~23.9~13.0~12.2 |

| | W inf | S inf | M1 | T inf |
|---|---|---|---|---|
| d0 (Target) | ∞ | ∞ | ∞ | ∞ |
| d6 | 7.95050 | 8.31290 | 6.16290 | 5.45570 |
| d8 | 28.02150 | 12.34940 | 2.23000 | 1.61620 |
| d15 | 2.00000 | 5.34270 | 14.17200 | 15.29150 |
| d17 | 4.39410 | 16.36110 | 19.80120 | 20.00280 |
| ER | 5.41920 | 6.03938 | 6.9445 | 6.66945 |

| M2 | |
|---|---|
| d0 (Target) | 89.72640 |
| d6 | 5.45570 |
| d8 | 2.96259 |
| d15 | 17.65955 |
| d17 | 16.28531 |
| ER | 6.66945 |
| MG | −0.45000 |
| NA | 0.0347 |

Data Set 2

| G1 Focal Length | −48.3794 |
|---|---|
| G2 Focal Length | −39.0355 |
| G3 Focal Length | 17.040 |
| G4 Focal Length | −21.0296 |
| G5 Focal Length | 44.990 |
| BF | 15.906 |
| Total Optical Length(W–T) | 100.612 |
| Image Height | 10.815 |

Focal Length (macro mode) = 42.1
Half View Angle (macro mode) = 12.6
Imaging Distance (macro mode) = 89.7 (From object to 1$^{st}$ Surface)
Imaging Magnification (macro mode) = −0.45

Numerical Example 2-2

| Surface No. | r | d | nd | vd |
|---|---|---|---|---|
| 1 | 45.2207 | 2.1400 | 1.77250 | 49.60 |
| 2 | 16.3269 | 5.1200 | | |
| 3* | 41.8793 | 1.5000 | 1.58313 | 59.38 |
| 4* | 14.4691 | 3.8500 | | |
| 5 | 23.9939 | 3.8000 | 1.80810 | 22.76 |
| 6 | 103.8698 | d6 (Variable) | | |
| 7 | −24.8418 | 1.2000 | 1.74100 | 52.64 |
| 8 | −100.0000 | d8 (Variable) | | |
| 9* | 14.0498 | 4.3000 | 1.58313 | 59.38 |
| 10* | −31.7996 | 1.3000 | | |
| 11 (Stop) | ∞ | 1.9000 | | |
| 12 | 179.0098 | 1.0000 | 1.83400 | 37.16 |
| 13 | 10.8826 | 5.0000 | 1.49700 | 81.54 |
| 14 | −18.9390 | d14 (Variable) | | |
| 15 | 128.8505 | 1.0000 | 1.83481 | 42.71 |
| 16 | 15.2795 | 1.5800 | | |
| 17* | 37.2148 | 2.0000 | 1.53071 | 55.69 |
| 18* | 57.5081 | d18 (Variable) | | |
| 19 | −75.0639 | 2.4800 | 1.75211 | 25.05 |
| 20 | −23.7233 | d20 (Variable) | | |
| Image Plane | ∞ | | | |

Aspheric Data

3rd Surface

K = 1.2447
A4 = 2.0075E−5
A6 = −2.7611E−7
A8 = 2.4894E−10
A10 = 3.5331E−12
A12 = −9.3037E−15

4th Surface

K = −1.0662
A4 = 2.1822E−5
A6 = −3.0982E−7
A8 = −1.7795E−9
A10 = 1.9840E−11
A12 = −5.0306E−14

9th Surface

K = 0
A4 = −3.8287E−5
A6 = −4.3941E−8
A8 = 1.5034E−10
A10 = 1.3526E−11

10th Surface

K = 0
A4 = 6.6094E−5
A6 = −2.9345E−8
A8 = −1.6201E−9
A10 = 3.6897E−11

17th Surface

K = −82.6051
A4 = 2.9743E−4
A6 = −7.3765E−6
A8 = 9.2595E−8
A10 = −8.7606E−10

18th Surface

K = −271.4873
A4 = 2.8604E−4
A6 = −6.8173E−6
A8 = 8.5146E−8
A10 = −7.3142E−10

Data Set 1

| Focal Length | W~S~M1~T = 12.2~24.5~44.4~49.0 |
|---|---|
| Fno | W~S~M1~T = 3.6~5.2~6.1~6.5 |
| Half View Angle | W~S~M1~T = 44.9~23.8~13.5~12.2 |

| | W inf | S inf | M1 | T inf |
|---|---|---|---|---|
| d0 (Target) | ∞ | ∞ | ∞ | ∞ |
| d6 | 6.64460 | 9.32450 | 7.17320 | 5.91140 |
| d8 | 30.06750 | 12.35030 | 2.51040 | 1.55590 |
| d14 | 3.81420 | 7.93550 | 17.62220 | 19.75130 |
| d18 | 6.81620 | 17.73200 | 20.03650 | 20.12370 |
| ER | 5.17564 | 5.38054 | 5.38054 | 6.41796 |

| | M2 |
|---|---|
| d0 (Target) | 110.72054 |
| d6 | 5.91140 |
| d8 | 3.34967 |
| d9 | 0.40000 |
| d14 | 20.00066 |
| d18 | 17.68053 |
| ER | 6.41796 |
| MG | −0.35000 |
| NA | 0.028 |

Data Set 2

| G1 Focal Length | −41.219 |
|---|---|
| G2 Focal Length | −44.911 |
| G3 Focal Length | 18.399 |
| G4 Focal Length | −23.276 |
| G5 Focal Length | 45.180 |
| BF | 14.600 |
| Total Optical Length(W-T) | 100.111 |
| Image Height | 10.815 |

Focal Length (macro mode) = 40.5
Half View Angle (macro mode) = 13.4
Imaging Distance (macro mode) = 110.7 (From object to 1st Surface)
Imaging Magnification (macro mode) = −0.35

Numerical Example 2-3

| Surface No. | r | d | nd | vd |
|---|---|---|---|---|
| 1 | 102.9772 | 2.5000 | 1.51742 | 52.43 |
| 2 | 175.0279 | d2 (Variable) | | |
| 3 | 61.6287 | 2.7991 | 1.78800 | 47.37 |
| 4 | 19.5239 | 6.1046 | | |
| 5* | 114.4384 | 1.0728 | 1.58253 | 59.32 |
| 6* | 15.2703 | 3.4586 | | |
| 7 | 25.9416 | 5.2924 | 1.84666 | 23.78 |
| 8 | 221.8576 | d8 (Variable) | | |
| 9 | −22.2564 | 1.2000 | 1.74100 | 52.64 |
| 10 | −79.2468 | d10 (Variable) | | |
| 11* | 14.7769 | 4.0834 | 1.58253 | 59.32 |
| 12* | −29.7621 | 1.3338 | | |
| 13 (Stop) | ∞ | 1.8476 | | |
| 14 | 82.1540 | 1.0000 | 1.91082 | 35.25 |
| 15 | 11.9130 | 0.0070 | 1.56384 | 60.67 |
| 16 | 11.8860 | 5.4583 | 1.49700 | 81.54 |
| 17 | −18.6150 | d17 (Variable) | | |
| 18 | ∞ | 1.0000 | 1.77250 | 49.60 |
| 19 | 16.3256 | 1.6173 | | |
| 20* | 27.2936 | 1.8481 | 1.53071 | 55.69 |
| 21* | 35.1254 | d21 (Variable) | | |
| 22 | −73.9226 | 2.7575 | 1.75520 | 27.51 |
| 23 | −24.1196 | 14.7890 | | |
| Image Plane | ∞ | | | |

Aspheric Data

5th Surface

K = −1.3488
A4 = 2.5546E−5

-continued

A6 = −2.1154E−7
A8 = 3.0630E−11
A10 = 3.1146E−12
A12 = −5.4895E−15
$6^{th}$ Surface K = −1.3329
A4 = 3.1177E−5
A6 = −9.5004E−8
A8 = −2.9104E−9
A10 = 2.0300E−11
A12 = −3.5683E−14
$11^{th}$ Surface K = −0.0713
A4 = −3.7502E−5
A6 = −1.1749E−8
A8 = 9.2227E−11
A10 = 5.2627E−12
$12^{th}$ Surface K = 0.2254
A4 = 6.5973E−5
A6 = −1.0779E−7
A8 = 2.9854E−10
A10 = 8.1421E−12
$20^{th}$ Surface K = −1.0292
A4 = 2.9390E−4
A6 = −8.0095E−6
A8 = 1.8656E−7
A10 = −2.1155E−9
$21^{th}$ Surface

K = 2.2133
A4 = 3.1227E−4
A6 = −7.1415E−6
A8 = 1.5676E−7
A10 = −1.7602E−9

Data Set 1

| | |
|---|---|
| Focal Length | W~S~M1~T = 12.2~24.4~41.5~49.0 |
| Fno | W~S~M1~T = 3.6~5.2~6.0~6.5 |
| Half View Angle | W~S~M1~T = 42.0~24.2~14.7~12.5 |

| | W inf | S inf | M1 | T inf |
|---|---|---|---|---|
| d0 (Target) | ∞ | ∞ | ∞ | ∞ |
| d2 | 2.12957 | 3.37416 | 5.39500 | 6.22164 |
| d8 | 7.42838 | 8.57158 | 7.13070 | 5.29282 |
| d10 | 28.69251 | 12.35175 | 3.37250 | 1.61926 |
| d17 | 3.38106 | 7.01407 | 14.72100 | 17.95868 |
| d21 | 6.82713 | 18.39167 | 21.10490 | 1.45831 |
| ER | 5.16833 | 5.32406 | 6.1999 | 6.30225 |

| | M2 |
|---|---|
| d0 (Target) | 105.09650 |
| d2 | 6.22164 |
| d8 | 5.77139 |
| d10 | 4.73662 |
| d17 | 16.27760 |
| d21 | 19.54347 |
| d23 | 9.99971 |
| ER | 6.30225 |
| MG | −0.31500 |
| NA | 0.02624 |

Data Set 2

| | |
|---|---|
| G1 Focal Length | 477.817 |
| G2 Focal Length | −39.259 |
| G3 Focal Length | −42.143 |
| G4 Focal Length | 186.280 |
| G5 Focal Length | −23.184 |
| G6 Focal Length | 46.302 |
| BF | 14.789 |

| | |
|---|---|
| Total Optical Length | 106.628~107.873~109.894~110.721 (W~S~M1~T) |
| Image Height | 10.13~11.11~11.11~11.11 (W~S~M1~T) |

Focal Length (macro mode) = 38.5
Half View Angle (macro mode) = 14.8
Imaging Distance (macro mode) = 105.1 (From object to $1^{st}$ Surface)
Imaging Magnification (macro mode) = −0.315

Numerical Example 2-4

| Surface No. | r | d | nd | vd |
|---|---|---|---|---|
| 1 | 31.1117 | 2.0691 | 1.77250 | 49.60 |
| 2 | 12.6950 | 8.1256 | | |
| 3 | 113.4391 | 2.0914 | 1.53110 | 55.91 |
| 4* | 20.0750 | 1.5704 | | |
| 5 | 61.4079 | 3.3574 | 1.92286 | 20.88 |
| 6 | −85.0339 | d6 (Variable) | | |
| 7 | −23.4097 | 1.4228 | 1.77250 | 49.60 |
| 8 | −67.4494 | d8 (Variable) | | |
| 9 | 15.9168 | 2.5554 | 1.73400 | 51.47 |
| 10 | 38.1774 | 1.1182 | | |
| 11 (Stop) | ∞ | 0.8485 | | |
| 12* | 13.2801 | 4.4866 | 1.49700 | 81.54 |
| 13 | 70.7511 | 0.8973 | 1.90366 | 31.32 |
| 14 | 12.7475 | 0.9484 | | |
| 15* | 10.3674 | 3.5053 | 1.49700 | 81.61 |
| 16* | −33.0299 | d16 (Variable) | | |
| 17 | 31.2723 | 2.5762 | 1.66680 | 33.05 |
| 18 | −45.6262 | 0.8060 | 1.81600 | 46.62 |
| 19 | 13.0498 | d19 (Variable) | | |
| 20* | −375.5090 | 1.8517 | 1.53110 | 55.91 |
| 21* | −70.4500 | 1.6314 | | |
| 22 | 81.1555 | 3.1185 | 1.75520 | 27.51 |
| 23 | 1.028E+04 | 14.7000 | | |

Aspheric Data $4^{th}$ Surface

K = −9.7034
A4 = 7.5709E−5
A6 = −1.1292E−6
A8 = 5.9070E−9
A10 = −1.9413E−11
$12^{th}$ Surface K = −0.0044
A4 = 1.3700E−5
A6 = −5.2212E−7
A8 = 1.0043E−8
A10 = −8.6168E−11
$15^{th}$ Surface K = −0.0531
A4 = −1.6848E−4
A6 = 2.1018E−6
A8 = −7.5495E−8
A10 = 1.4267E−9
$16^{th}$ Surface K = −4.3734
A4 = 7.4283E−5
A6 = 1.6173E−6
A8 = −4.7249E−8
A10 = 1.3457E−9
$20^{th}$ Surface

K = −173.8024
A4 = 1.4194E−4
A6 = −8.5213E−7

-continued

```
            A8 = 3.0672E-9
            A10 = -8.3193E-12
            21th Surface K = -15.2845
            A4 = 1.4072E-4
            A6 = -8.6594E-7
            A8 = 3.1312E-9
            A10 = -9.9334E-12
```

Data Set 1

| Focal Length | Wide~Std~M1~Tele = 12.3~24.0~31.8~46.9 |
|---|---|
| Fno | Wide~Std~M1~Tele = 3.6~5.9~6.2~6.4 |
| Half View Angle | Wide~Std~M1~Tele = 44.3~24.9~19.1~12.9 |

| | W inf | S inf | M1 | T inf |
|---|---|---|---|---|
| d0 (Target) | ∞ | ∞ | ∞ | ∞ |
| d6 | 4.38498 | 4.38498 | 4.38498 | 4.38498 |
| d8 | 27.71988 | 12.44954 | 6.85195 | 0.09416 |
| d16 | 0.12512 | 2.54106 | 5.44925 | 12.93114 |
| d19 | 6.94166 | 19.79605 | 22.48540 | 21.76135 |
| ER | 5.50770 | 4.75779 | 5.25228 | 6.25359 |

| | M2 |
|---|---|
| d0 (Target) | 70.98634 |
| d6 | 4.38498 |
| d8 | 6.86251 |
| d16 | 8.41062 |
| d19 | 19.51351 |
| ER | 6.03715 |
| MG | -0.38000 |
| NA | 0.03358 |

Data Set 2

| G1 Focal Length | -16.954 |
|---|---|
| G2 Focal Length | 17.560 |
| G3 Focal Length | -23.921 |
| G4 Focal Length | 65.382 |
| BF | 14.7 |
| Total Optical Length(W-T) | 96.852 |
| Image Height | 11.11 |

Focal Length (macro mode) = 28.4
Half View Angle (macro mode) = 18.4
Imaging Distance (macro mode) = 71.0 (From object to 1st Surface)
Imaging Magnification (macro mode) = -0.38

FIGS. 20 to 23 show various aberrations for an object point at infinity at (A)-(D) wide-angle end (Winf), (E)-(H) intermediate position (S inf), (I)-(L) telephoto end (T inf) and (M)-(P) second mode (M2) for Embodiments 2-1 through 2-4.

In the drawings showing various aberrations, SA stands for spherical aberration, AS stands for astigmatism, DT stands for distortion and CC stands for chromatic difference of magnification. The spherical aberration SA is shown for the wavelengths of 587.6 nm (d line: solid line), 435.8 nm (g line: broken line), 656.3 nm (C line: dotted line) and 486.1 nm (F line: chain line). The chromatic difference of magnification CC is shown for the wavelengths of 435.8 nm (g line: broken line), 656.3 nm (C line: dotted line) and 386.1 nm (F line: chain line) as referred to d line. The astigmatism DT is shown for the sagittal image surface (solid line) and the meridional image surface (broken line). FNO stands for F number and FIY stand for the maximum image height.

The values of the conditional formulas (2-1) through (2-5) are listed below for Examples 2-1 through 2-4.

| | EX. 2-1 | EX. 2-2 | EX. 2-3 | EX. 2-4 |
|---|---|---|---|---|
| Formula (2-1) | 1.239 | 0.918 | 0.932 | 0.823 |
| Formula (2-2) | 1.852 | 2.198 | 1.996 | 1.864 |
| Formula (2-3) | 0.673 | 0.543 | 0.781 | 1.495 |
| Formula (2-4) | 0.772 | 0.822 | 0.891 | 0.809 |
| Formula (2-5) | 0.953 | 0.925 | 0.877 | 0.755 |

Figure 24:
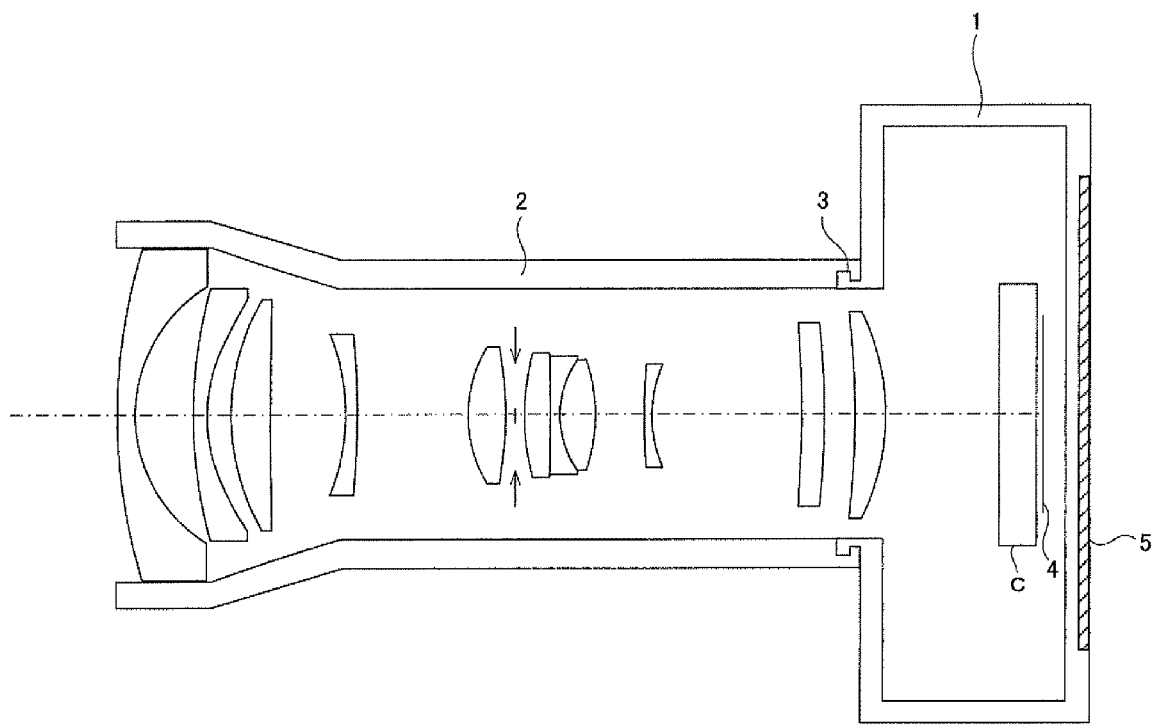
FIG. 24 is a schematic cross-sectional view of an image pickup apparatus using a zoom lens in the first aspect of the present invention as interchangeable lens.
Figure 25:
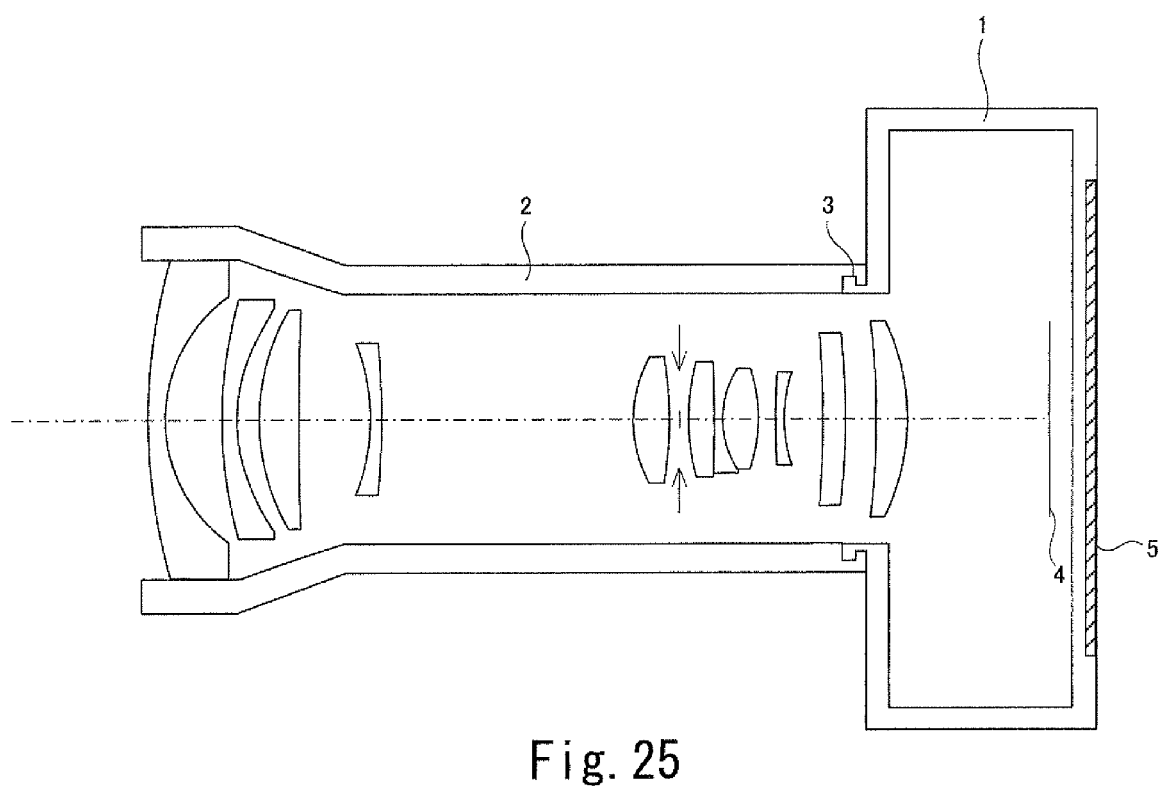
FIG. 25 is a schematic cross-sectional view of an image pickup apparatus using a zoom lens in the second aspect of the present invention as interchangeable lens.

FIG. 24 is a schematic cross-sectional view of an image pickup apparatus, or a single lens mirrorless camera, using a zoom lens in the first aspect of the present invention and a compact CCD or CMOS as imaging device. FIG. 25 is a schematic cross-sectional view of an image pickup apparatus, or a single lens mirrorless camera, using a zoom lens in the second aspect of the present invention and a compact CCD or CMOS as imaging device. Each of FIGS. 24 and 25 denotes the single lens mirrorless camera 1, an imaging lens system 2 arranged in the lens barrel, and the mount section 3 of the lens barrel that makes the imaging lens system 2 removably mountable in the single lens mirrorless camera 1. Typically, a screw type or a bayonet type mount is employed for the mount section. A bayonet type mount is employed in this instance. Additionally, each of FIGS. 24 and 25 denotes an imaging device surface 4 and a back monitor 5. Note that, in this Example, the imaging device 4 and the cover glass (parallel and flat plate) C are contained at the side of the single lens mirrorless camera 1.

A zoom lens according to the present invention, which may be one of the above-described Examples 1-1 through 1-5 and 2-1 through 2-4, is employed for the imaging lens system 2 of a single lens mirrorless camera 1 having the above-described configuration.

Figure 26:
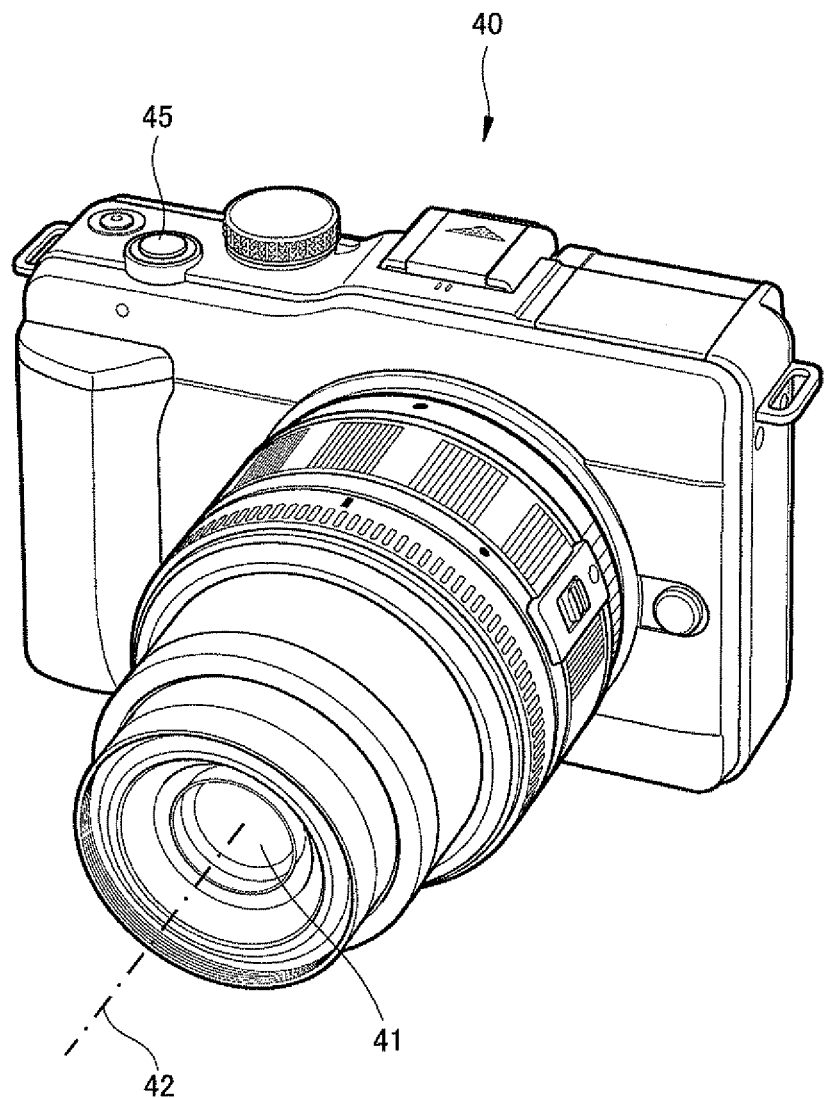
FIG. 26 is a schematic perspective front view of a digital camera using a zoom lens according to the present invention.
Figure 27:
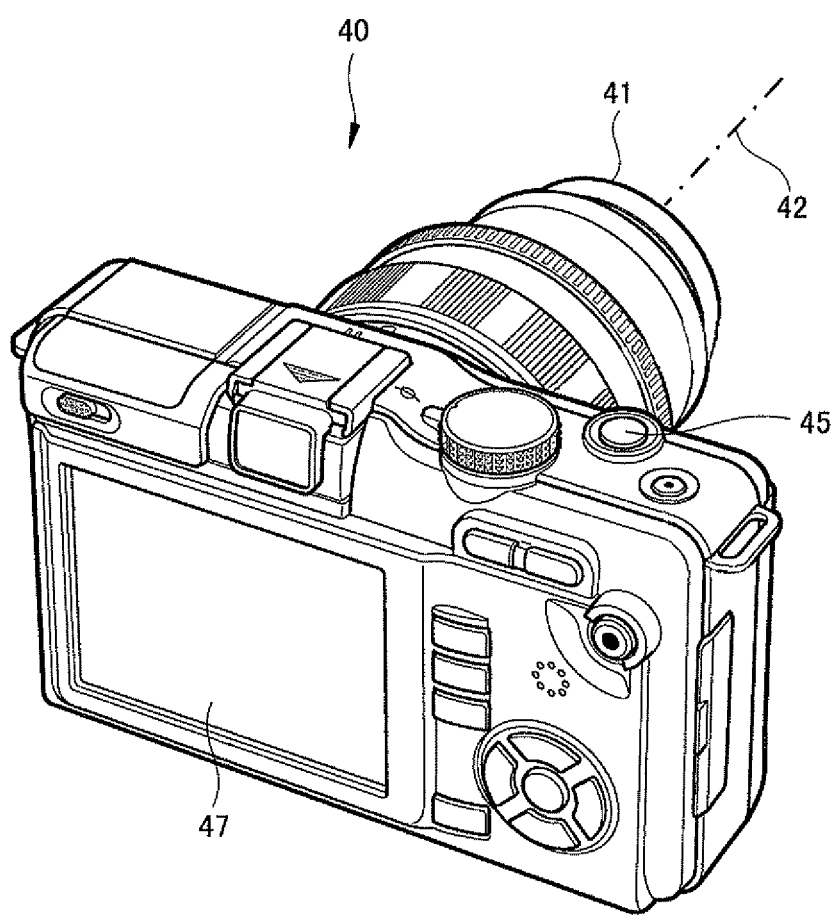
FIG. 27 is a schematic perspective rear view of a digital camera using a zoom lens according to the present invention.

FIGS. 26 and 27 are schematic conceptual views of an image pickup apparatus incorporating a zoom lens according to the present invention into the imaging optical system 41 thereof. FIG. 26 is a schematic perspective front view of digital camera 40 that is an image pickup apparatus and FIG. 27 is a schematic perspective back view of the camera 40.

This digital camera 40 includes an imaging optical system 41 arranged on the image light path 42 of the camera, a shutter button 45, a liquid crystal display monitor 47, etc. As the shutter button 45 arranged at a top part of the digital camera 40 is depressed, an image is picked up by way of the imaging optical system 41 including, for example, a zoom lens of Example 1 in an interlocked manner. The image of the target object formed by the imaging optical system 41 is made to appear on the imaging device (photoelectric conversion surface) arranged near the image forming surface. The image of the target object optically received by the imaging device is displayed on the liquid crystal display monitor 47 arranged at the back surface of the camera as an electronic image by a processing means.

Figure 28:
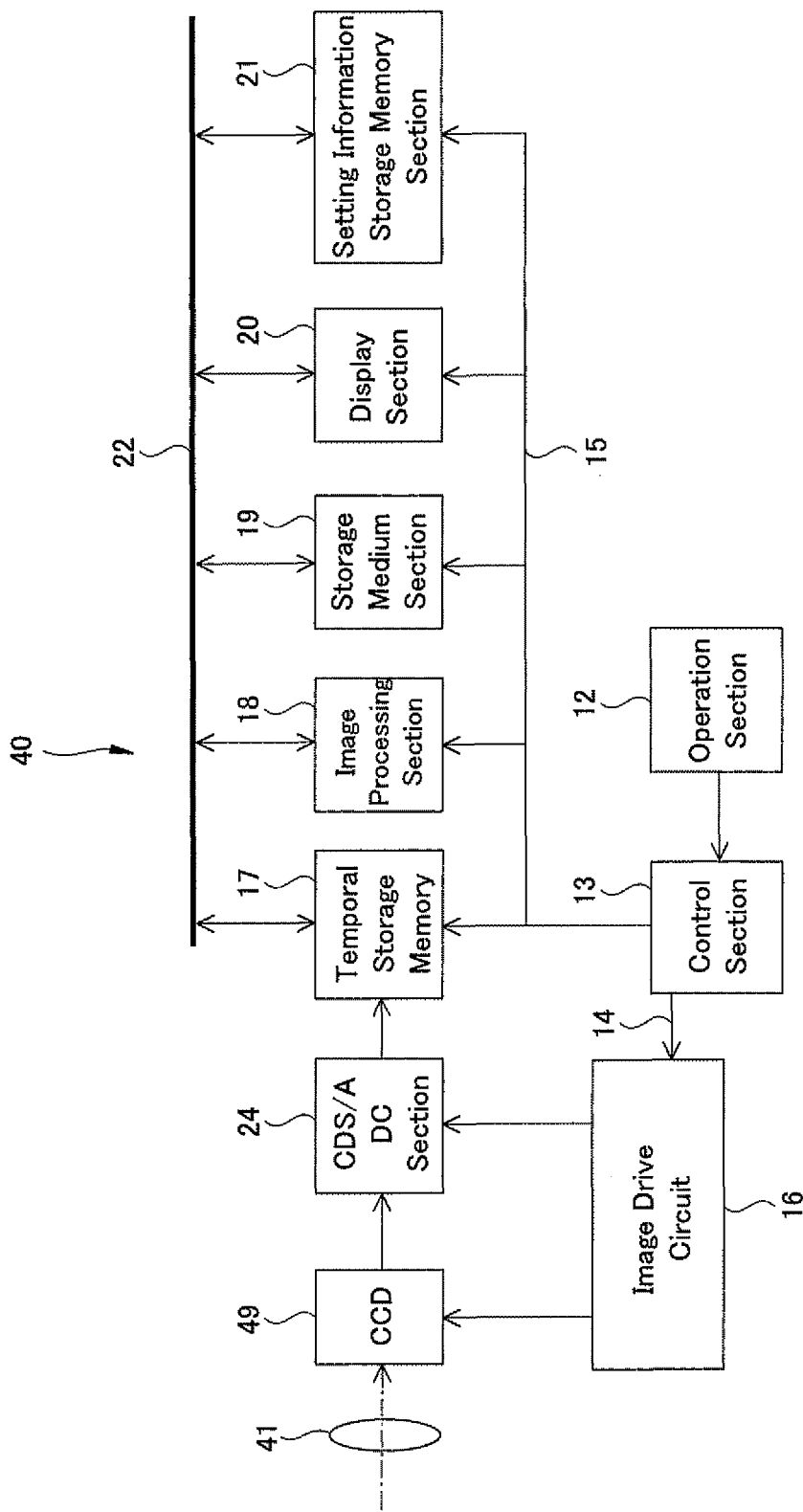
FIG. 28 is a block diagram of the control mechanism of a digital camera using a zoom lens according to the present invention.

FIG. 28 is a block diagram of the internal circuit of a principal part of the digital camera 40. Note that, in the following description, the processing means 51 described above includes, for example, a CDS/ADC section 24, a temporary storage memory 17, an image processing section 18, etc., whereas the memory means 52 typically includes a storage medium section.

As shown in FIG. 28, the digital camera 40 includes an operation section 12, a control section 13 connected to this operation section 12, an imaging drive circuit 16, a temporary storage memory 17, the imaging drive circuit 16 and the temporary storage memory 17 being connected to the control signal output port of the control section 13 respectively by way of bus 14 and bus 15, an image processing section 18, a storage medium section 19, a display section 20 and a setting information storage memory section 21.

The temporary storage memory 17, the image processing section 18, the storage medium section 19, the display section 20 and the setting information storage memory section 21 listed above can mutually input and output data by way of bus 22. Additionally, a CCD 49 and a CDS/ADC section 24 are connected to the imaging drive circuit 16.

The operation section 12 includes various input buttons and switches and notifies the event information input to it from the outside (the camera user) by way of any of the input buttons and switches to the control section. The control section 13 is typically a central processing unit, which is also referred to as a CPU, and contains a program memory (not shown). The control section 13 controls the entire digital camera 40 according to the programs stored in the program memory.

The CCD 49 is an imaging device driven and controlled by the imaging drive circuit 16 to convert the quantity of light of each pixel of the image of the target object formed by way of the imaging optical system 41 into an electric signal and output the signal to the CDS/ADC section 24.

The CDS/ADC section 24 is a circuit for amplifying the electric signal input from the CCD 49, operating for analog/digital conversions for the electric signal and outputting the image raw data (Bayer data, to be referred to as RAW data hereinafter) produced as a result of amplifications and analog/digital conversions.

The temporary storage memory 17 is a buffer memory typically including a SDRAM, and is a memory device for temporarily storing the RAW data output from the CDS/ADC section 24. The image processing section 18 is a circuit for reading out RAW data stored in the temporary storage memory 17 or RAW data stored in the storage medium section 19 and electrically executing various image processing operations including operations for correcting distortions according to the image quality parameters specified by the control section 13.

The storage medium section 19 is removably mounted with a card type or stick type storage medium that may typically be a flash memory that records RAW data transferred from the temporary storage memory 17 and the image data produced from the image processing section 18 as a result of image processing and holds them.

The display section 29 includes the liquid crystal display monitor 47 and so on and displays the picked up RAW data, image data, operation menus, etc. The setting information storage memory section 21 includes a ROM section that stores various image quality parameters in advance and a RAM section that stores the image quality parameters read out from the ROM section by way of input operations at the operation section 12.

The digital camera 40 having the above-described configuration can operate as an image pickup apparatus having an imaging optical system 41 where a zoom lens according to the present invention is adopted to operate as an inner zoom system and an inner focus system with a fixed total length and provide advantages in terms of optical performances and securing variable magnification ratio.

While the present invention is described above by way of various embodiments, the present invention is by no means limited to the embodiments and embodiments realized by appropriately combining any of the components of the embodiments are also within the scope of the present invention.

What is claimed is:

1. A zoom lens of a fixed total length comprising:
a first lens group having a negative refractive power;
a second lens group having a negative refractive power;
a third lens group having a positive refractive power;
a fourth lens group having a negative refractive power; and
a fifth lens group having a positive refractive power;
arranged in the above mentioned order from the object side to the image side;
wherein,
at the time of changing the magnification from the wide-angle end toward the telephoto end;
the first lens group is anchored; while
the second lens group is moved; and
the third lens group and the fourth lens group are moved so as to be located at the object side of the telephoto end relative to the wide-angle end; in such a way that
the interval between the second lens group and the third lens group is decreased at the telephoto end relative to the wide-angle end;
the interval between the third lens group and the fourth lens group is increased at the telephoto end relative to the wide-angle end; and
the interval between the fourth lens group and the fifth lens group is increased at the telephoto end relative to the wide-angle end; and,
at the time of focusing a near object point from a remote object point,
the second lens group is moved; and,
the zoom lens satisfies the conditional formula (1-1) shown below:

$$0.5 < (d45T - d45W)/fW < 2.0 \qquad (1\text{-}1),$$

where
$d45W$ is the interval between the fourth lens group and the fifth lens group at the wide-angle end on the optical axis;
$d45T$ is the interval between the fourth lens group and the fifth lens group at the telephoto end on the optical axis; and
$fW$ is the focal length of the entire zoom lens system at the wide-angle end.

2. The zoom lens according to claim 1, wherein the second lens group moves toward the image side and subsequently toward the object side when the magnification is changed from the wide-angle end toward the telephoto end.

3. The zoom lens according to claim 1, wherein the third lens group is moved in a manner that satisfies the conditional formula (1-2) shown below:

$$2.0 < \Delta 3/fw < 3.0 \qquad (1\text{-}2),$$

where
$\Delta 3$ is the difference between the position at the wide-angle end and the position at the telephoto end of the third lens group, a move toward the object side being indicated by a positive sign.

4. The zoom lens having a fixed total length according to claim 1, wherein the fourth lens group is moved in a manner that satisfies the conditional formula (1-3) shown below:

$$1.0 < \Delta 4/fw < 1.6 \qquad (1\text{-}3),$$

where
- Δ4 is the difference between the position at the wide-angle end and the position at the telephoto end of the fourth lens group, a move toward the object side being indicated by a positive sign.

5. The zoom lens having a fixed total length according to claim 1, wherein
the fifth lens group satisfies the conditional formula (1-4) shown below:

$$-0.5 < \Delta 5/fw < 0.5 \quad (1\text{-}4),$$

where
- Δ5 is the difference between the position at the wide-angle end and the position at the telephoto end of the fifth lens group, a move toward the object side being indicated by a positive sign.

6. The zoom lens having a fixed total length according to claim 1, wherein
the fifth lens group is anchored when the magnification is changed from the wide-angle end to the telephoto end.

7. The zoom lens having a fixed total length according to claim 1, wherein
the second lens group satisfies the conditional formula (1-5) shown below:

$$-6.0 < f2/fw < -2.0 \quad (1\text{-}5),$$

where
- f2 is the focal length of the second lens group.

8. The zoom lens having a fixed total length according to claim 1, wherein
the first lens group consists of:
two negative meniscus lenses with their concave surfaces directed to the image side and a positive meniscus lens with its convex surface directed to the object side, the lenses being arranged sequentially in the above mentioned order from the object side toward the image side; wherein
the image side surface of at least one of the two negative meniscus lenses is aspheric and the aspheric surface has a profile adapted to gradually reduce the negative refractive power as a function of the distance from the optical axis.

9. The zoom lens having a fixed total length according to claim 1, wherein
the second lens group comprises a negative lens, the second lens group consists of a meniscus-shaped lens component with its concave surface facing the object side, and the second lens group satisfies the conditional formulas (1-6) and (1-7) shown below:

$$-1.0 < (r2L - r2R)/(r2L + r2R) < -0.4 \quad (1\text{-}6)$$

and $$1.65 < nd2 < 2.15 \quad (1\text{-}7),$$

where
- r2L is the radius of curvature of the air-contact surface of the second lens group at the object side;
- r2R is the radius of curvature of the air-contact surface of the second lens group at the image side;
- nd2 is the refractive index at the d-line of one of the negative lenses of the second lens group; and
- the lens component is a lens block having only two air-contact surfaces on the light path including an air-contact surface at the object side and an air-contact surface at the image side.

10. The zoom lens having a fixed total length according to claim 9, wherein the second lens group consists of a single negative meniscus lens with its concave surface facing the object side.

11. The zoom lens having a fixed total length according to claim 1, wherein
the third lens group consists of:
an object side auxiliary lens group including a positive lens and having an aspheric surface and a positive refractive power and an image side auxiliary lens group including a negative lens, the lens groups being arranged in the above mentioned order from the object side;
an aperture diaphragm is arranged between the object side auxiliary lens group and the image side auxiliary lens group; and
the third lens group satisfies the conditional formula (1-8) shown below:

$$0.7 < f3f/f3 < 1.3 \quad (1\text{-}8),$$

where
- f3f is the focal length of the object side auxiliary lens group; and
- f3 is the focal length of the third lens group.

12. The zoom lens having a fixed total length according to claim 11, wherein:
the image side auxiliary lens group in the third lens group includes a positive lens; and
satisfies the conditional formulas (1-9), (1-10) and (1-11) shown below:

$$65 < vd3bp < 96 \quad (1\text{-}9),$$

$$1.75 < nd3bn < 2.05 \quad (1\text{-}10)$$

and $$20 < vd3bn < 55 \quad (1\text{-}11),$$

where
- vd3 bp is the Abbe number at the d-line of one of the positive lenses in the image side auxiliary lens group of the third lens group; and
- nd3bn and vd3bn are the refractive index at the d-line and the Abbe number at the d-line of one of the negative lenses in the image side auxiliary lens group of the third lens group.

13. The zoom lens having a fixed total length according to claim 11, wherein
the third lens groups consists of a positive lens, a positive lens, a negative lens and a positive lens or, alternatively, of a positive lens, a negative lens and a positive lens arranged from the object side to the image side in the above-mentioned order.

14. The zoom lens having a fixed total length according to claim 1, wherein:
the fourth lens group includes a negative lens and the fourth lens group comprises a negative lens component of a negative refractive power having an image side concave surface with a curvature greater than the absolute value of the object side curvature;
the fifth lens group comprises a positive meniscus lens with its convex surface facing the image side;
at least either the fourth lens group or the fifth lens group has an aspheric surface; and
the lens component being a lens block having only two air-contact surfaces on the optical path including an object side air-contact surface and an image side air-contact surface.

15. The zoom lens having a fixed total length according to claim 14, wherein the fourth lens group consists of a single lens having a negative refractive power and the fifth lens group consists of a single lens having a positive refractive power.

16. The zoom lens having a fixed total length according to claim 14, wherein the fourth lens group satisfies the conditional formulas (1-12), (1-13) and (1-14) shown below:

$$0.4 < (r4L - r4R)/(r4L + r4R) < 1.6 \quad (1\text{-}12),$$

$$1.65 < nd4 < 2.05 \quad (1\text{-}13)$$

and $$20 < vd4 < 60 \quad (1\text{-}14),$$

where r4L is the radius of curvature of the object side air-contact surface of the negative lens component in the fourth lens group;

r4R is the radius of curvature of the image side air-contact surface of the negative lens component in the fourth lens group; and nd4 and vd4 are respectively the refractive index and the Abbe number at the d-line of one of the negative lenses in the negative lens component of the fourth lens group.

17. The zoom lens having a fixed total length according to claim 14, wherein the fifth lens group satisfies the conditional formula (1-15) shown below:

$$15 < vd5 < 30 \quad (1\text{-}15),$$

where vd5 is the Abbe number at the d-line of the positive meniscus lens in the fifth lens group.

\* \* \* \* \*